(12) United States Patent
Ding et al.

(10) Patent No.: US 12,743,243 B2
(45) Date of Patent: Sep. 22, 2026

(54) DISPLAY METHOD FOR FOLDABLE SCREEN AND ELECTRONIC DEVICE

(71) Applicant: HUAWEI TECHNOLOGIES CO., LTD., Guangdong (CN)

(72) Inventors: Yaling Ding, Shanghai (CN); Miao Wang, Shenzhen (CN); Hongfeng Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/190,512

(22) Filed: Apr. 25, 2025

(65) Prior Publication Data

US 2025/0251891 A1 Aug. 7, 2025

Related U.S. Application Data

(63) Continuation of application No. PCT/CN2023/126211, filed on Oct. 24, 2023.

(30) Foreign Application Priority Data

Oct. 25, 2022 (CN) ........................ 202211313082.6

(51) Int. Cl.
*G06F 3/14* (2006.01)

(52) U.S. Cl.
CPC .................................... *G06F 3/14* (2013.01)

(58) Field of Classification Search
CPC ........ G06F 3/14; G06F 1/1616; G06F 1/1652; G06F 1/1677; G06F 3/04817; G06F 3/04883; G06F 3/04886; G06F 2203/04803; H04M 1/0214; H04M 1/0268
See application file for complete search history.

(56) References Cited

U.S. PATENT DOCUMENTS 10,627,931 B2 * 4/2020 Chung ................ G06F 3/04886
12,248,723 B2 * 3/2025 Lee ....................... G06F 1/1647
12,333,202 B2 * 6/2025 Zheng ..................... G06T 13/80

FOREIGN PATENT DOCUMENTS

| | | | |
|---|---|---|---|
| CN | 110286972 | A | 9/2019 |
| CN | 110688009 | A | 1/2020 |
| CN | 112445386 | A | 3/2021 |
| CN | 115033140 | A | 9/2022 |
| CN | 116048327 | A | 5/2023 |
| EP | 3296838 | A1 | 3/2018 |
| WO | 2021137318 | A1 | 7/2021 |

* cited by examiner

*Primary Examiner* — Kenneth B Lee, Jr.

(57) ABSTRACT

This application discloses a display method for a foldable screen and an electronic device. The method includes: displaying a first group of service entries in a first dock bar when the electronic device detects that a foldable screen is in a folded state; and displaying a second group of service entries in a second dock bar when the electronic device detects that the foldable screen is in an unfolded state. A quantity of service entries in the second group of service entries is greater than a quantity of service entries in the first group of service entries. The first dock bar is a dock bar in a display area of the foldable screen in the folded state, and the second dock bar is a dock bar in a display area of the foldable screen in the unfolded state.

18 Claims, 61 Drawing Sheets

FIG. 9A
910
920
5G 4G
08:08
First desktop page
Office mode
920-1
Chongqing
36°C
Yesterday
Today
Tomorrow
30°C ~ 37°C
29°C ~ 39°C
29°C ~ 35°C
08:08
Saturday, July 9
36°C
Chongqing
To-do list
920-2
Weekly meeting on Monday
Notes
Work summary
920-3
WeChat
QQ
Cloud sharing
Memo

FIG. 12D
First desktop page
5G
4G
Efficiency space
08:08
Read later
Create a note
08:08
Saturday, July 9
Sharing center
36°C
Chongqing
WeChat
QQ
Cloud sharing
Memo

DISPLAY METHOD FOR FOLDABLE SCREEN AND ELECTRONIC DEVICE

CROSS-REFERENCE TO RELATED APPLICATIONS

This application is a continuation of International Application No. PCT/CN2023/126211, filed on Oct. 24, 2023, which claims priority to Chinese Patent Application No. 202211313082.6, filed on Oct. 25, 2022. The disclosures of the aforementioned applications are hereby incorporated by reference in their entireties.

TECHNICAL FIELD

This application relates to the field of terminal technologies, and in particular, to a display method for a foldable screen and an electronic device.

BACKGROUND

With development of intelligent technologies, use of a foldable screen in an electronic device has become a development trend. The foldable screen of the electronic device may include a folded state and an unfolded state. When the foldable screen is in the folded state, the electronic device is more compact and is easy to carry. When the foldable screen is in the unfolded state, a display area provided by the electronic device is larger, thereby providing better use experience for a user.

When the foldable screen of the electronic device changes from the folded state to the unfolded state, how to display content on the foldable screen in the unfolded state is a problem that urgently needs to be resolved.

SUMMARY

Embodiments of this application provide a display method for a foldable screen and an electronic device so that a display area obtained by unfolding a foldable screen can be fully used to display more content, thereby effectively improving utilization of the display area and further improving user experience.

According to a first aspect, a display method for a foldable screen is provided, including: displaying a first group of service entries in a first dock bar when a foldable screen is in a folded state; and displaying a second group of service entries in a second dock bar when the electronic device detects that the foldable screen is in an unfolded state. A quantity of service entries in the second group of service entries is greater than a quantity of service entries in the first group of service entries. The first dock bar is a dock bar in a display area of the foldable screen in the folded state, and the second dock bar is a dock bar in a display area of the foldable screen in the unfolded state.

A dock bar, which may also be referred to as a dock area, an application shortcut operation menu, or the like, is an area displayed on a display interface of a current terminal device and is used to display a function entry, such as a plurality of application icons, so that a user can quickly access an application or a function in an application through the function entry included in the dock bar. Generally, the dock area is displayed only when a desktop of a mobile terminal is displayed and the dock bar does not change with switching of a desktop page. The function entry included in the dock bar may be set by a system or the user. For example, in most current terminals, the dock area is located below the display interface.

According to the method described in the first aspect, a capacity of the dock bar can be changed so that the dock bar includes more service entries and a display area obtained by unfolding the foldable screen is fully used. In this way, it is more convenient for the user to quickly access or start more services, thereby effectively improving utilization of the display area and further improving user experience.

With reference to the first aspect, in some embodiments, the second dock bar is a dock bar formed after a size of the first dock bar is expanded. In some other embodiments, the second dock bar includes two parts. One part is the first dock bar, and the other part is displayed in a new display area obtained by unfolding the foldable screen.

With reference to the first aspect, in some embodiments the displaying a second group of service entries in a second dock bar when the electronic device detects that the foldable screen is in an unfolded state includes: in response to the foldable screen being in the unfolded state, automatically displaying, in an area other than the first dock bar, a service entry that does not belong to the first dock bar.

It should be noted that the unfolded state herein is not necessarily a state in which the foldable screen is completely flattened, and may also indicate that the foldable screen is unfolded to a specific angle. Similarly, the folded state may also be that the foldable screen is folded to a specific angle.

With reference to the first aspect, in some embodiments, the service entry in this application is used to access an application or access a function page in an application. For example, the service entry may be an application icon, a folder icon, a split-screen entry, a service widget, a link, an application page, a thumbnail, a control, and the like.

With reference to the first aspect, in some embodiments, the foldable screen includes at least a first screen and a second screen, the first group of service entries are displayed entirely on the first screen, and the second group of service entries are displayed partially on the first screen and displayed partially on the second screen.

With reference to the first aspect, in some embodiments, the second group of service entries include some or all service entries in the first group of service entries, and the second group of service entries further include another service entry. The another service entry includes any one or more of the following:

A. A service entry determined based on historical usage data of each service entry in the electronic device.

(1) A quantity of open times in a recent period of time.

For example, application icons of P applications that are opened most frequently in a recent period of time are used as the another service entry, where P is a positive integer.

(2) Open duration in a recent period of time.

For example, application icons of P applications that are opened for longest duration in a recent period of time are used as the another service entry.

(3) Most recent open time.

For example, application icons of P applications whose open time is closest to a current time are used as the another service entry.

(4) A use location.

For example, a service entry frequently used by the user at a current location is used as the another service entry.

(5) A scenario mode.

For example, a service entry frequently used by the user in a current scenario mode is used as the another service entry.

In this implementation, because the service entry that is determined based on the historical usage data is a service entry frequently used or recently used by the user, search operations of the user can be reduced so that the user quickly accesses or starts a corresponding service, thereby improving user experience.

B. A service entry determined based on a folder in the first group of service entries.

For example, one or more service entries included in the folder are used as the another service entry.

It can be learned that in this implementation, the electronic device may display, in the second dock bar, the service entry included in the folder without a plurality of operations, so that the user quickly accesses the service entry included in the folder, thereby improving user experience. C. A service entry preset by the user.

For example, an application icon of "Calculator" may be a service entry that is set by the user based on personal preferences. This feature is more in line with a user habit, enables the user to quickly access a preset service entry, and improves user experience.

With reference to the first aspect, in some embodiments the second dock bar includes a first sub-area and a second sub-area; the first sub-area is used to display the some or all service entries in the first group of service entries; and the second sub-area is used to display the another service entry.

With reference to the first aspect, in some embodiments a quantity of service entries in the second sub-area is related to a size of the second sub-area.

For example, when the size of the second sub-area is X centimeters, the quantity of service entries in the second sub-area is 4; or when the size of the second sub-area is Y centimeters, the quantity of service entries in the second sub-area is 2. X and Y are positive numbers.

With reference to the first aspect, in some embodiments the size of the second sub-area is set by a system by default, or is user-defined.

With reference to the first aspect, in some embodiments the user may adjust a service entry displayed in the second sub-area. For example, the user may slide a scroll bar to adjust the service entry displayed in the second sub-area.

With reference to the first aspect, in some embodiments the first group of service entries include at least one folder icon, and the folder icon indicates that the folder includes one or more service entries; and when the foldable screen is in the unfolded state, some or all service entries in the one or more service entries are displayed in the second dock bar.

Optionally, some service entries in the one or more service entries may include one or two of the following: (1) a service entry determined based on an arrangement and display order of service entries in the folder; and/or (2) a service entry determined based on historical usage data of each service entry in the folder.

In this way, the one or more service entries included in the folder are flexibly displayed in the second dock bar.

With reference to the first aspect, in some embodiments the second dock bar includes a first sub-area and a second sub-area; the second sub-area is used to display the some or all service entries in the one or more service entries; and the first sub-area is used to display some or all service entries in the first group of service entries except the service entries displayed in the second sub-area.

According to a second aspect, a display method for a foldable screen is provided, including: displaying a desktop workspace on the display area of the foldable screen when the electronic device detects that the foldable screen is in the folded state; and displaying the desktop workspace and an efficiency space on the display area of the foldable screen when the electronic device detects that the foldable screen is in the unfolded state. The desktop workspace includes a plurality of desktop pages, each desktop page includes one or more service entries, and the desktop workspace switches from one desktop page to another desktop page when a touch operation performed on the desktop workspace is detected. The efficiency space includes one or more service entries, and the efficiency space is a partial area that is in the display area and that does not switch with switching of a desktop page in the desktop workspace.

When the foldable screen of the electronic device changes from the folded state to the unfolded state, the desktop workspace and the efficiency space are displayed in an unfolded display area. The efficiency space and the desktop workspace are in split screens, more display and operations are supported, and display efficiency is improved. In addition, compared with a manner in which the electronic device displays the desktop workspace in the unfolded display area, the method in this embodiment of this application not only can support display of more content, but also can prevent content in the desktop workspace from being stretched, thereby improving aesthetics.

With reference to the first aspect, in some embodiments the desktop pages displayed in the desktop workspace in the unfolded state and the folded state of the foldable screen may be the same or may be different. For example, in the folded state, the desktop workspace displays a first desktop page, and in the unfolded state, the desktop workspace displays a second desktop page; or the desktop workspace becomes larger and content of the displayed first desktop page is adaptively adjusted due to area enlargement.

With reference to the first aspect, in some embodiments the service entry is used to access an application or access a function page in an application. For example, the service entry may be an application icon, a folder icon, a split-screen entry, a service widget, a link, an application page, a thumbnail, a control, and the like.

With reference to the first aspect, in some embodiments the one or more service entries displayed in the efficiency space are related to a scenario mode of the electronic device; and the scenario mode includes one or more of a working mode, an entertainment mode, an office mode, a learning mode, a life mode, and/or a sleep mode.

With reference to the first aspect, in some embodiments, the one or more service entries included in the efficiency space may be:

(1) One or more service entries set by the system by default: For example, the one or more service entries corresponding to the life mode set by the system by default include a payment control and an express delivery management service widget.

(2) One or more user-defined service entries: Optionally, the user may adjust the one or more service entries set by the system by default, to obtain the one or more user-defined service entries. That the user adjusts the one or more service entries set by the system by default includes but is not limited to one or more of the following: removing a service entry, adding a service entry, and/or adjusting a display location of a service entry in the efficiency space. In this case, the user may customize the one or more service entries in the efficiency space based on personal preferences, which is more in line with a use habit of the user.

(3) One or more application-related service entries that are determined based on an application icon on the desktop page of the desktop workspace and that correspond to the application icon: For example, if the desktop page in the desktop workspace includes an application icon of "Taobao", an application icon of "Alipay" related to "Taobao" and a quick payment control of "Alipay" may be used as the one or more service entries in the efficiency space. For another example, if the desktop page of the desktop workspace includes an application icon of "Memo", an application page of "Memo" may be used as the one or more service entries in the efficiency space. The one or more service entries included in the efficiency space may be dynamically displayed along with content in the desktop workspace, and an associated service may be deeply mined so that the user performs an associated human-machine interaction which is more in line with user habits and effectively improves user experience.

With reference to the first aspect, in some embodiments the content displayed in the desktop workspace and the content displayed in the efficiency space support movement between the desktop workspace and the efficiency space.

For example, a service entry in the efficiency space is moved to the desktop workspace. For another example, one or more of the following are included: adding content of the application page in the desktop workspace as "Note" in the efficiency space, adding the content of the application page in the desktop workspace as "Read later" in the efficiency space, and/or sharing the content of the application page in the desktop workspace to a nearby device indicated by the efficiency space.

According to a third aspect, this application provides an electronic device including one or more processors, one or more memories, and a touchscreen. The one or more memories are coupled to the one or more processors. The one or more memories are configured to store computer program code. The computer program code includes computer instructions. When the one or more processors execute the computer instructions, the electronic device is enabled to perform the display method for a foldable screen in any of the implementations herein.

According to a fourth aspect, an embodiment of this application provides a computer storage medium including computer instructions. When the computer instructions are run (i.e., executed) on an electronic device, the electronic device is enabled to perform the display method for a foldable screen in any of the implementations herein.

According to a fifth aspect, an embodiment of this application provides a computer program product. When the computer program product runs on a computer, the computer is enabled to perform the display method for a foldable screen in any of the implementations herein.

BRIEF DESCRIPTION OF DRAWINGS

To describe technical solutions in embodiments of this application more clearly, the following describes the accompanying drawings used in embodiments of this application.

FIG. 3A-1 to FIG. 3B-2 are diagrams of interfaces of another display method for a foldable screen according to an embodiment of this application;

FIG. 4A-1 to FIG. 4D are diagrams of interfaces of still another display method for a foldable screen according to an embodiment of this application;

FIG. 5A-1 to FIG. 5F-2 are diagrams of interfaces of still another display method for a foldable screen according to an embodiment of this application;

FIG. 6A-1 to FIG. 6B-2 are diagrams of interfaces of still another display method for a foldable screen according to an embodiment of this application;

FIG. 7A-1 to FIG. 7C-2 are diagrams of interfaces of still another display method for a foldable screen according to an embodiment of this application;

FIG. 8A-1 to FIG. 8C-2 are diagrams of interfaces of still another display method for a foldable screen according to an embodiment of this application;

FIG. 11A-1 to FIG. 11D-3 are diagrams of interfaces of still another display method for a foldable screen according to an embodiment of this application;

DESCRIPTION OF EMBODIMENTS

The technical solutions according to embodiments of this application are clearly described in the following with reference to the accompanying drawings. In the descriptions of embodiments of this application, unless otherwise specified, "/" indicates an "or" relationship. For example, A/B may represent A or B. In this specification, "and/or" merely describes an association relationship between associated objects and indicates that three relationships may exist. For example, A and/or B may indicate the following three cases: Only A exists, both A and B exist, and only B exists. In addition, in the descriptions of embodiments of this application, "a plurality of" intends two or more than two.

In the following, terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" intends two or more than two.

An embodiment of this application provides a display method for a foldable screen, and the method may be applied to an electronic device having a foldable screen. The foldable screen may include a folded state and an unfolded state. A display area of the foldable screen of the electronic device in the folded state is less than a display area of the foldable screen in the unfolded state.

Figure 1:
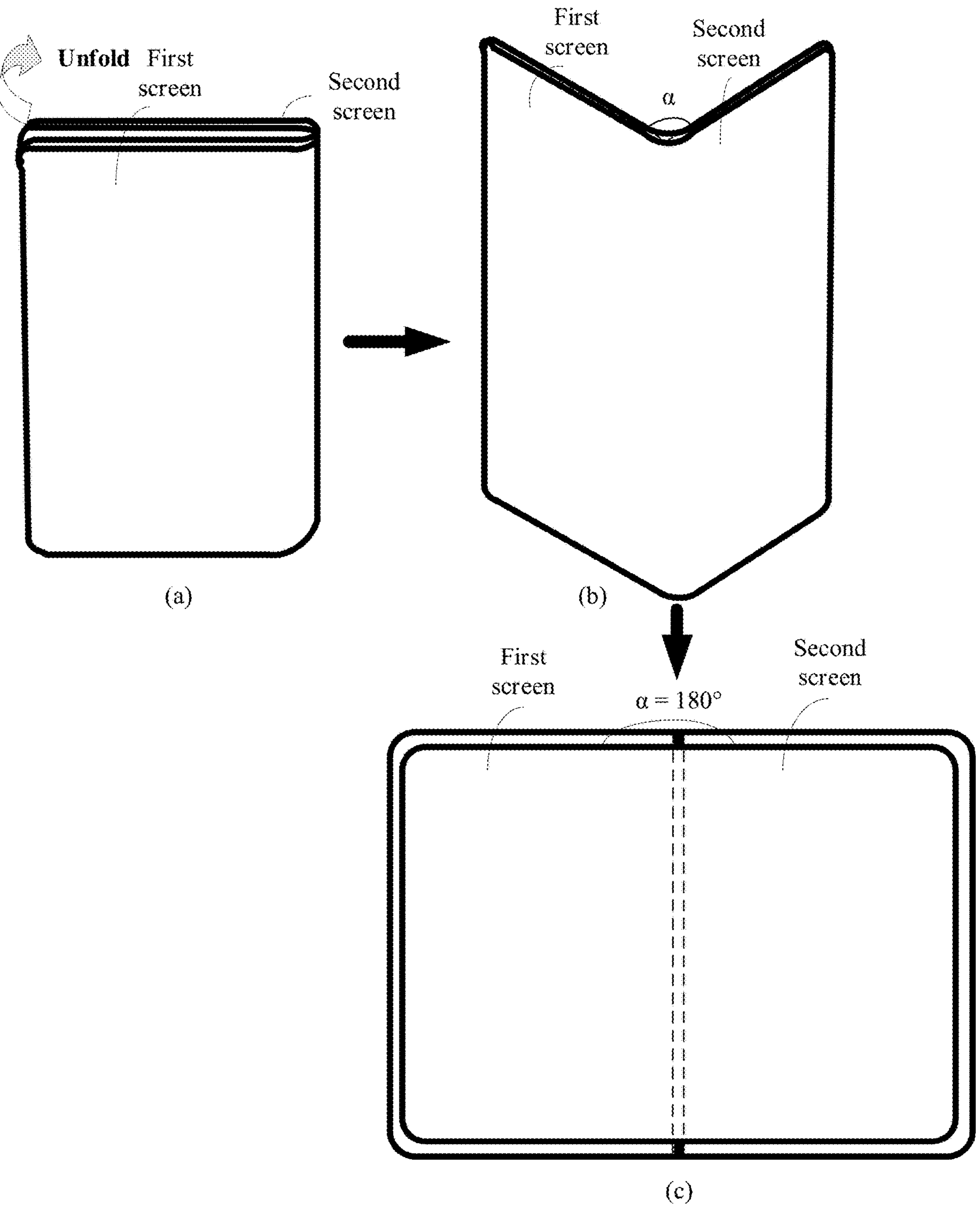
FIG. 1 is a diagram of a product form of an electronic device having an outward-folding screen according to an embodiment of this application.

For example, the foldable screen in this embodiment of this application may be an outward-folding screen. The outward-folding screen may be folded outward along a folding shaft to form a first screen and a second screen. FIG. 1 is a diagram of a product form of an electronic device having an outward-folding screen according to an embodiment of this application. (a) in FIG. 1 is a diagram of a form of an electronic device after the foldable screen is completely folded. As shown in (a) in FIG. 1, the foldable screen is symmetrically folded outward, and the first screen and the second screen of the foldable screen face away from each other. The foldable screen may be unfolded along the folding shaft in a direction shown in (a) in FIG. 1, to form a diagram of a product form shown in (b) in FIG. 1. The foldable screen may continue unfolding along the folding shaft. When the outward-folding screen is completely unfolded, a diagram of a product form shown in (c) in FIG. 1 is formed.

Optionally, a value range of a folding angle $\alpha$ between the first screen and the second screen of the foldable screen is [0°, 180°]. The folded state of the foldable screen is a state of the foldable screen when a value of the folding angle $\alpha$ falls within a value range [0, P]. The unfolded state of the foldable screen is a state the foldable screen when a value range of the folding angle $\alpha$ is [P, 180°]. Optionally, P is a preset angle threshold. For example, P may be determined based on a large quantity of use habits of using the foldable screen by a user; or P may be set by the user in the electronic device. Optionally, the preset angle threshold P may be 90°, 100°, 120°, 135°, 140°, 145°, 150°, or the like.

Optionally, when the foldable screen of the electronic device is in the folded state, the display area includes the first screen or the second screen; and when the foldable screen of the electronic device is in the unfolded state, the display area includes the first screen and the second screen. That is, the display area of the foldable screen of the electronic device in the folded state is less than the display area of the foldable screen in the unfolded state.

For example, the foldable screen in this embodiment of this application may alternatively be an inward-folding screen, and the inward-folding screen may be folded inward along a folding shaft to form a first screen and a second screen. For example, the foldable screen in this embodiment of this application may alternatively be a foldable screen with more than two folds, and correspondingly, also includes two or more folding shafts. The foldable screen may be folded along each folding shaft to form three or more screens. For example, the foldable screen in this embodiment of this application may alternatively be a roll-type foldable screen. The foldable screen may be curled along an edge of the foldable screen, and the foldable screen in a curled state may be unfolded like a picture scroll. This is not limited.

Regardless of whether the foldable screen of the electronic device is in the folded state or the unfolded state, the display area of the foldable screen of the electronic device may include a desktop workspace and a dock bar. The desktop workspace has a plurality of desktop pages, and the plurality of desktop pages may be switched for display in the desktop workspace. Optionally, different desktop pages include different service entries. The dock bar may support display of a plurality of service entries, and is relatively independent of the desktop workspace. That is, content displayed in the dock bar does not change with a desktop page switching operation input by the user for the desktop workspace. For example, when the user inputs the desktop page switching operation for the desktop workspace, the electronic device switches and displays different desktop pages in the desktop workspace, and a service entry displayed in the dock bar remains unchanged. Optionally, the dock bar may be located at any location in the display area. For example, the dock bar may be located in a lower area, an upper area, a left area, or a right area of the display area. This is not limited in this application. Optionally, the dock bar may be in any shape. For example, the dock bar may be a rectangle, a circle, a sector, or the like. This is not limited in this application. Optionally, the dock bar may be a fixed area, or may be a hidden area.

The service entry is used to access an application or a function page in an application. The service entry may include but is not limited to one or more of an application icon, a folder icon, a split-screen entry, a service widget, a link, an application page, a thumbnail, and/or a control. The application icon is used to access an application. For example, when the electronic device detects a tap operation performed on the application icon, the electronic device may access the application. The folder icon indicates one or more service entries included in a folder. For example, when the electronic device detects a tap operation performed on the folder icon, the electronic device may output and display a plurality of service entries included in the folder. The split-screen entry is used to allow a plurality of applications to access a split-screen page, and can trigger the plurality of applications to enter a split-screen mode. The service widget is used to provide access to a function page in a system or an application, for example, a function page of "Voice assistant", or a function page such as "Add a friend" or "Scan" in an instant messaging application. The link is used to quickly access a page. For example, the user may quickly access a corresponding page by using a uniform resource locator (URL). The application page is used to access an application page. For example, when the electronic device detects a tap operation performed on the application page, the electronic device may access the application page. The thumbnail is used to quickly view the application page. For example, when the electronic device detects a tap operation performed on the thumbnail, the electronic device can view page content without accessing the application page. The control is used to access a function page of a shortcut operation. For example, the control may be used to access a function page for adding "Note", access a function page for adding "Read later", and access a function page for "Quick sharing".

Figure 2A:
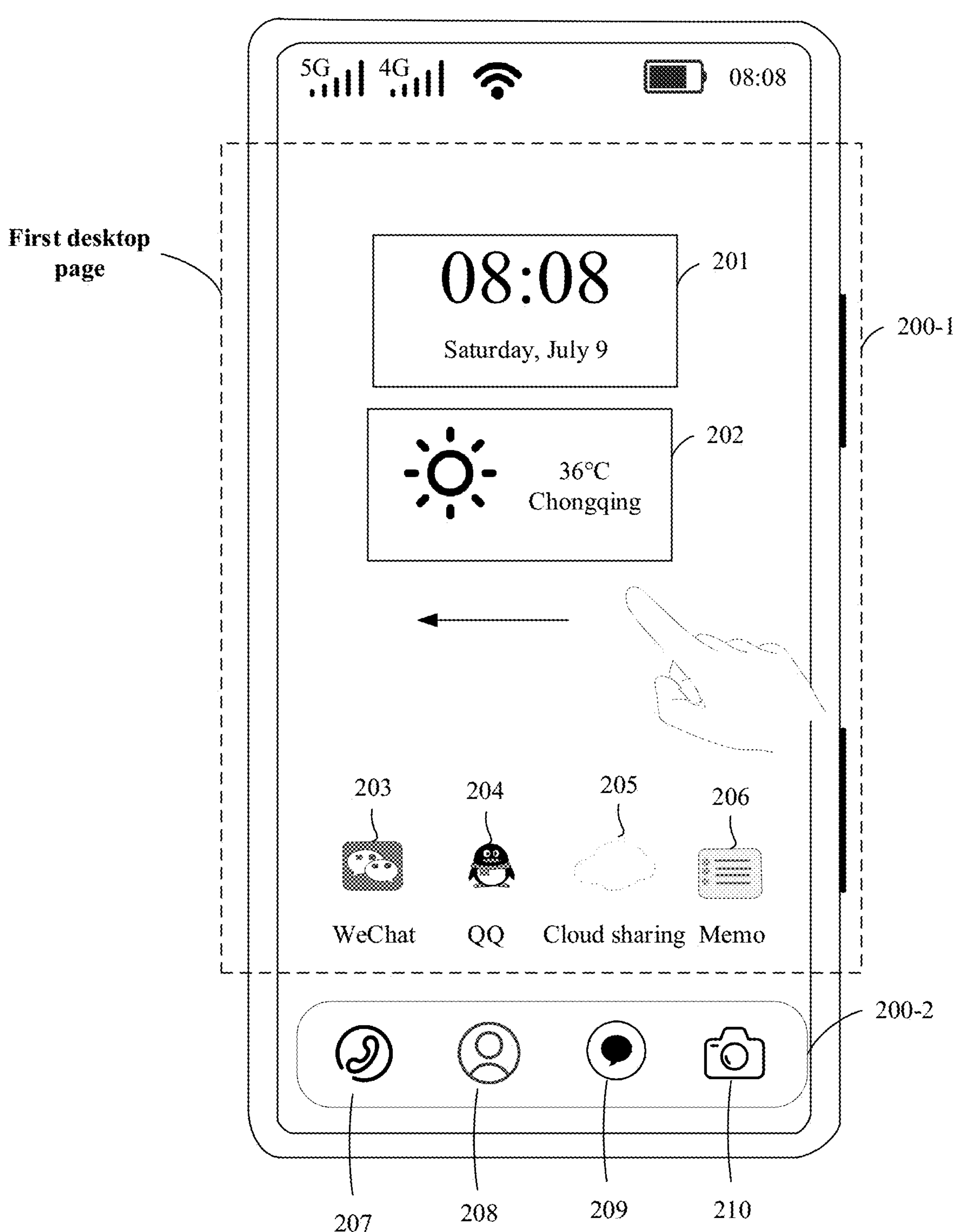
FIG. 2A and FIG. 2B are a diagram of interfaces of a display method for a foldable screen according to an embodiment of this application.
Figure 2B:
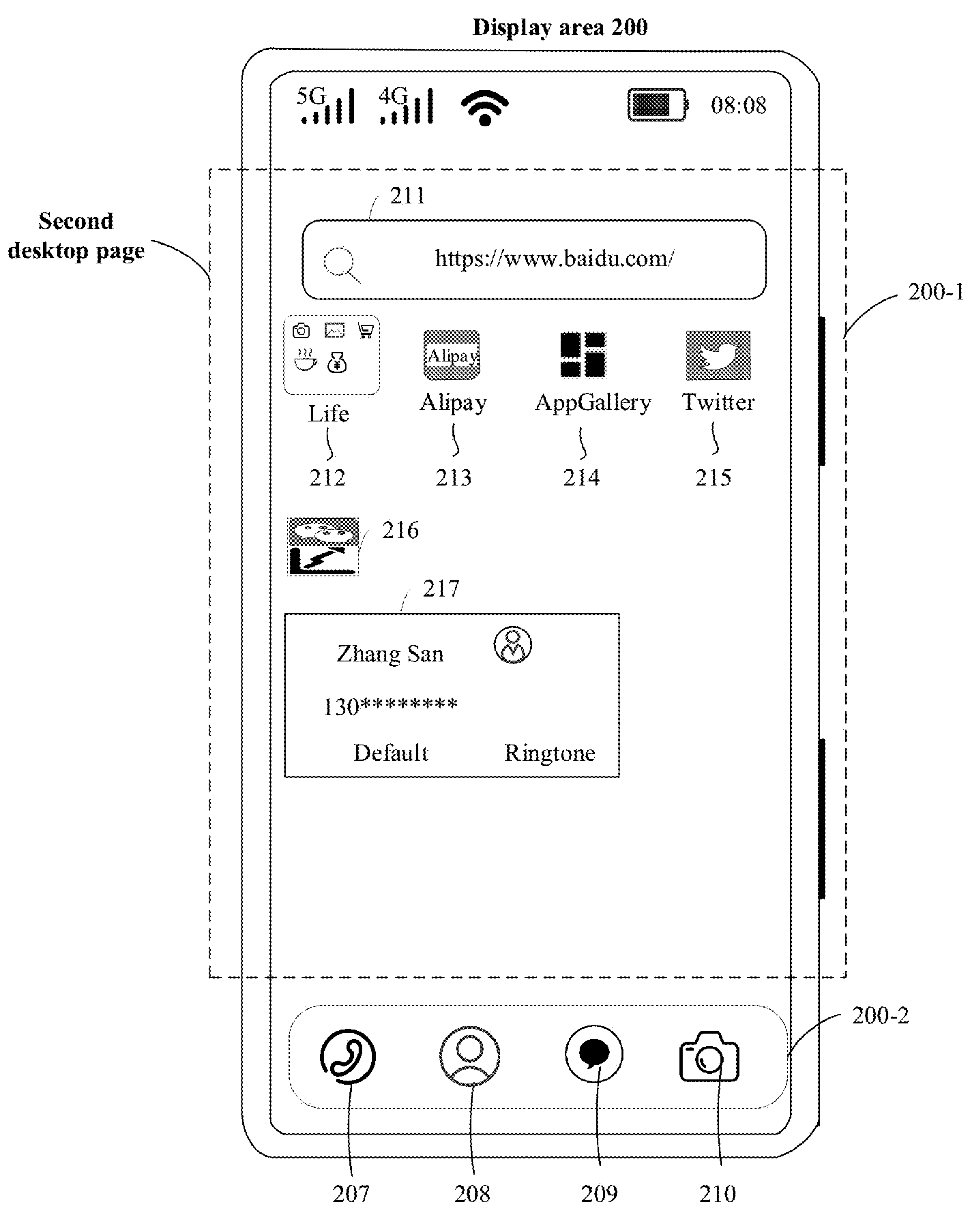

For example, as shown in FIG. 2A and FIG. 2B, the foldable screen of the electronic device is in the folded state. A display area 200 of the foldable screen may include a desktop workspace 200-1 and a dock bar 200-2. For example, the dock bar 200-2 is located in a lower area of the display area 200. The desktop workspace 200-1 has a first desktop page and a second desktop page. When the electronic device displays the first desktop page in the desktop workspace 200-1, the first desktop page includes a calendar indication service widget 201, a weather indication service widget 202, an application icon 203, an application icon 204, an application icon 205, and an application icon 206. When the electronic device receives a touch operation (a leftward sliding operation is used as an example in FIG. 2A and FIG. 2B) that is input for the desktop workspace 200-1, the electronic device may switch the desktop workspace 200-1 from the first desktop page to the second desktop page for display. The second desktop page may include a link 211, a folder icon 212, an application icon 213, an application icon 214, an application icon 215, a split-screen entry 216, and a thumbnail 217. When the electronic device switches the desktop workspace 200-1 from the first desktop page to the second desktop page for display, service entries displayed in the dock bar 200-2 remain unchanged. As shown in FIG. 2A and FIG. 2B, when the electronic device displays the first desktop page in the desktop workspace 200-1 and when the electronic device displays the second desktop page, the dock bar 200-2 always displays an application icon 207, an application icon 208, an application icon 209, and an application icon 210.

In this application, for ease of description, a dock bar in the display area when the foldable screen of the electronic device is in the folded state is referred to as a first dock bar, and a dock bar in the display area when the foldable screen of the electronic device is in the unfolded state is referred to as a second dock bar.

Embodiments of this application provide a display method for a foldable screen, so that a display area obtained by unfolding the foldable screen can be fully used to display more content, thereby effectively improving utilization of the display area and further improving user experience. The following describes the display method for a foldable screen with reference to the accompanying drawings.

1. A quantity of service entries in a second group of service entries displayed in a second dock bar is greater than a quantity of service entries in a first group of service entries displayed in a first dock bar.

In other words, the first group of service entries are displayed in the first dock bar when an electronic device detects that the foldable screen is in a folded state. The second group of service entries are displayed in the second dock bar when the electronic device detects that the foldable screen is in an unfolded state. A quantity of service entries in the second group of service entries is greater than a quantity of service entries in the first group of service entries.

Figures 1, 3A:
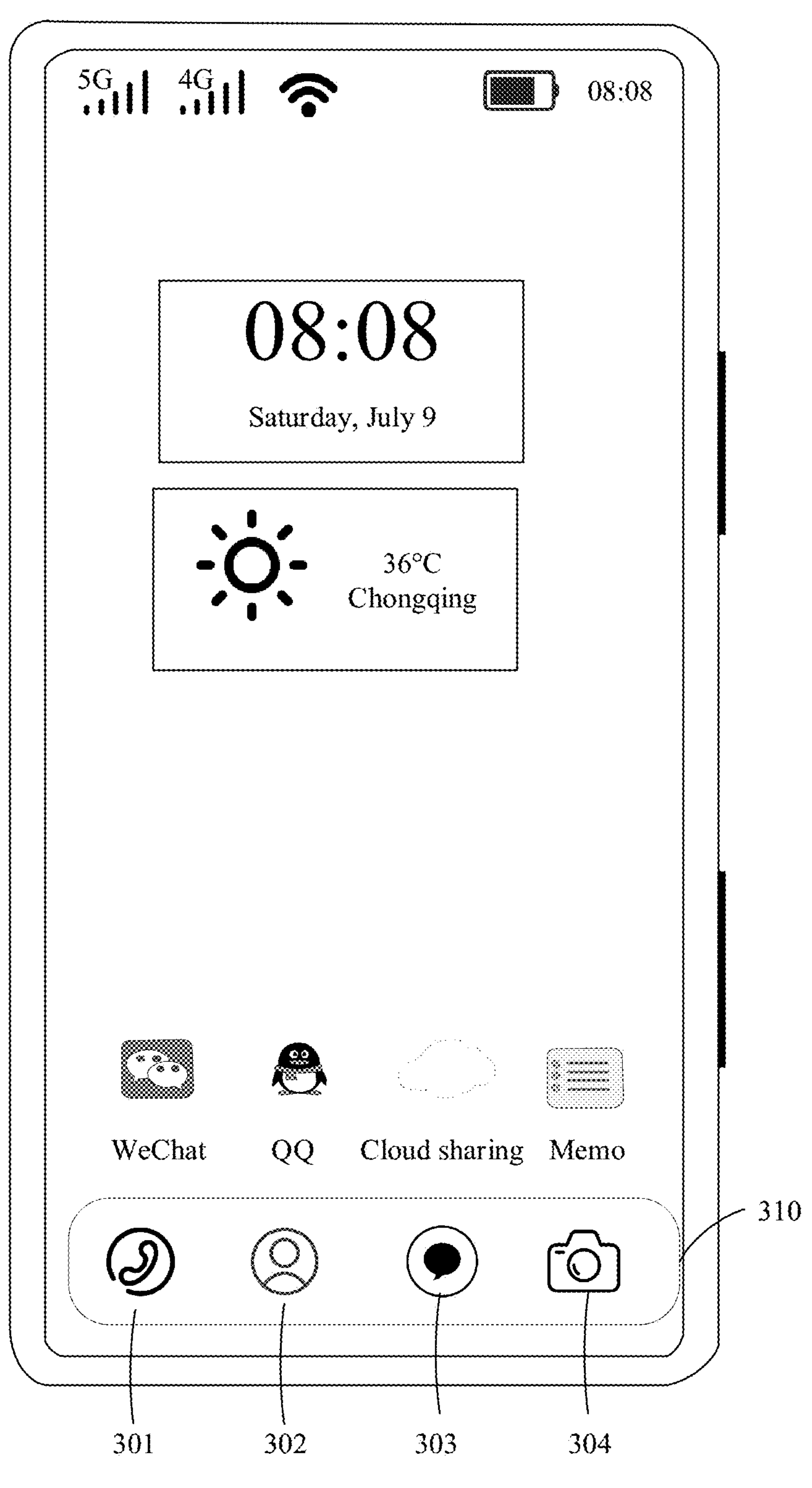
Figures 2, 3A:

For example, as shown in FIG. 3A-1, when the electronic device detects that the foldable screen is in the folded state, the display area of the foldable screen may include a first dock bar 310, and a first group of service entries are displayed in the first dock bar 310. The first group of service entries include an application icon 301, an application icon 302, an application icon 303, and an application icon 304. The quantity of service entries in the first group of service entries is 4. As shown in FIG. 3A-2, when the electronic device detects that the foldable screen is in the unfolded state, the display area of the foldable screen may include a second dock bar 320, and a second group of service entries are displayed in the second dock bar 320. The second group of service entries include the application icon 301, the application icon 302, the application icon 303, the application icon 304, an application icon 305, an application icon 306, an application icon 307, and an application icon 308. The quantity of service entries in the second group of service entries is 8. That is, the quantity of service entries in the second group of service entries displayed in the second dock bar 320 is greater than the quantity of service entries in the first group of service entries displayed in the first dock bar 310.

Figures 1, 3B:
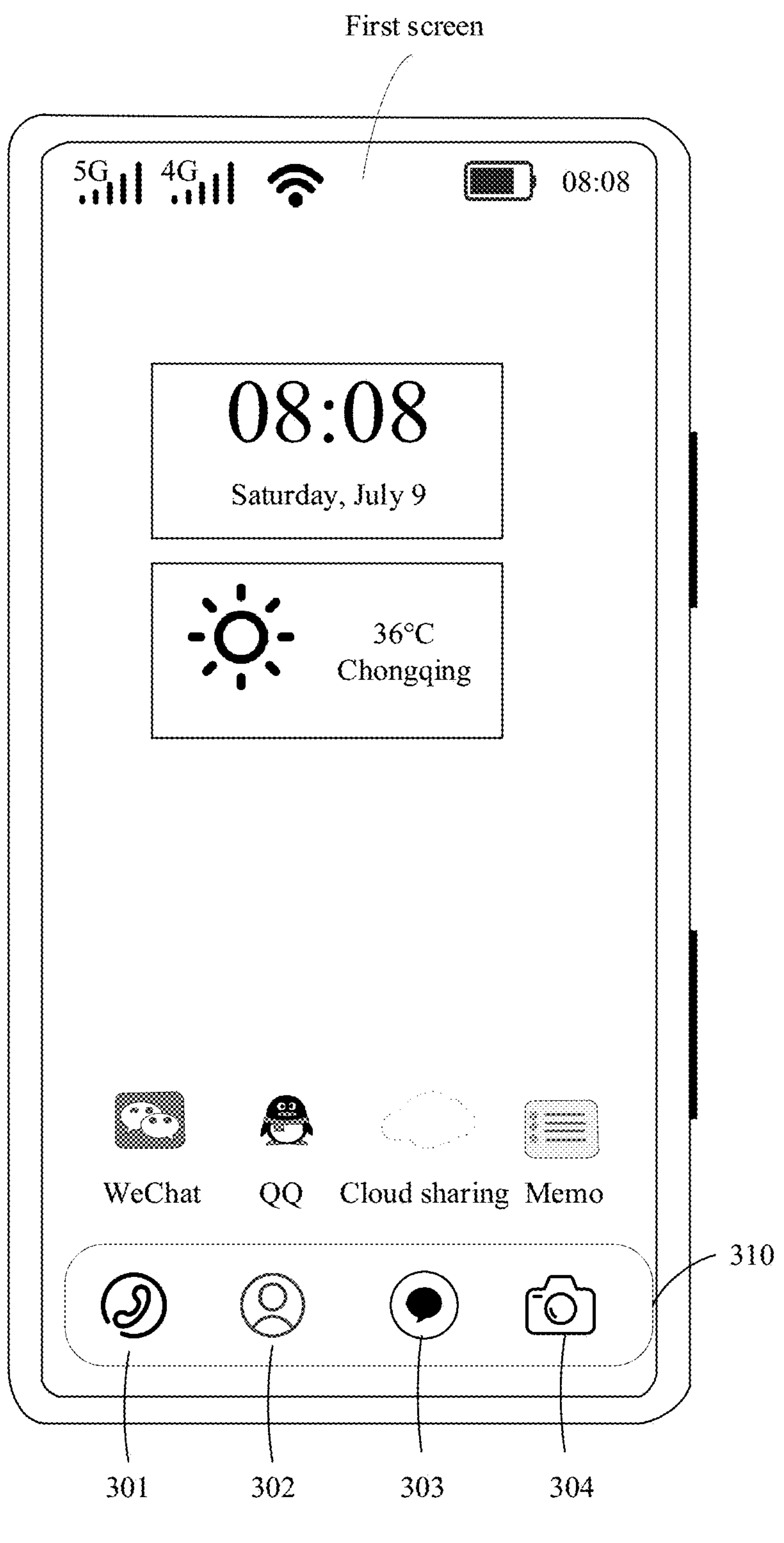
Figures 2, 3B:
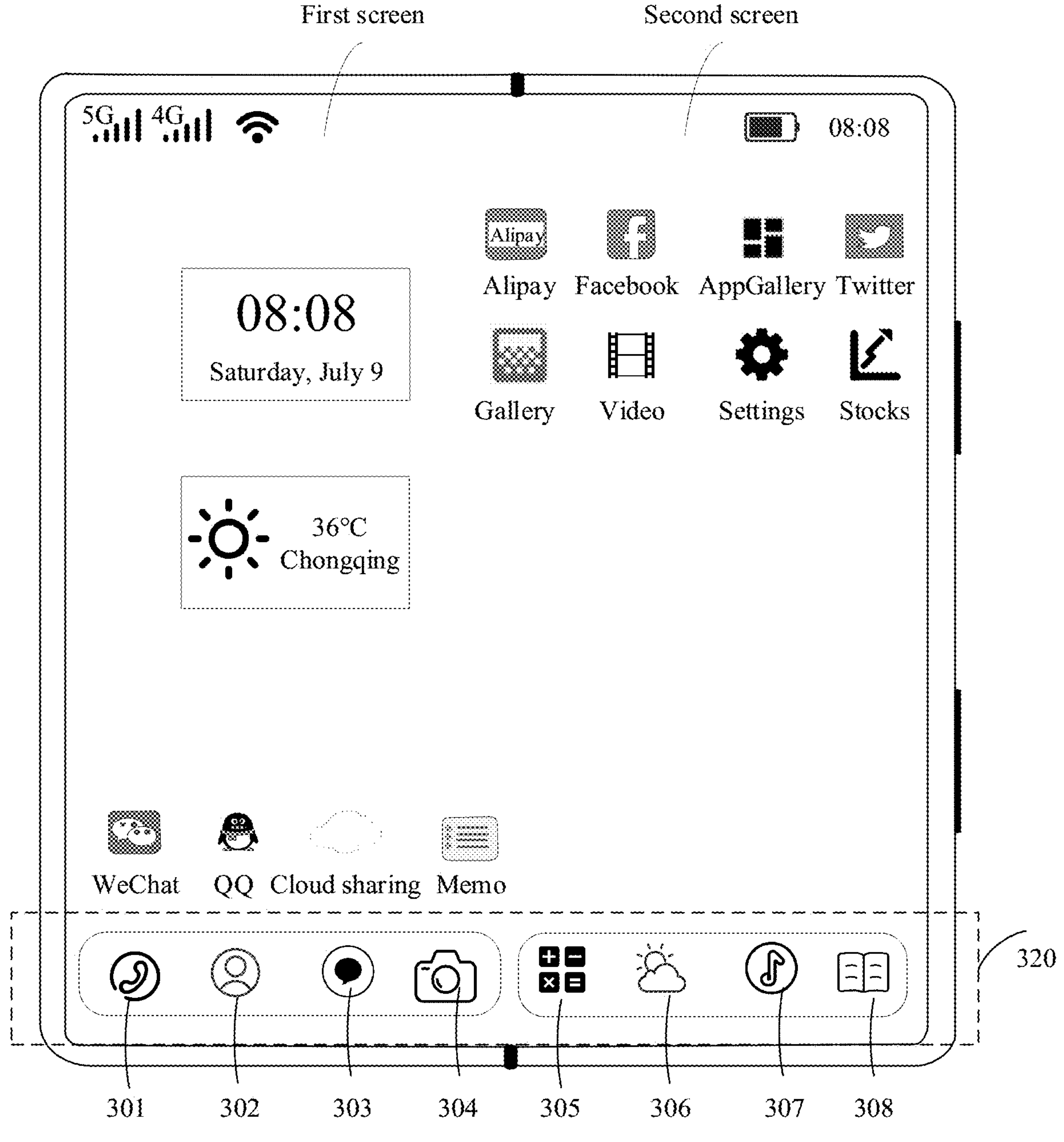

Optionally, the foldable screen includes at least a first screen and a second screen, the first group of service entries are displayed entirely on the first screen, and the second group of service entries are displayed partially on the first screen and displayed partially on the second screen. For example, in FIG. 3B-1 and FIG. 3B-2, the foldable screen includes the first screen and the second screen. Application icons 301 to 304 in the first group of service entries are displayed entirely on the first screen, and the application icons 301 to 304 in the second group of service entries are displayed on the first screen, and application icons 305 to 308 are displayed on the second screen.

It can be learned that when the foldable screen of the electronic device changes from the folded state to the unfolded state, the second dock bar in a display area obtained by unfolding the foldable screen can be fully used to display more service entries so that search operations can be reduced, which helps a user to quickly access or start more services and effectively improves utilization of the second dock bar, thereby effectively improving utilization of the display area and further improving user experience.

1.1. The second group of service entries includes some or all service entries in the first group of service entries, and the second group of service entries further includes another service entry. The another service entry includes any one or more of the following: a service entry determined based on historical usage data of each service entry in the electronic device; a service entry determined based on a folder in the first group of service entries; or a service entry preset by the user.

Figures 1, 4A:
Figures 2, 4A:
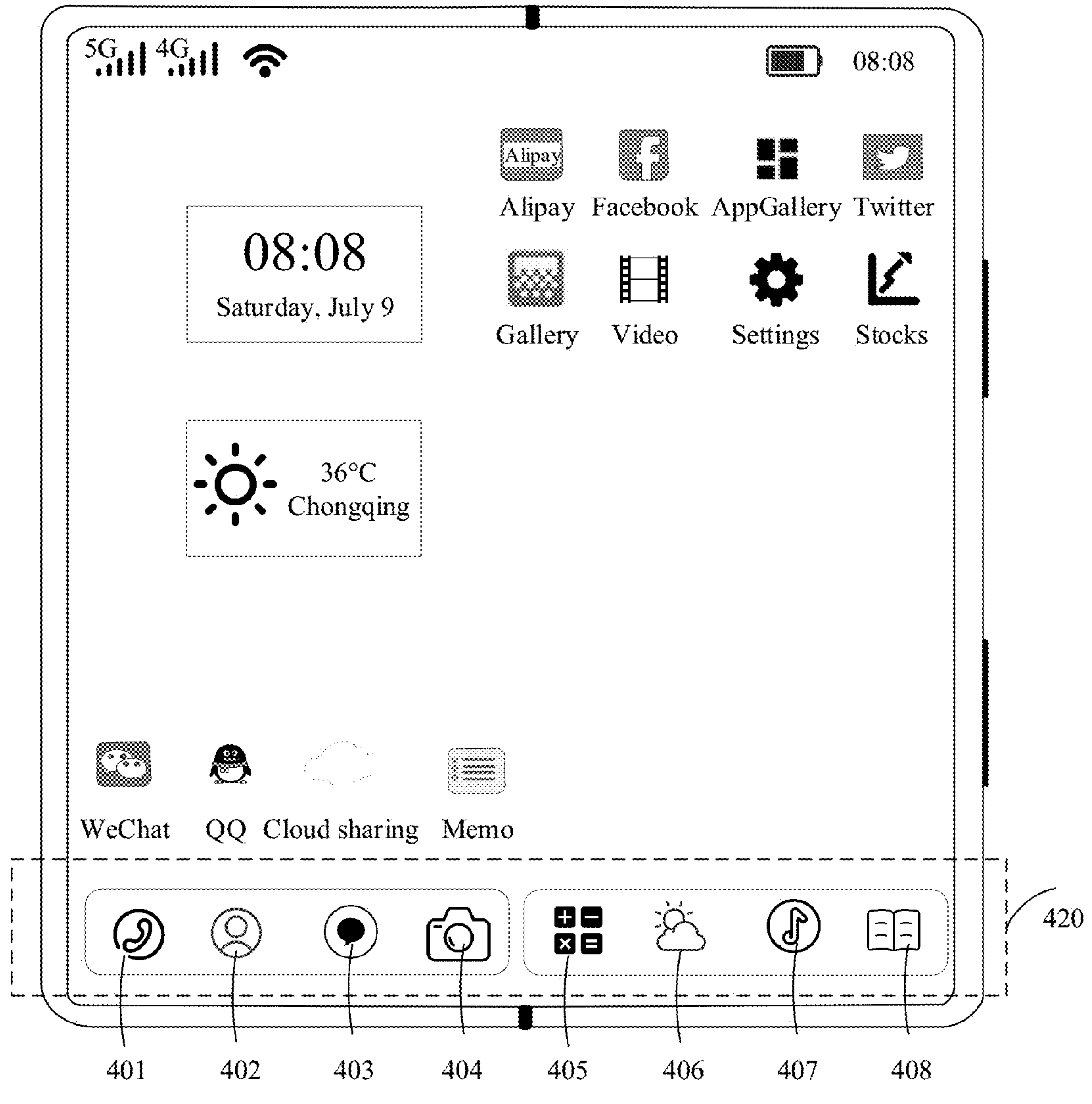

FIG. 4A-1 and FIG. 4A-2 are described by using an example in which the another service entry includes the service entry determined based on the historical usage data of each service entry in the electronic device. As shown in FIG. 4A-2, a second group of service entries displayed in a second dock bar 420 include an application icon 401, an application icon 402, an application icon 403, an application icon 404, an application icon 405, an application icon 406, an application icon 407, and an application icon 408. Application icons 401 to 404 are service entries in the first group of service entries displayed in a first dock bar 410, and application icons 405 to 408 are service entries determined based on the historical usage data of each service entry in the electronic device.

Optionally, the historical usage data includes one or more of the following: (1) a quantity of open times in a recent period of time (for example, application icons of P applications that are opened most frequently in a recent period of time are used as the another service entry); (2) open duration in a recent period of time (for example, application icons of P applications that are opened for longest duration in a recent period of time are used as the another service entry); (3) most recent open time (for example, application icons of P applications whose open time is closest to a current time are used as the another service entry); (4) a use location (for example, a service entry frequently used by the user at a current location is used as the another service entry); and (5) a scenario mode (for example, a service entry frequently used by the user in a current scenario mode is used as the another service entry). P is a positive integer.

In this implementation, because the service entry determined based on the historical usage data is a service entry frequently used or recently used by the user, search operations of the user can be reduced, so that the user quickly accesses or starts a corresponding service, thereby improving user experience.

Figures 1, 4B:
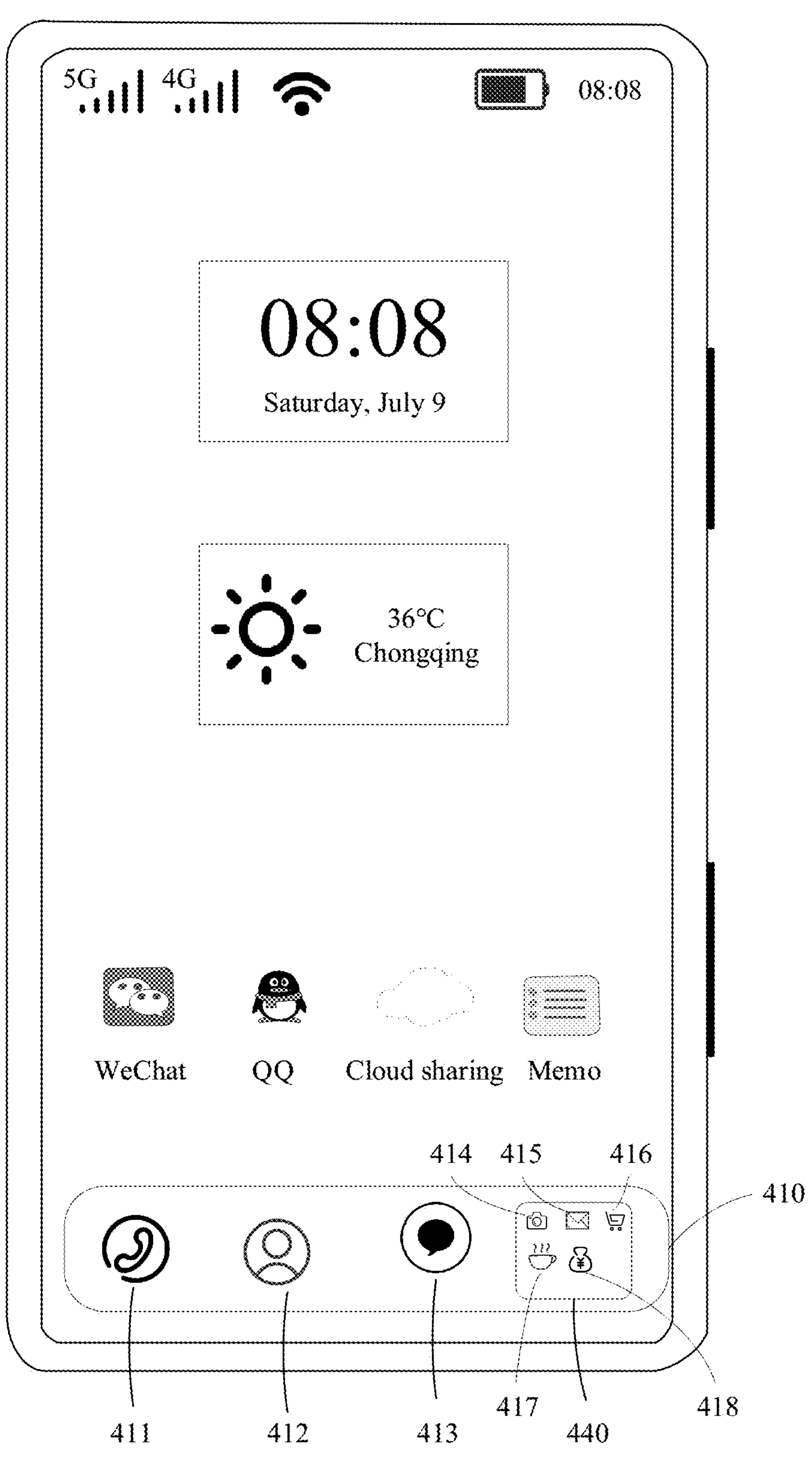
Figures 2, 4B:
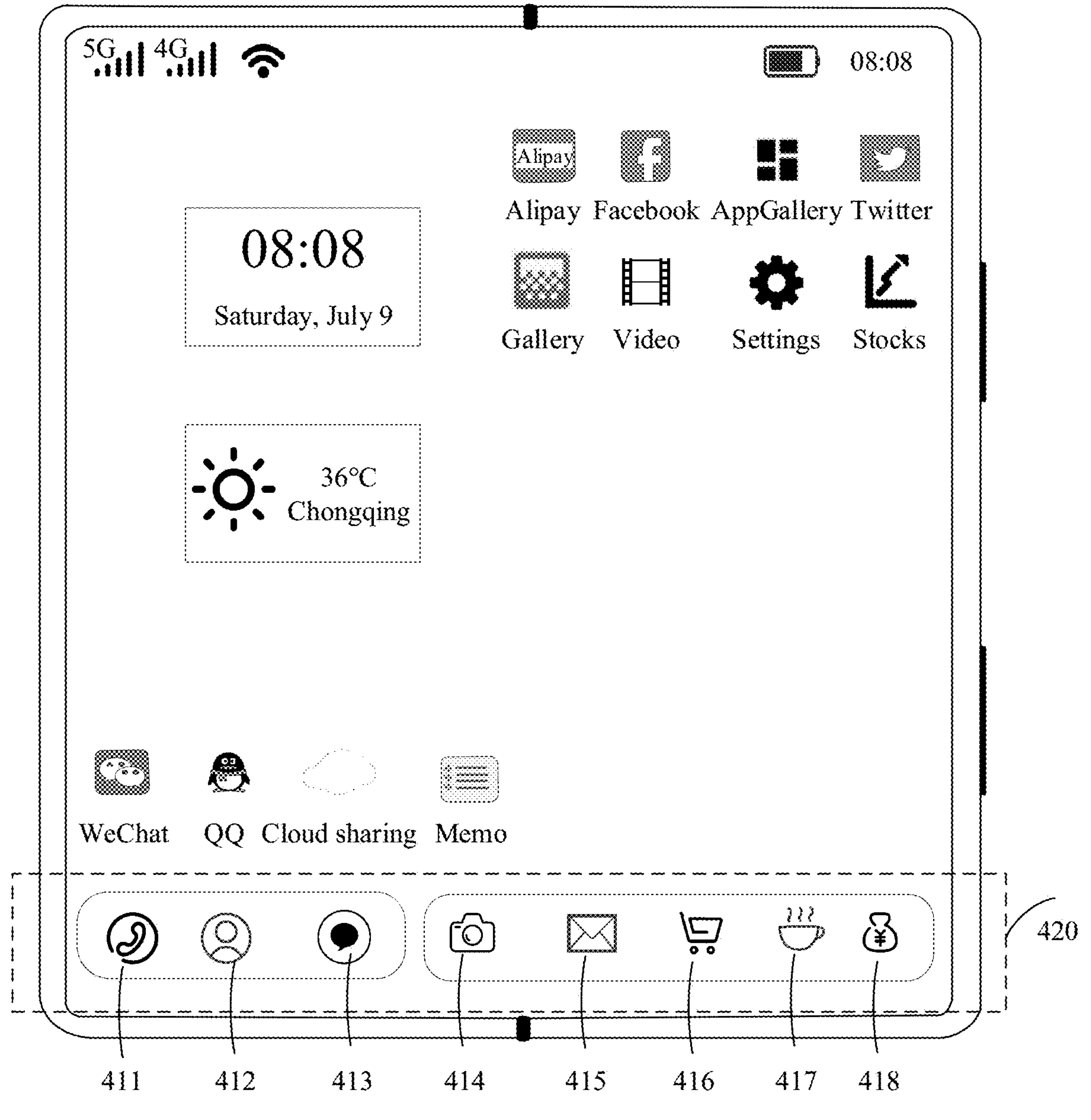

FIG. 4B-1 and FIG. 4B-2 are described by using an example in which the another service entry includes the service entry determined based on the folder in the first group of service entries. As shown in FIG. 4B-2, the second group of service entries displayed in the second dock bar 420 include an application icon 411, an application icon 412, an application icon 413, an application icon 414, an application icon 415, an application icon 416, an application icon 417, and an application icon 418. Application icons 411 to 413 are service entries in the first group of service entries displayed in the first dock bar 410, and application icons 414 to 418 are service entries determined based on the folder in the first group of service entries.

It can be learned that in this implementation, the electronic device may display, in the second dock bar, a service entry included in the folder without a plurality of operations, so that the user quickly accesses the service entry included in the folder, thereby improving user experience.

Figures 1, 4C:
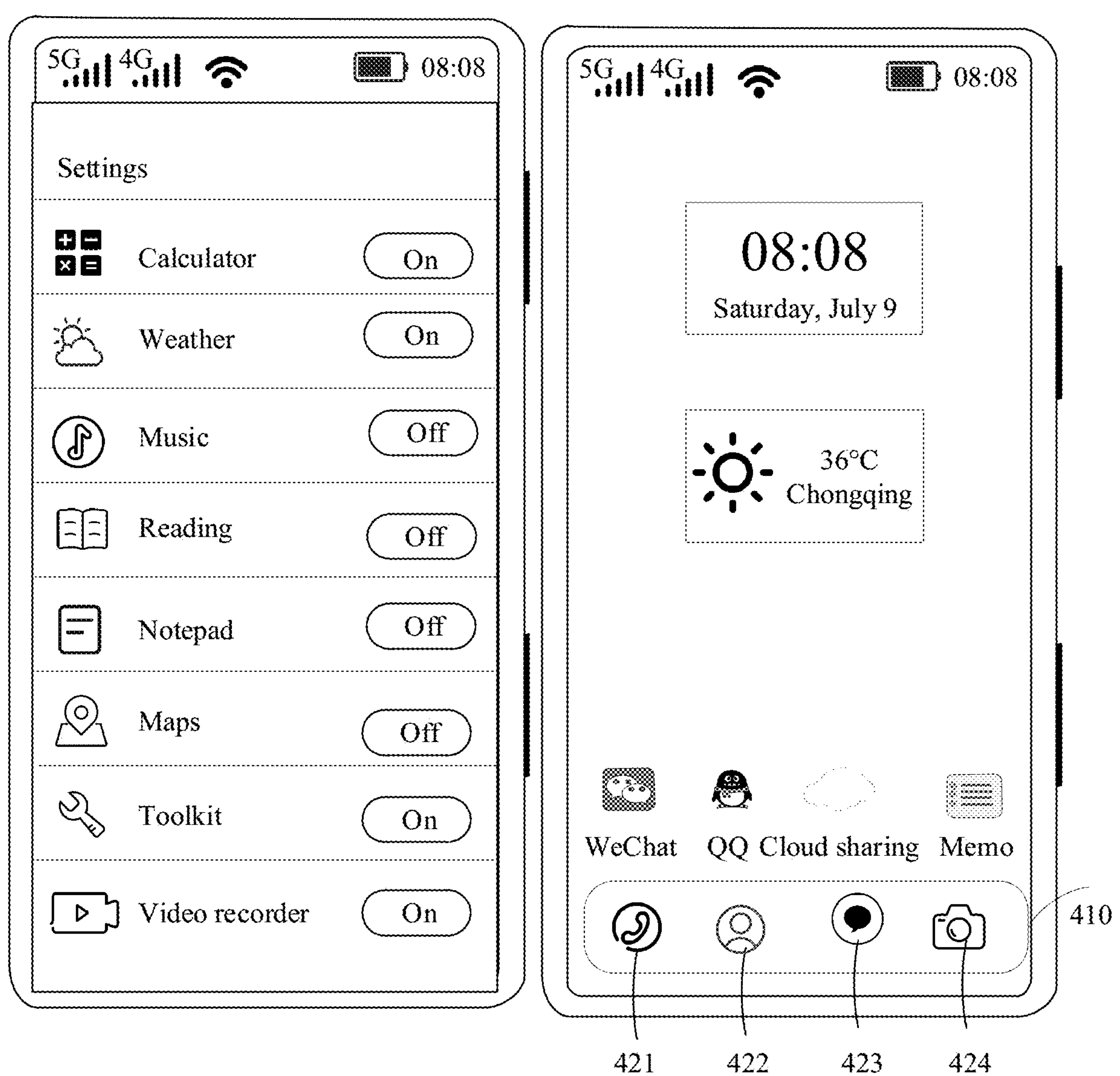
Figures 2, 4C:
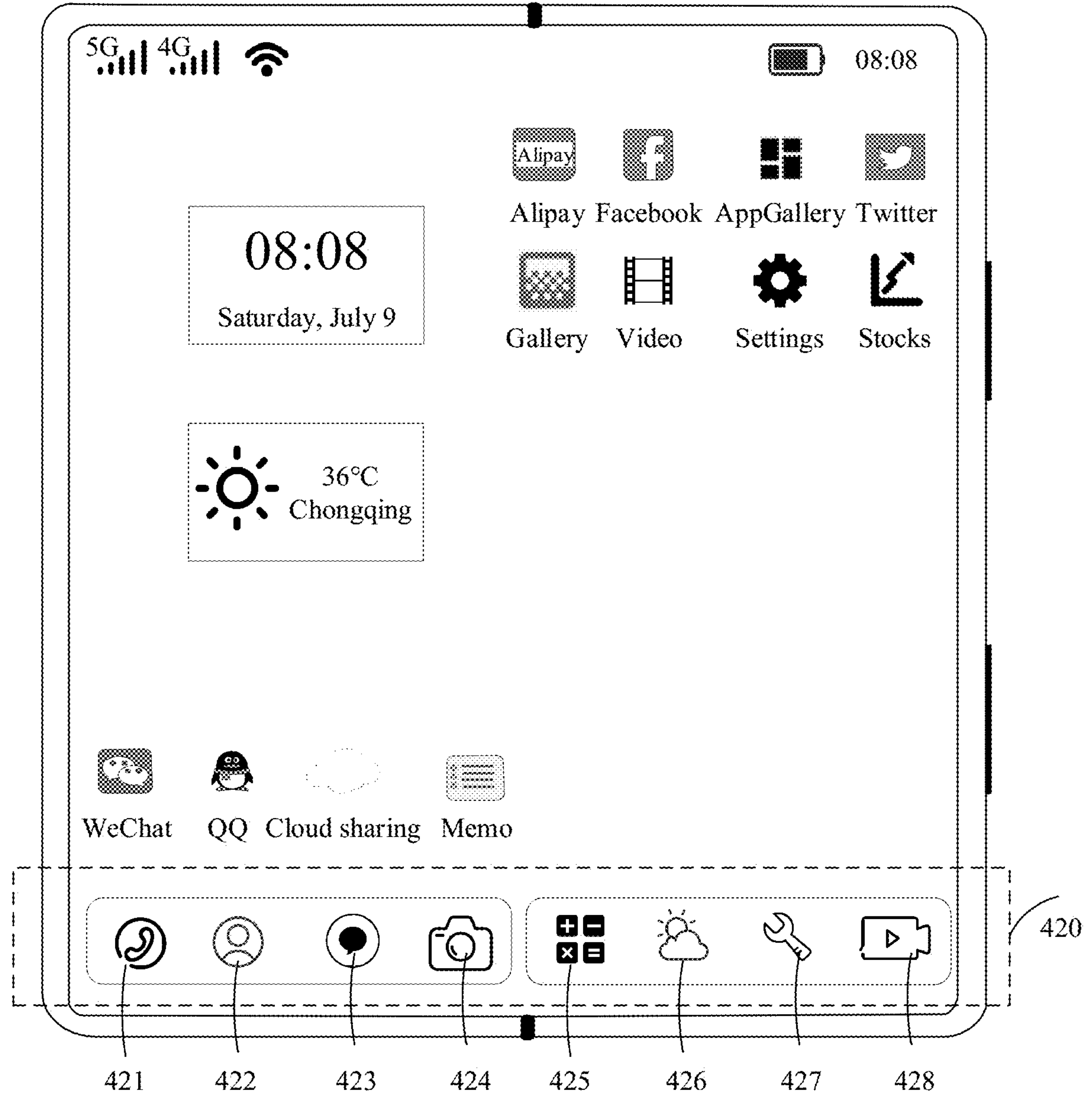

FIG. 4C-1 and FIG. 4C-2 are described by using an example in which the another service entry includes the service entry preset by the user. As shown in FIG. 4C-1, the user may preset, on a page 400, an application icon of "Calculator", an application icon of "Weather", an application icon of "Toolkit", and an application icon of "Video recorder" as the another service entry. As shown in FIG. 4C-2, when the electronic device detects that the foldable screen is in the unfolded state, the second group of service entries displayed in the second dock bar 420 include an application icon 421, an application icon 422, an application icon 423, an application icon 424, an application icon 425, an application icon 426, an application icon 427, and an application icon 428. Application icons 421 to 424 are service entries in the first group of service entries displayed in the first dock bar 410, and application icons 425 to 428 are service entries preset by the user. The example is merely used to explain this application, and shall not constitute a limitation. A policy for setting a service entry by the user is not limited herein.

It can be learned that in this implementation, the electronic device may display, in the second dock bar, the service entry preset by the user, which is more in line with a user habit, so that the user quickly accesses the preset service entry, thereby improving user experience.

Figure 4D:
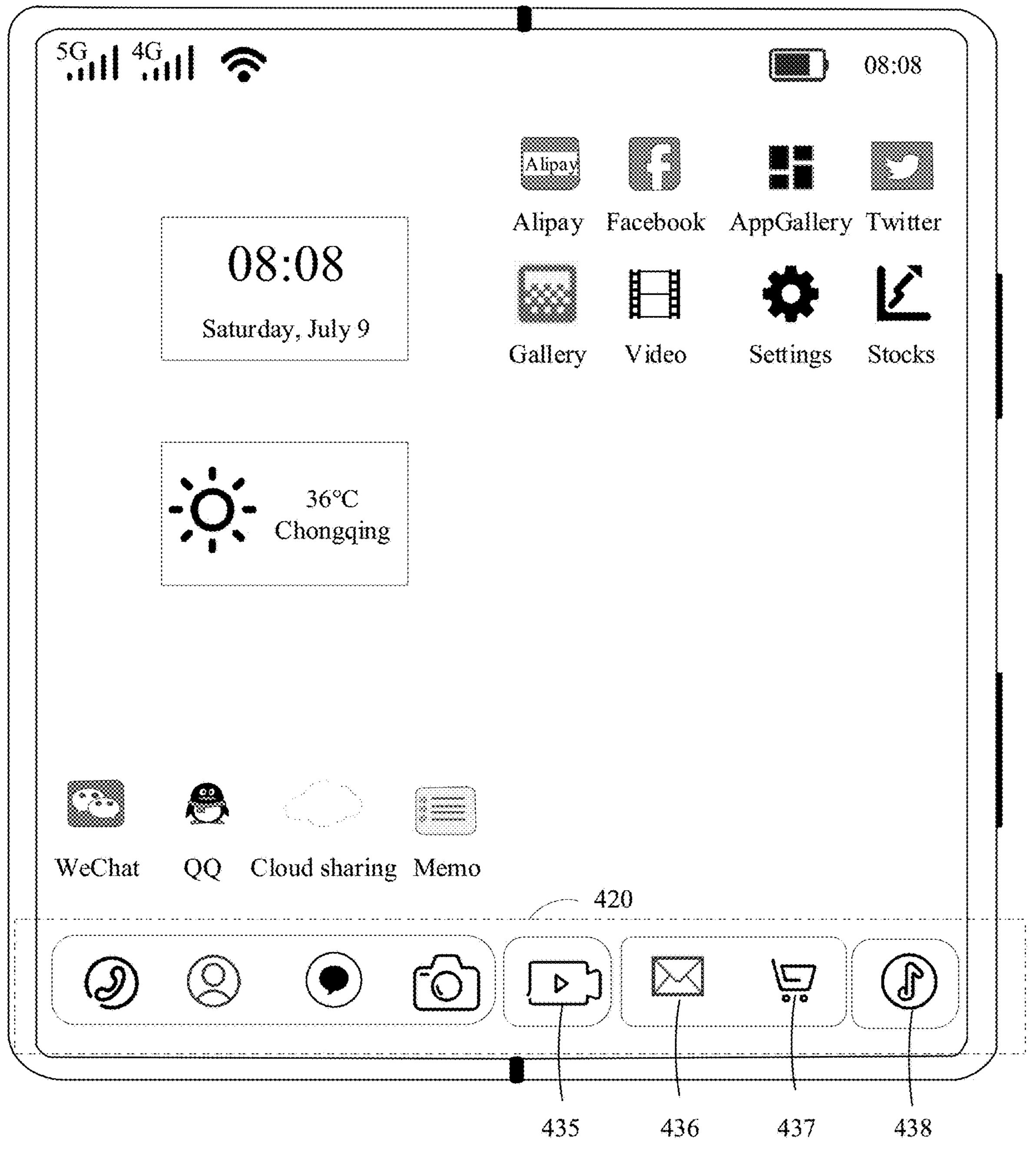

Optionally, different service entries are arranged and displayed in different orders in the second dock bar. For example, an arrangement and display order of the foregoing three service entries in the second dock bar is sequentially as follows: the service entry preset by the user, the service entry determined based on the folder in the first group of service entries, and the service entry determined based on the historical usage data of each service entry in the electronic device. As shown in FIG. 4D, when an application icon 435 is the service entry preset by the user, an application icon 436 and an application icon 437 are service entries determined based on the folder in the first group of service entries, and an application icon 438 is the service entry determined based on the historical usage data of each service entry in the electronic device, an arrangement and display order of application icons 435 to 438 in the second dock bar 420 is sequentially the application icon 435, the application icon 436, the application icon 437, and the application icon 438.

It can be learned that the electronic device may display, in the second dock bar, one or more of the service entry determined based on the historical usage data of each service entry in the electronic device, the service entry determined based on the folder in the first group of service entries, and the service entry preset by the user. The service entry displayed in the second dock bar is flexible.

In an optional implementation, the second dock bar includes a first sub-area and a second sub-area. The first sub-area is used to display some or all service entries in the first group of service entries, and the second sub-area is used to display the another service entry.

The following is described by using an example in which the another service entry includes the service entry determined based on the historical usage data of each service entry in the electronic device.

Figures 1, 5A:
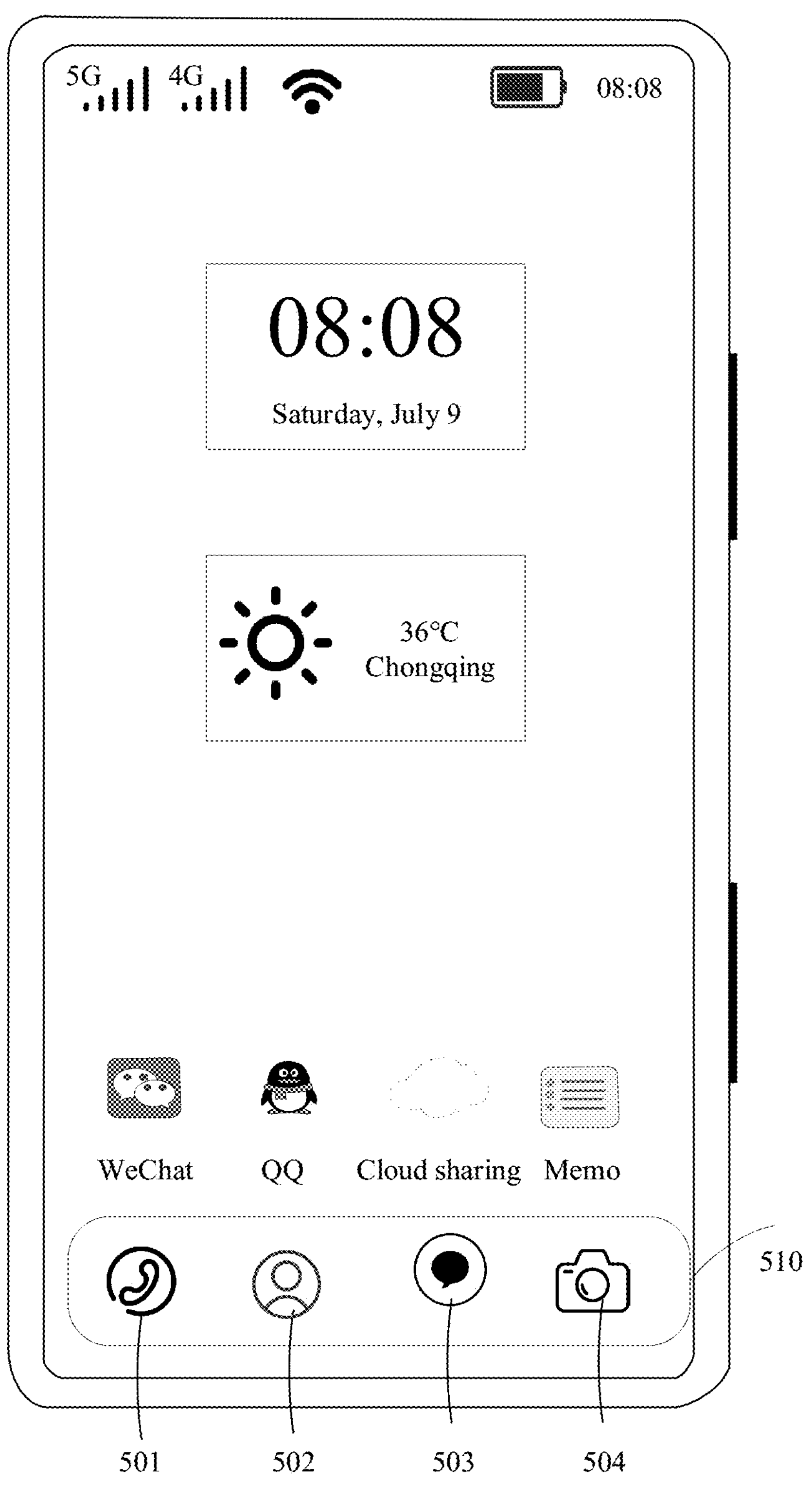
Figures 2, 5A:
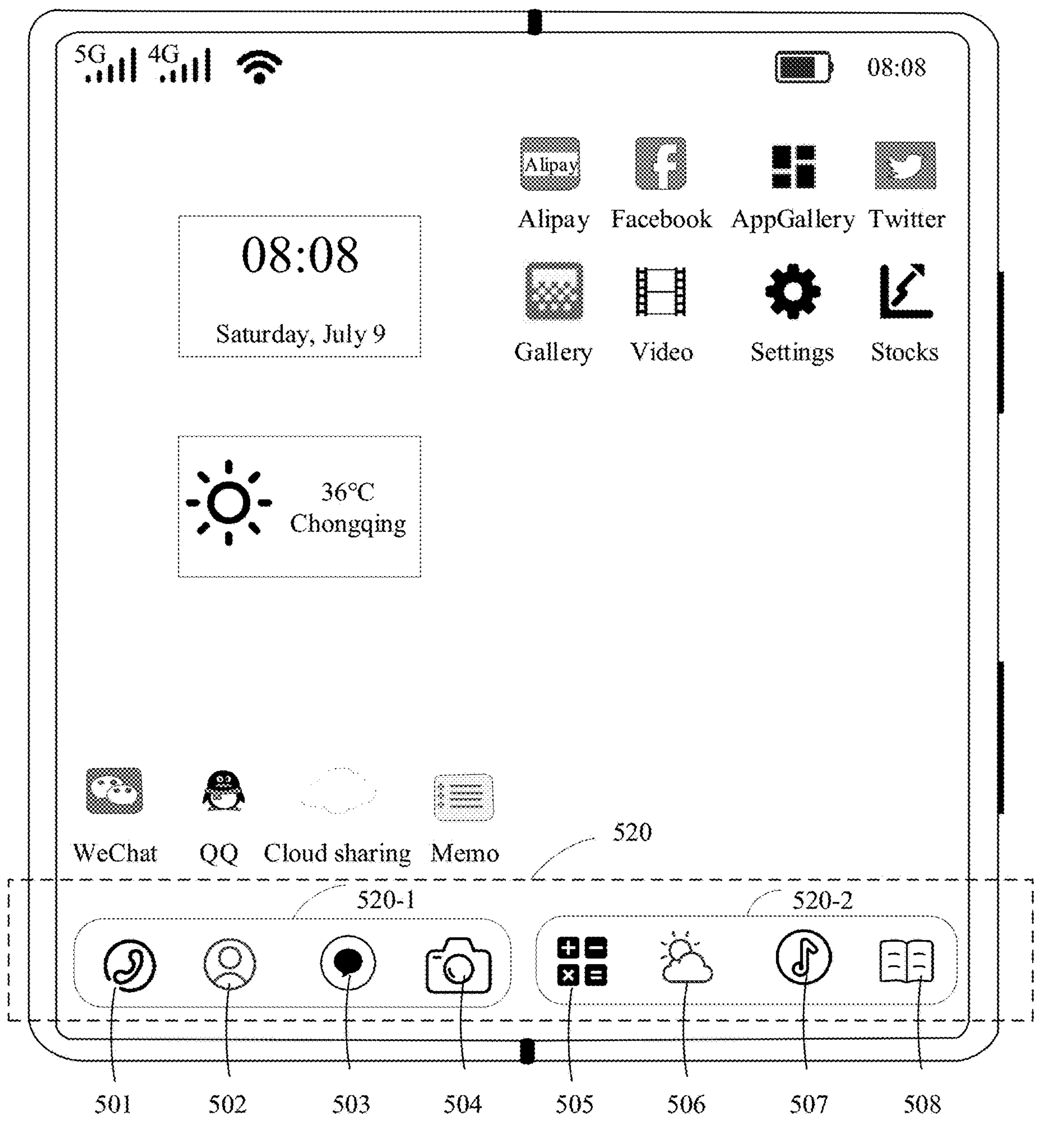

As shown in FIG. 5A-1 and FIG. 5A-2, a second dock bar 520 may include a first sub-area 520-1 and a second sub-area 520-2. The first sub-area 520-1 is used to display an application icon 501, an application icon 502, an application icon 503, and an application icon 504 in the first group of service entries. In other words, application icons 501 to 504 in the first sub-area 520-1 are the first group of service entries displayed in the first dock bar 510. The second sub-area 520-2 is used to display an application icon 505, an application icon 506, an application icon 507, and an application icon 508 that are determined based on the historical usage data of each service entry in the electronic device.

Optionally, a quantity of service entries in the second sub-area is related to a size of the second sub-area.

Figures 1, 5B:
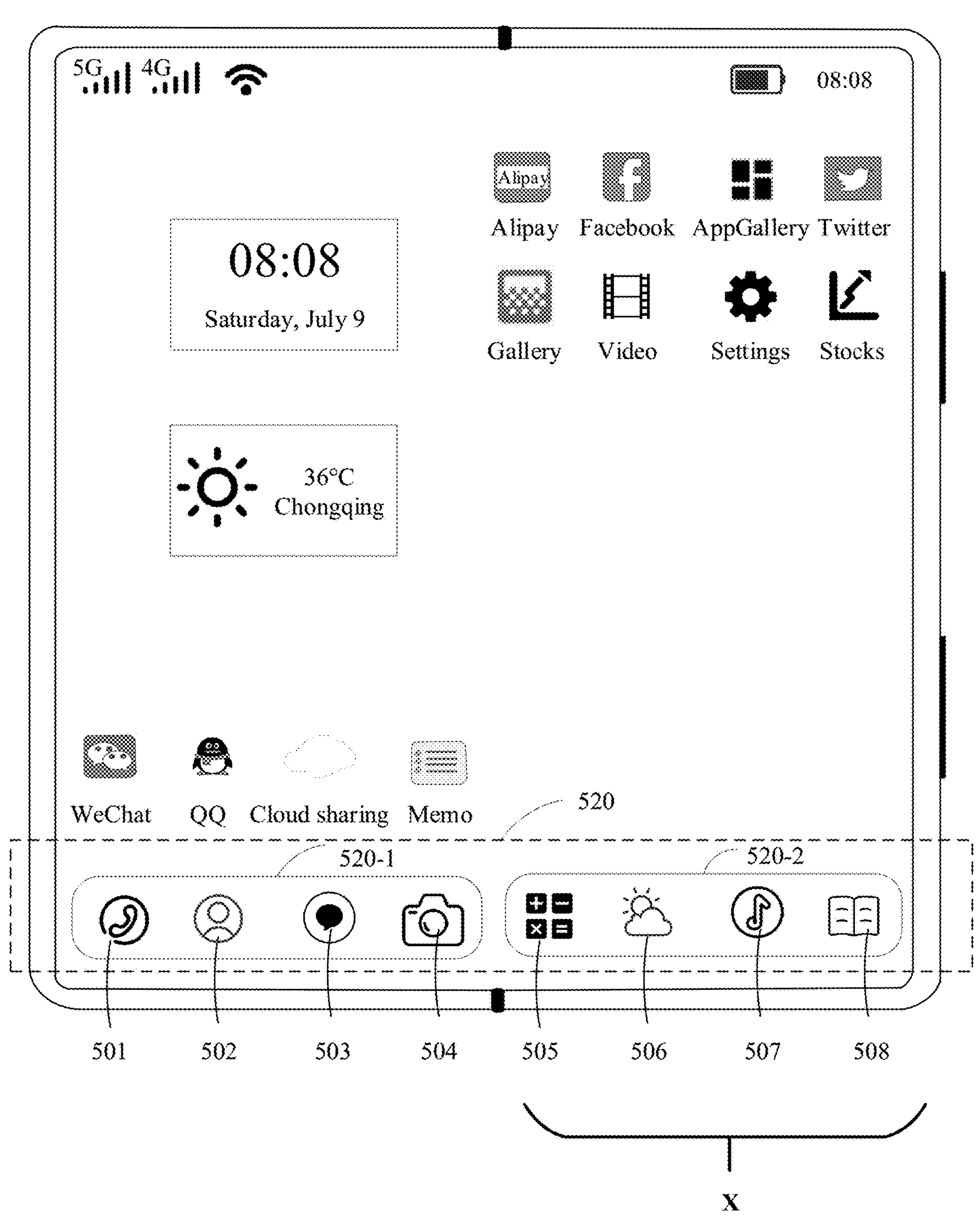
Figures 2, 5B:
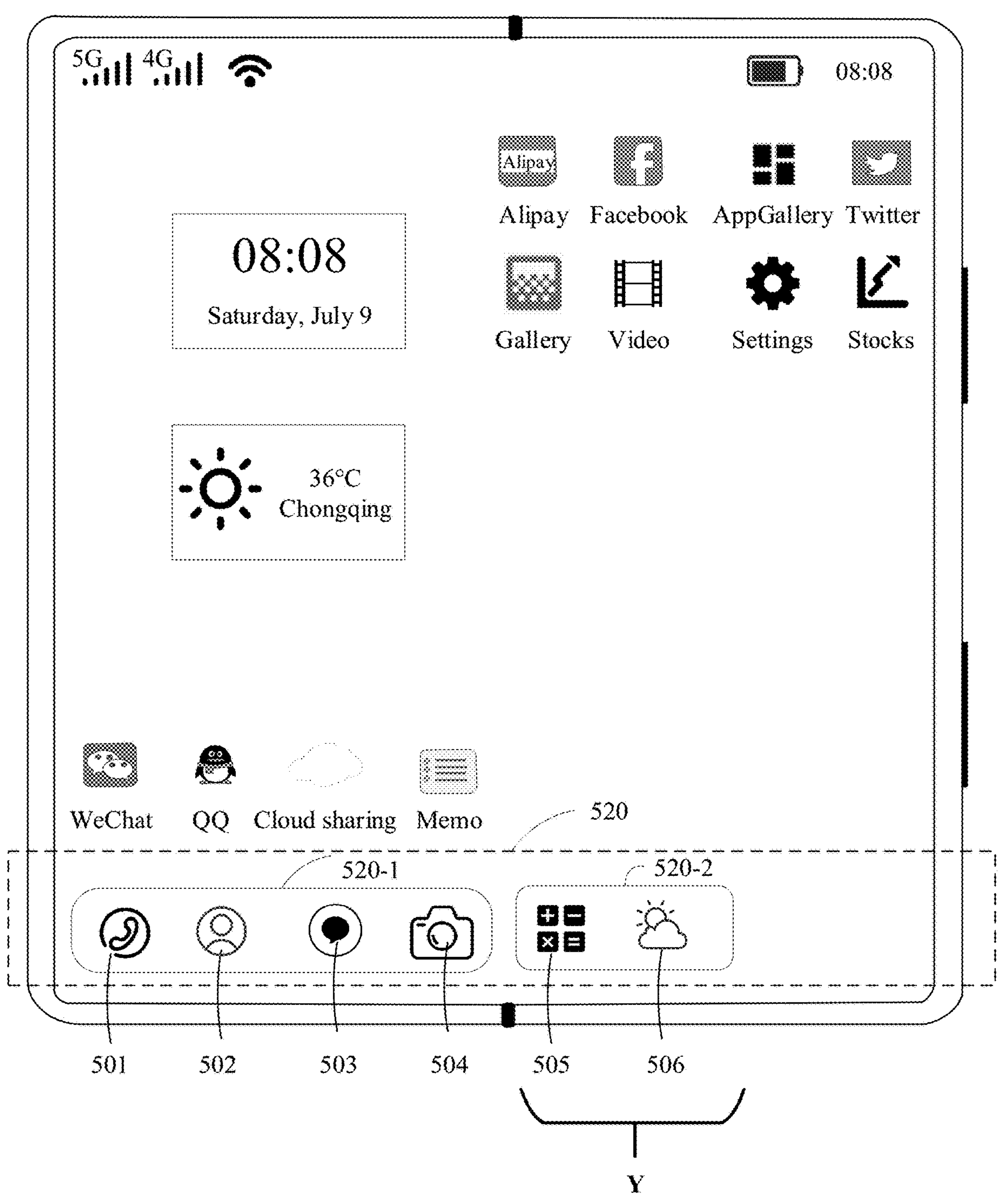

FIG. 5B-1 and FIG. 5B-2 are described by using second sub-areas of different sizes as an example. As shown in FIG. 5B-1, when a size of the second sub-area is X centimeters, the application icon 505, the application icon 506, the application icon 507, and the application icon 508 are displayed in the second sub-area 520-2, and a quantity of service entries in the second sub-area is 4. As shown in FIG. 5B-2, when a size of the second sub-area is Y centimeters, the application icon 505 and the application icon 506 are displayed in the second sub-area 520-2, and the quantity of service entries in the second sub-area is 2. X and Y are positive numbers.

Optionally, the size of the second sub-area may be set by a system of the electronic device by default. For example, when the electronic device detects that the foldable screen is in the unfolded state, the system of the electronic device sets the size of the second sub-area to X centimeters by default.

Optionally, the size of the second sub-area may alternatively be determined based on an input operation of the user. For example, FIG. 5C-1 to FIG. 5D-2 show two implementations in which the user adjusts the size of the second sub-area by performing an input operation.

Figures 1, 5C:
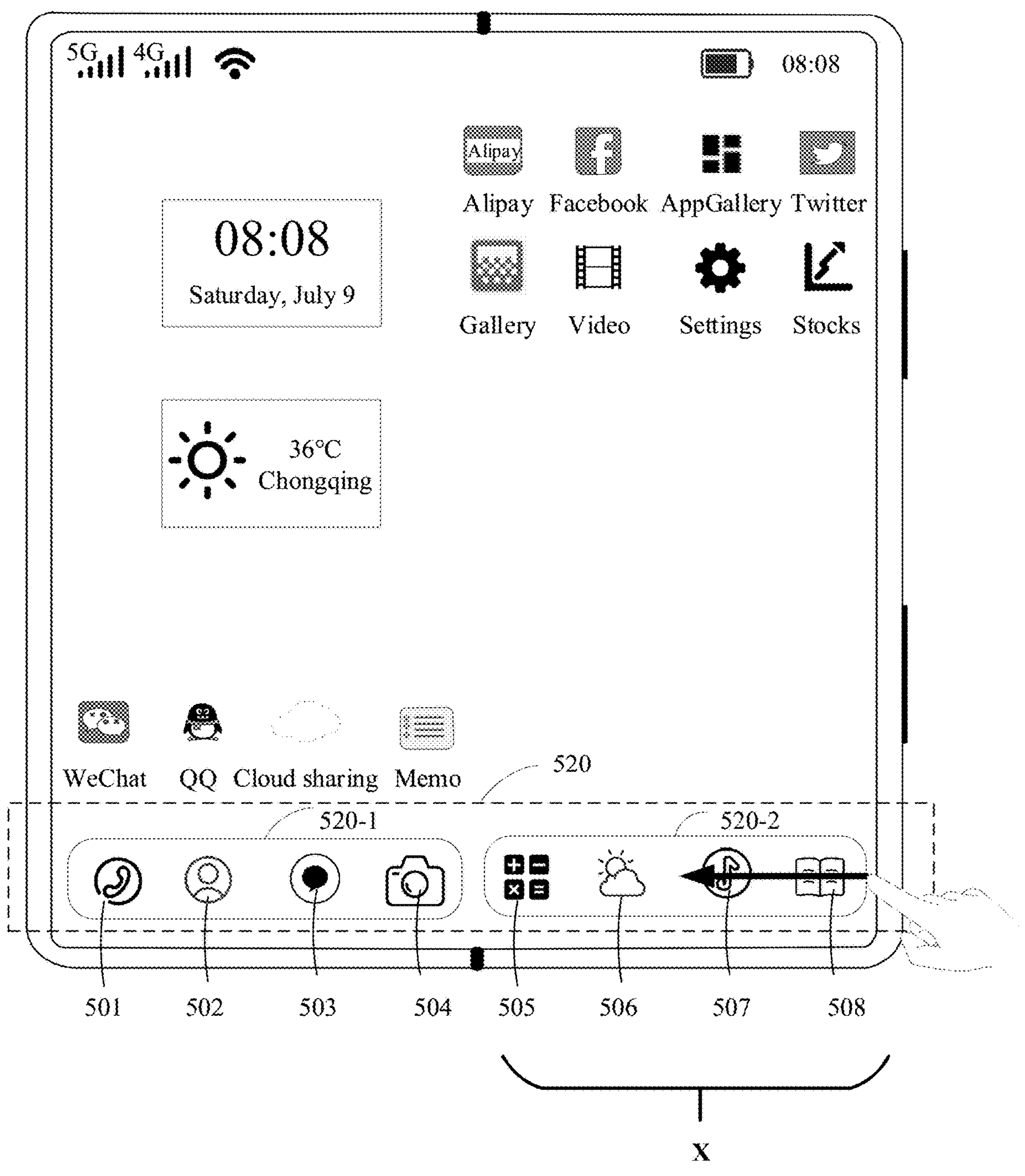
Figures 2, 5C:
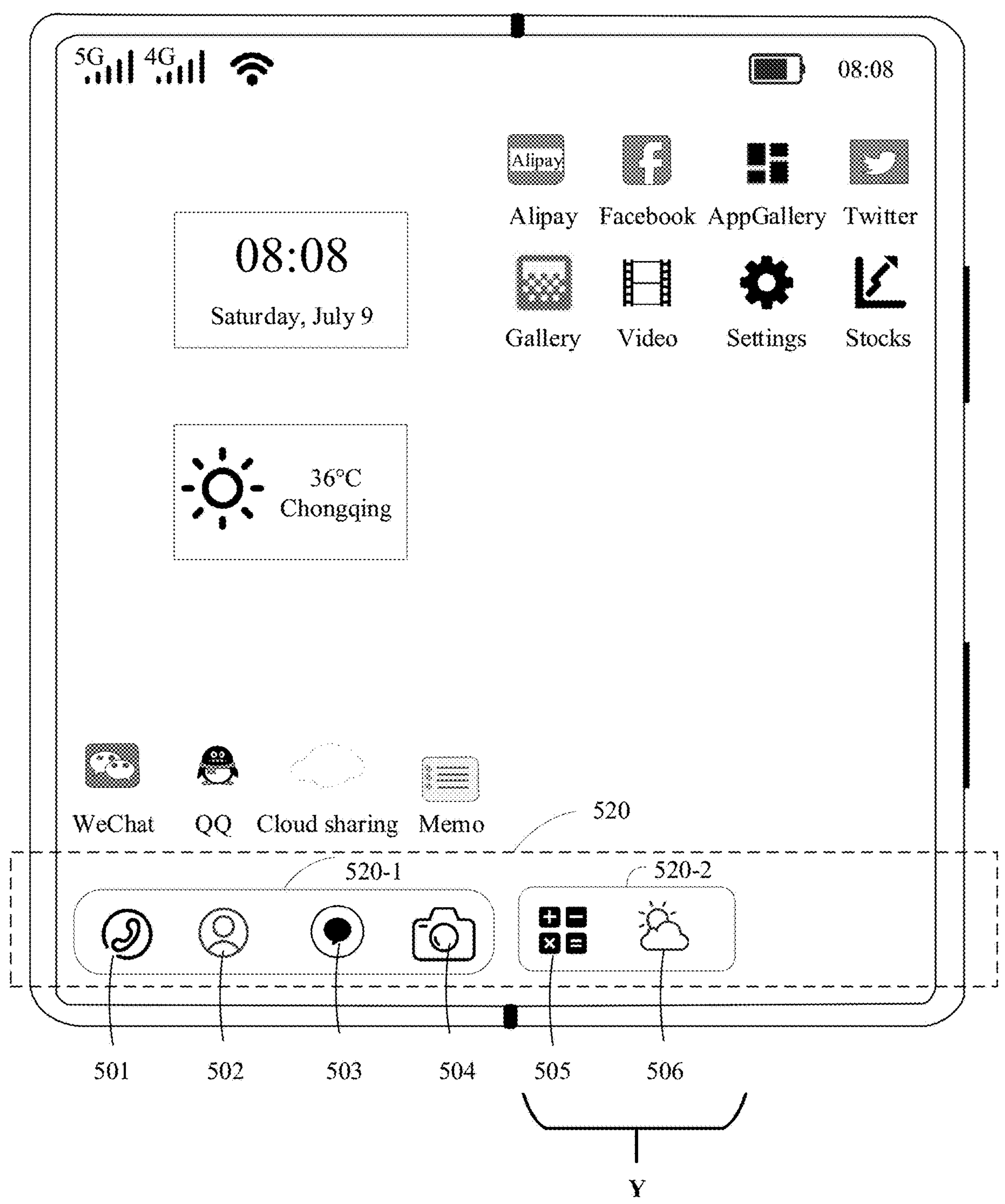

As shown in FIG. 5C-1 and FIG. 5C-2, the user may long press a right sidebar of the second sub-area 520-2 (i.e., the user presses the right sidebar for a predetermined length of time). When the electronic device detects that a long-press duration is greater than a threshold, the size of the second sub-area 520-2 may change with sliding of a finger, and may change from X centimeters to Y centimeters.

Figures 1, 5D:
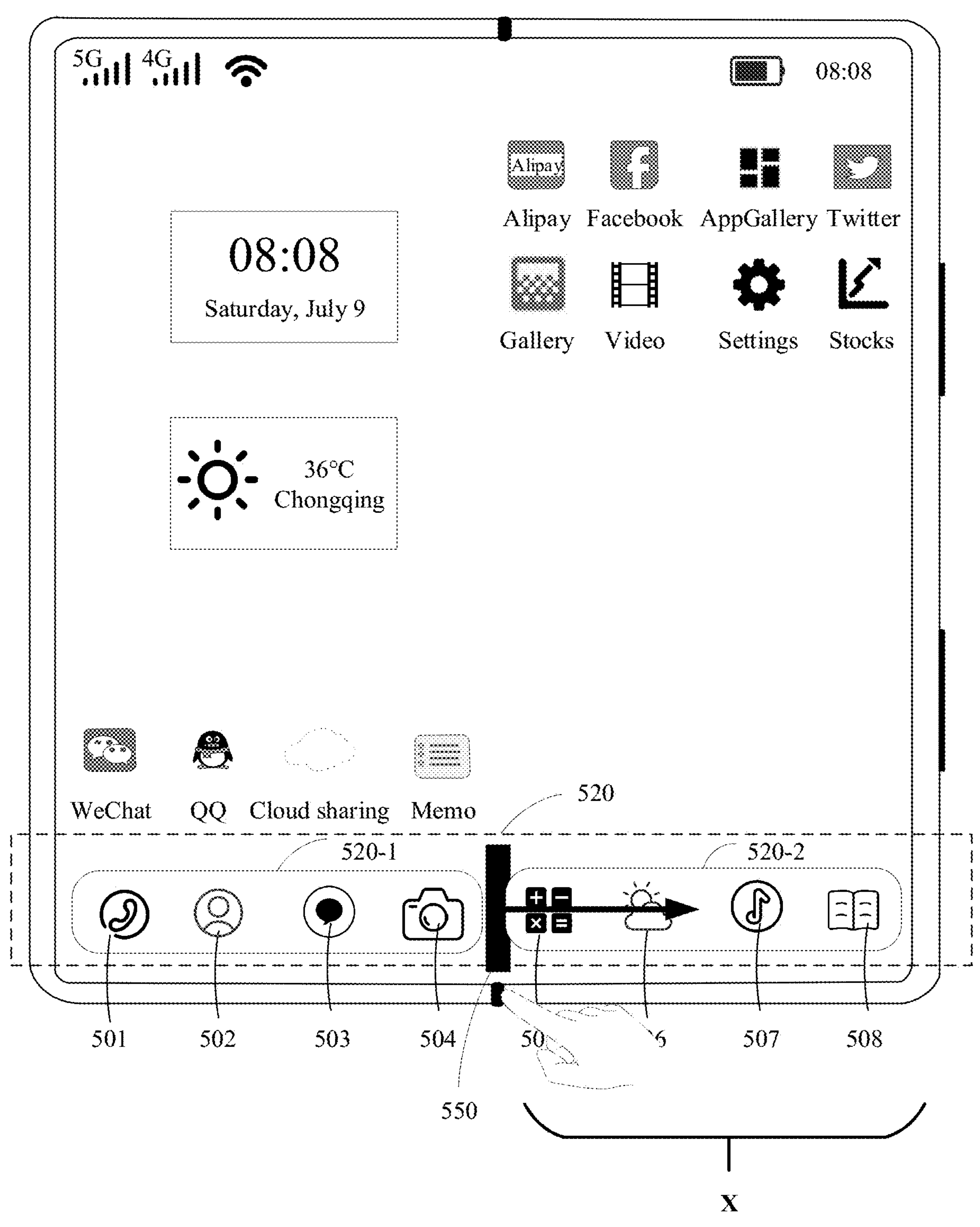
Figures 2, 5D:
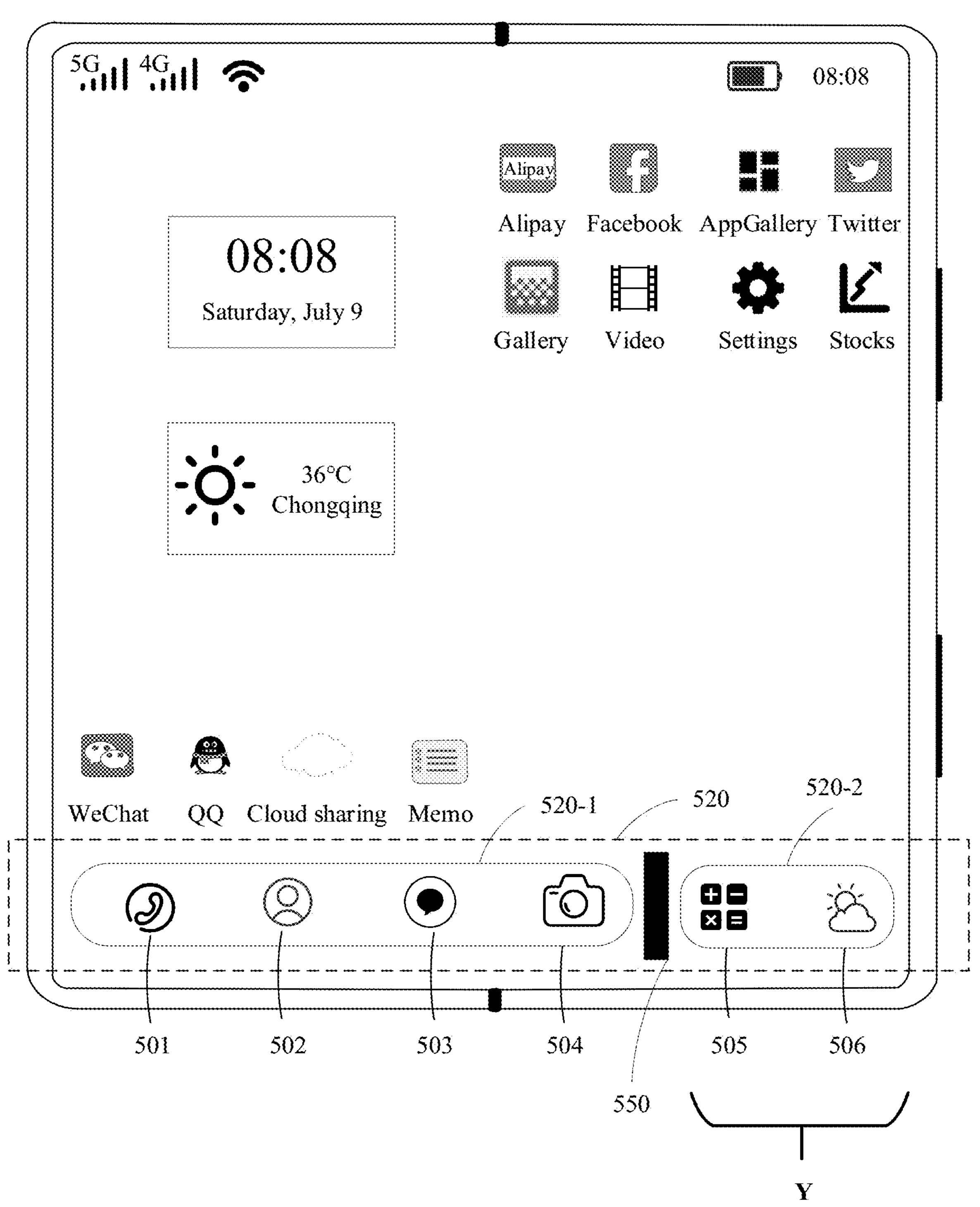

As shown in FIG. 5D-1 and FIG. 5D-2, an icon 550 may be displayed in the second sub-area 520-2. When the electronic device receives a user operation for the icon 550, the electronic device adjusts the size of the second sub-area 520-2 in response to the user operation. For example, the icon 550 may move as a finger slides, so that a size of the second sub-area 520-2 changes as the icon 550 moves, and may change from X centimeters to Y centimeters.

It can be learned from the embodiment of FIG. 5B-1 and FIG. 5B-2 that a quantity of service entries in the second sub-area is related to a size of the second sub-area so that stretching or shrinking of a distance between service entries can be avoided and aesthetics can be effectively improved. In addition, it can be learned from embodiments in FIG. 5C-1 to FIG. 5D-2 that the user may adjust the size of the second sub-area based on personal preferences, which is more in line with a user habit and provides better user experience.

Optionally, the user may further adjust a service entry displayed in the second sub-area.

Figures 1, 5E:
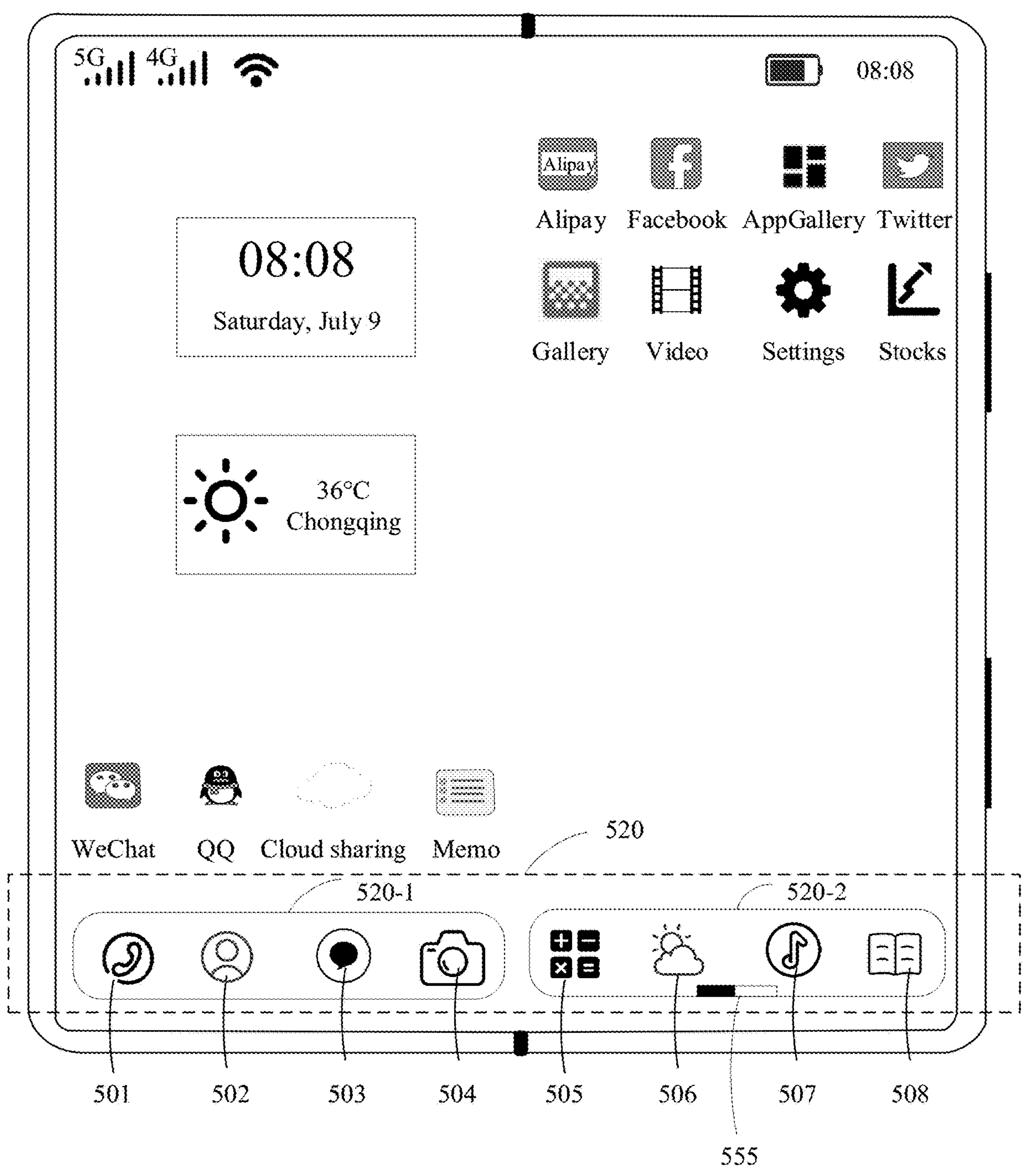
Figures 2, 5E:
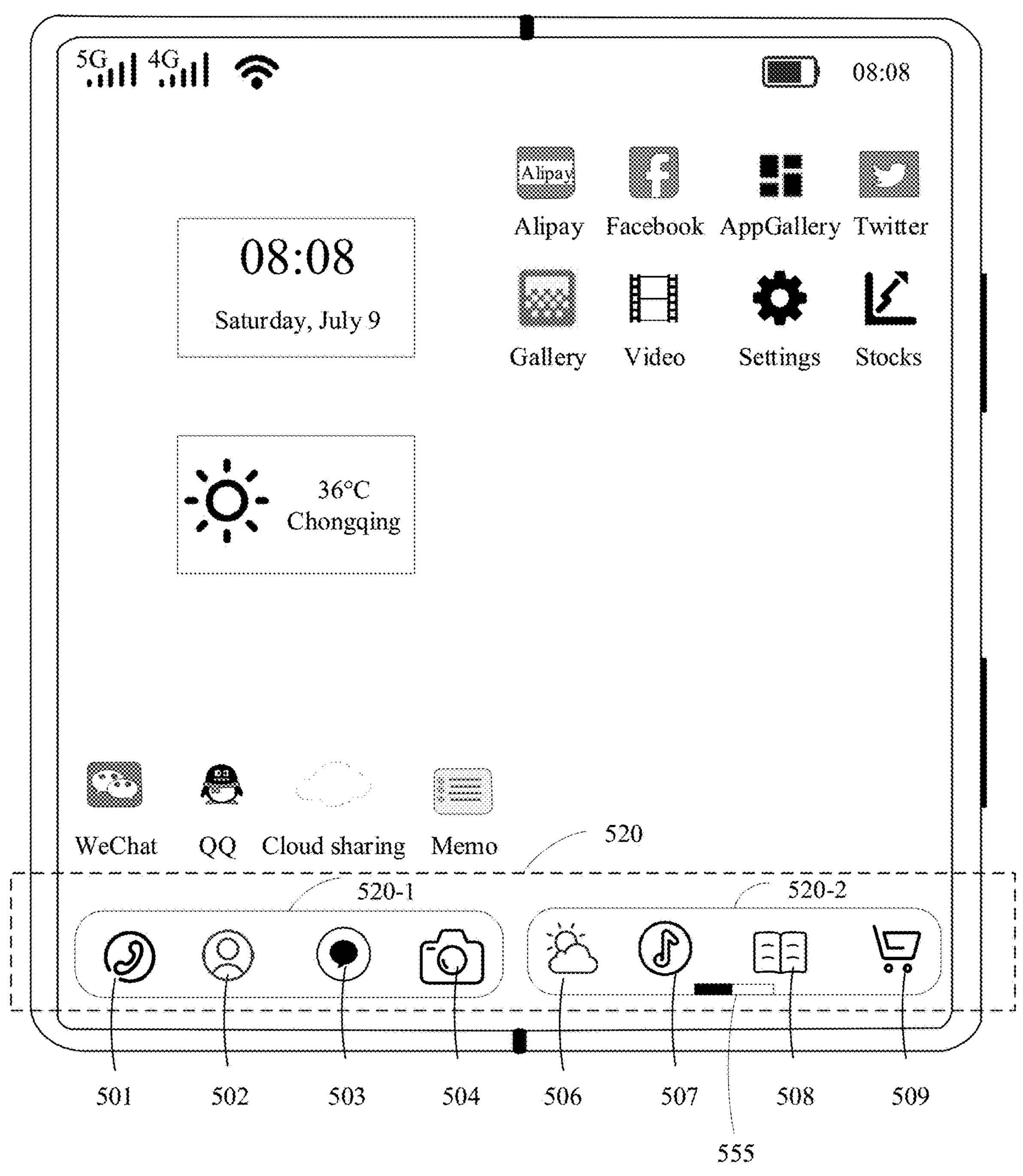

FIG. 5E-1 and FIG. 5E-2 are described by using an example in which the user slides a scroll bar to adjust the service entry displayed in the second sub-area. As shown in FIG. 5E-1 and FIG. 5E-2, a scroll bar 555 may be displayed in the second sub-area 520-2. When the electronic device detects a sliding operation for the scroll bar 555, a service entry in the second sub-area 520-2 may change with sliding of the scroll bar 555. The service entry in the second sub-area 520-2 changes from the application icon 505, the application icon 506, the application icon 507, and the application icon 508 to the application icon 506, the application icon 507, the application icon 508, and an application icon 509.

Figures 1, 5F:
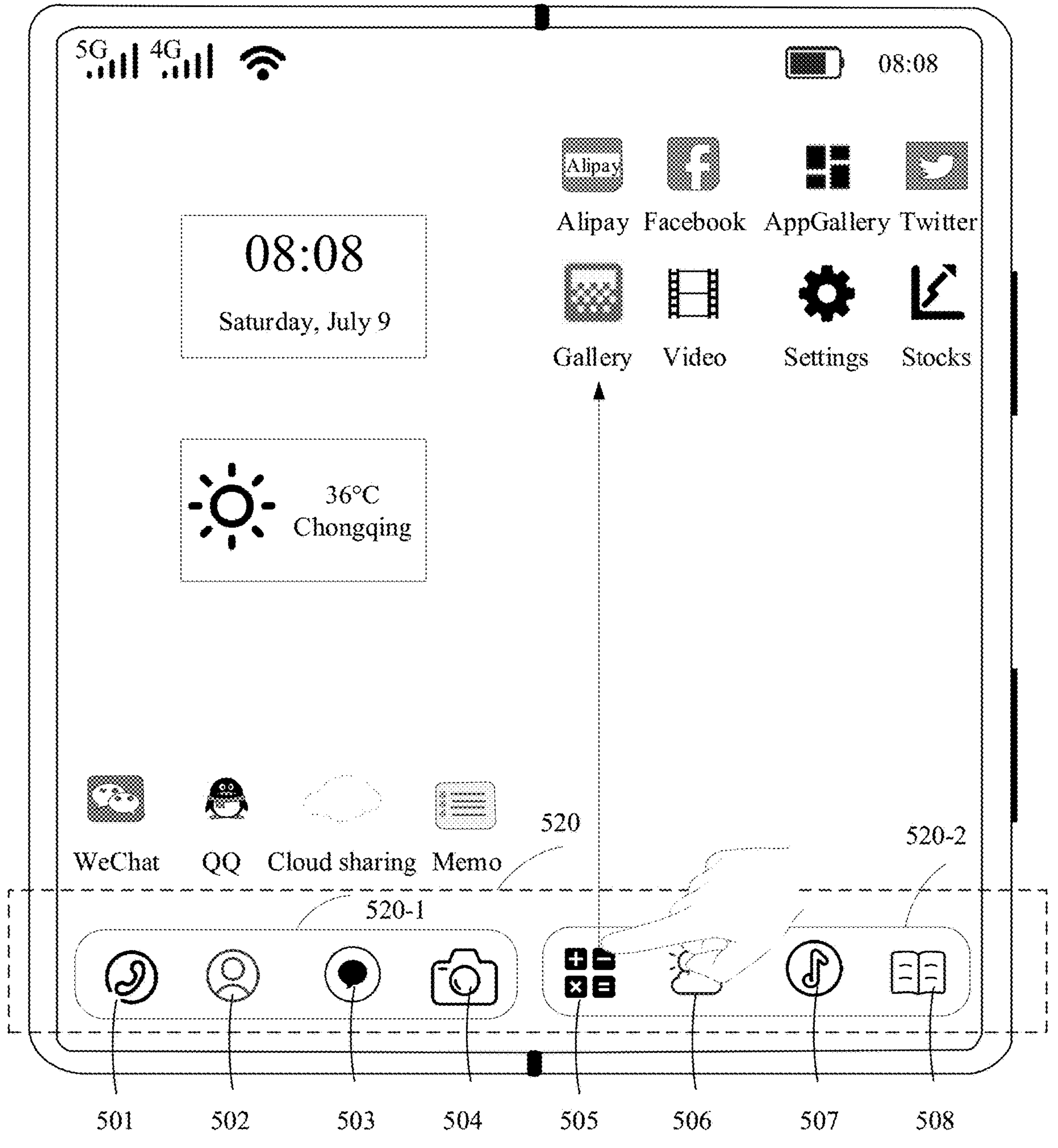
Figures 2, 5F:
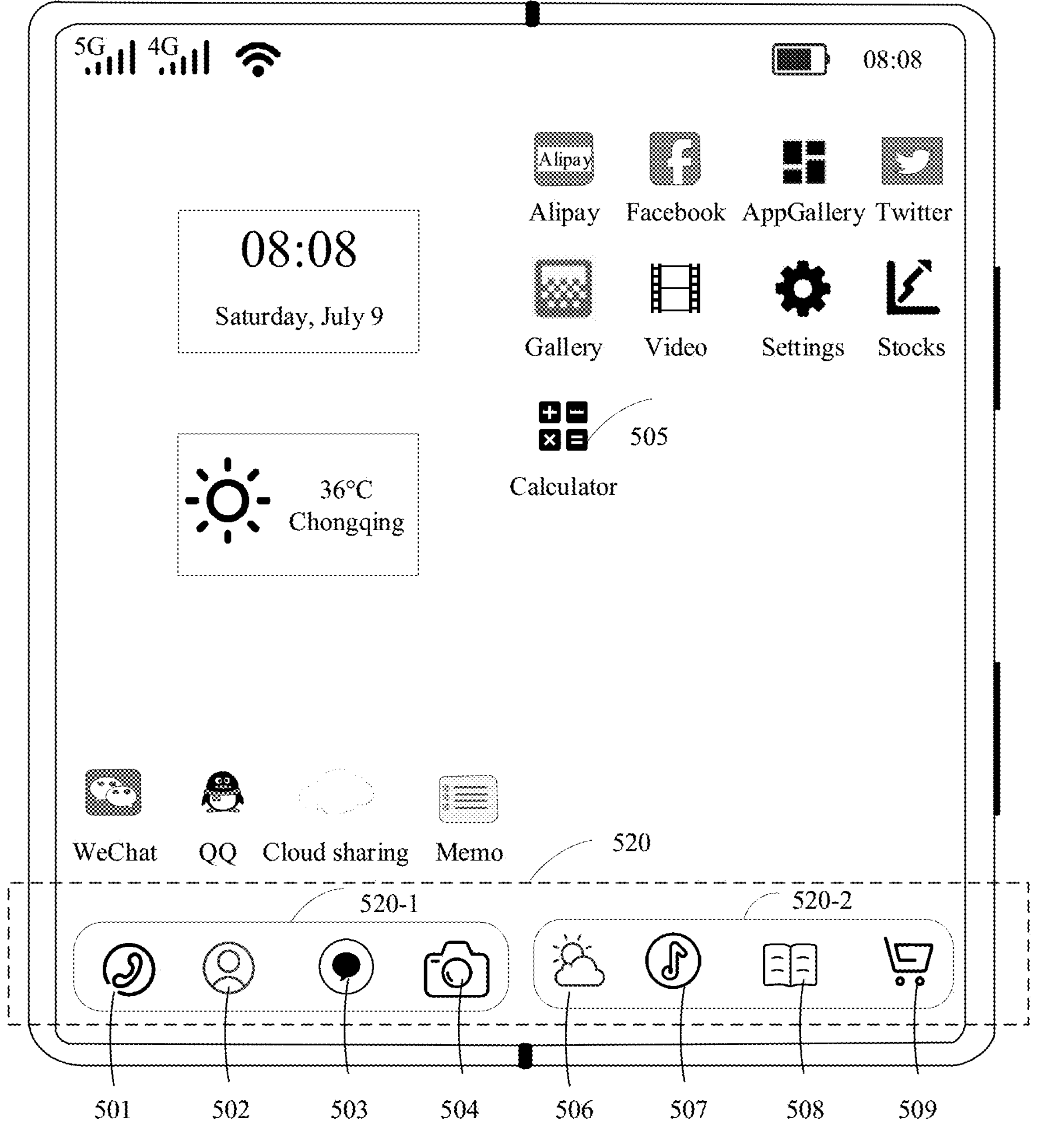

FIG. 5F-1 and FIG. 5F-2 are described by using an example in which the user moves a service entry to adjust the service entry displayed in the second sub-area. As shown in FIG. 5F-1 and FIG. 5F-2, the user may long press the application icon 505 in the second sub-area 520-2. When the electronic device detects that long-press duration is greater than a threshold, the application icon 505 may move with finger sliding, and may move from the second sub-area 520-2 to the desktop workspace. In this case, the service entry in the second sub-area 520-2 may change from the application icon 505, the application icon 506, the application icon 507, and the application icon 508 to the application icon 506, the application icon 507, the application icon 508, and the application icon 509.

It should be noted that a manner of adjusting the service entry described in embodiments in FIG. 5E-1 to FIG. 5F-2 is not limited. In this application, the service entry in the second sub-area may further be adjusted in another manner. For example, the user may delete the service entry in the second sub-area by tapping a "Delete" option output by the electronic device. This is not limited herein.

It can be learned from embodiments in FIG. 5E-1 to FIG. 5F-2 that the user may adjust the service entry displayed in the second sub-area based on personal preferences, which is more in line with user habits and effectively improves user experience.

1.2. The first group of service entries include at least one folder icon, and the folder icon indicates that the folder includes one or more service entries; and when the foldable screen is in the unfolded state, some or all service entries in the one or more service entries are displayed in the second dock bar.

It can be learned that in this embodiment of this application, the electronic device may display, in the second dock bar in an unfolded manner, the service entry included in the folder without a plurality of operations, so that the user quickly accesses the service entry included in the folder, thereby improving user experience.

As shown in FIG. 6A-1 to FIG. 6B-2, a folder icon 660 indicates that the folder includes an application icon 604, an application icon 605, an application icon 606, an application icon 607, an application icon 608, and an application icon 609.

Figures 1, 6A:
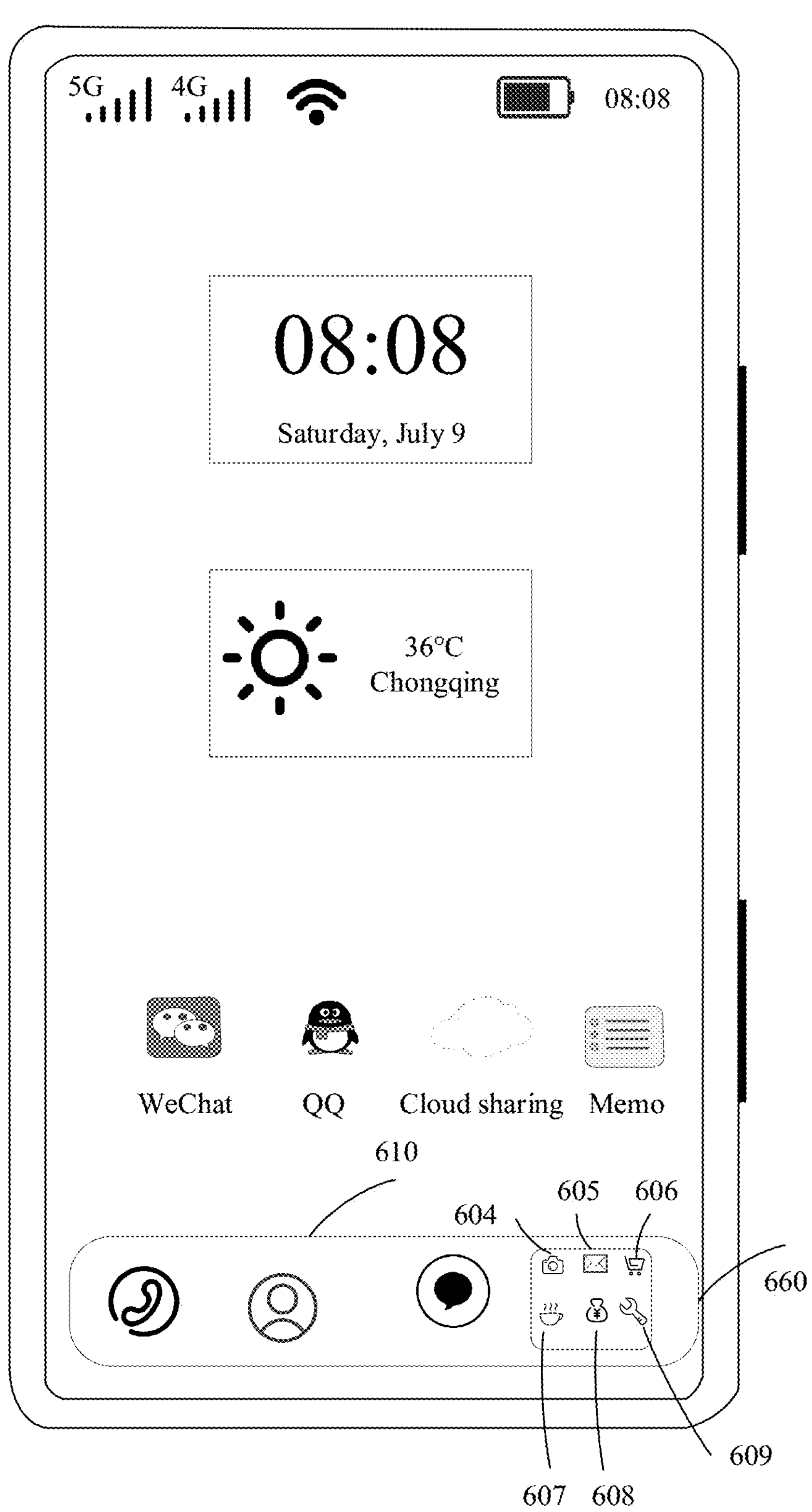
Figures 2, 6A:
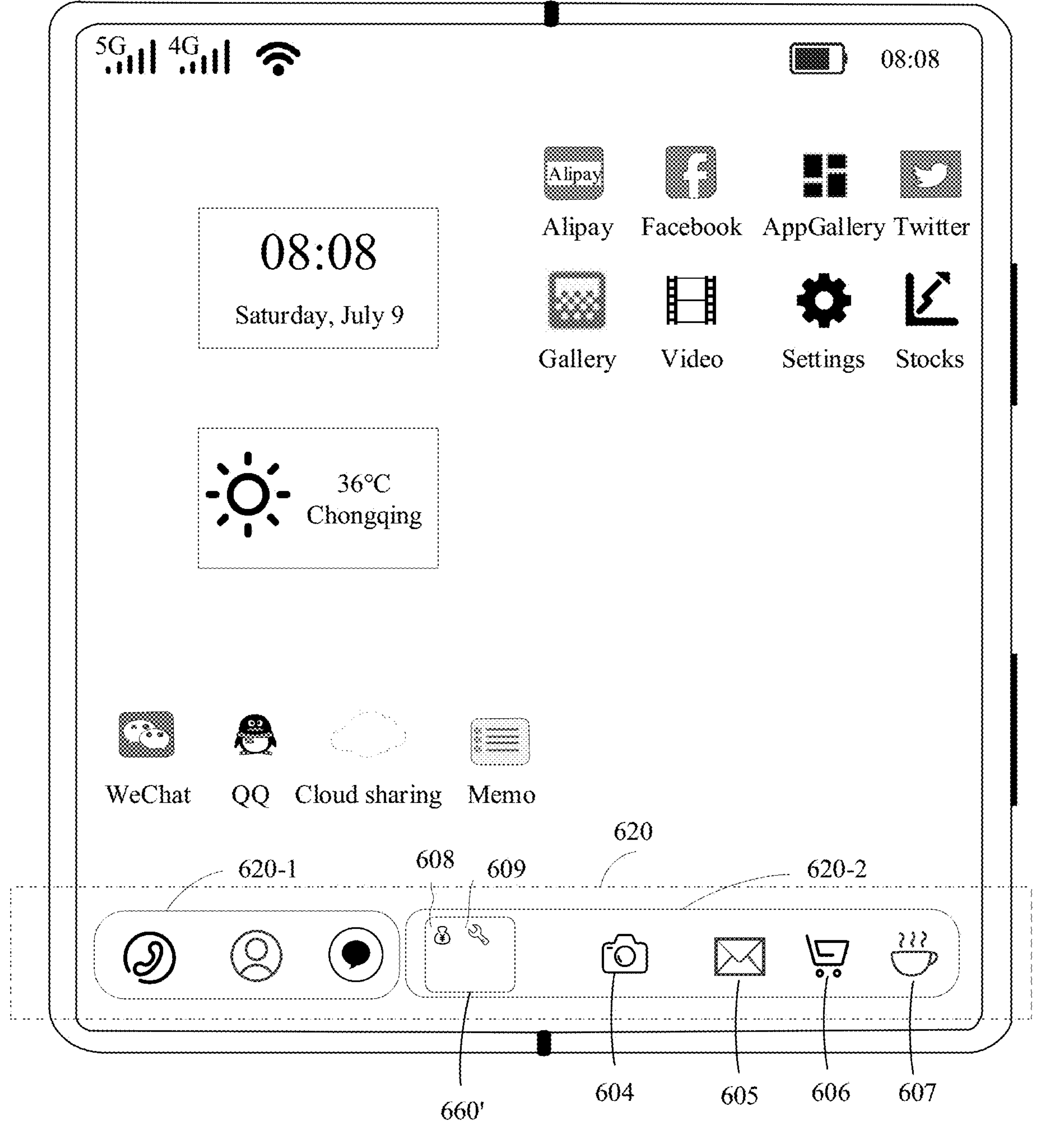

FIG. 6A-1 and FIG. 6A-2 are an example in which all service entries in one or more service entries included in the folder are displayed in a second dock bar, as shown in FIG. 6A-2. Application icons 604 to 607 in the folder icon 660 are displayed in an unfolded manner in a second dock bar 620, and application icons 608 and 609 are displayed in a folder icon 660' in the second dock bar 620.

Figures 1, 6B:
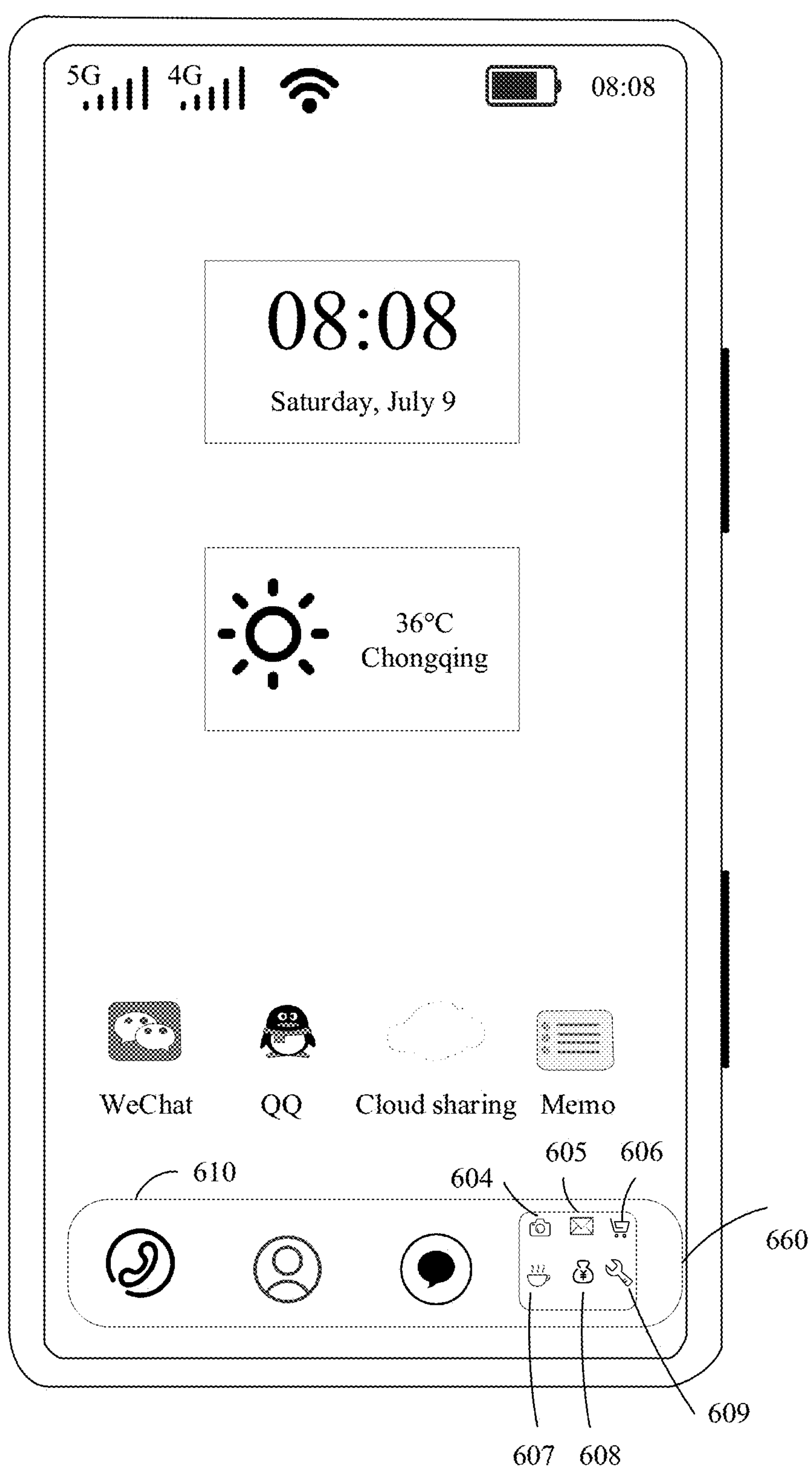
Figures 2, 6B:
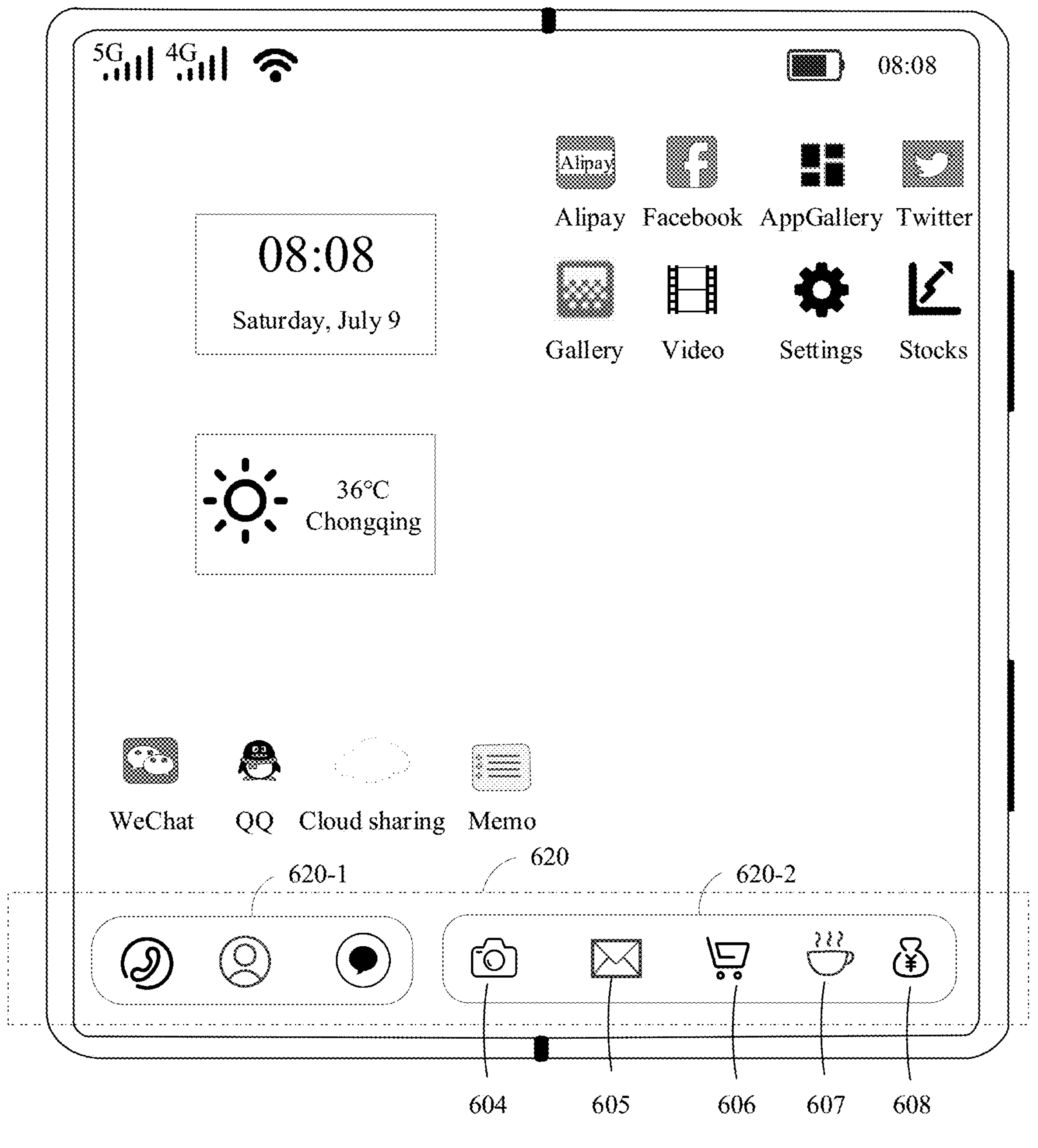

FIG. 6B-1 and FIG. 6B-2 are an example in which some service entries in the one or more service entries included in the folder are displayed in the second dock bar, as shown in FIG. 6B-2. Application icons 604 to 608 in the folder icon 660 are displayed in an unfolded manner in the second dock bar 620, and the application icon 609 is not displayed in the second dock bar 620.

Optionally, some service entries in the one or more service entries include one or two of the following: (1) a service entry determined based on an arrangement and display order of service entries in the folder; and (2) a service entry determined based on historical usage data of each service entry in the folder. For descriptions of the historical usage data, refer to the embodiment of FIG. 4A-1 and FIG. 4A-2. Details are not described again.

It can be learned that the electronic device may flexibly display one or more service entries in the folder in the second dock bar in an unfolded manner.

In an optional implementation, the second dock bar includes a first sub-area and a second sub-area. The second sub-area is used to display the some or all service entries in the one or more service entries, and the first sub-area is used to display some or all service entries in the first group of service entries except the service entries displayed in the second sub-area.

For example, as shown in FIG. 6A-1 to FIG. 6B-2, a second sub-area 620-2 is used to display some or all service entries in the one or more service entries, and a first sub-area 620-1 is used to display some or all service entries in the first group of service entries except the service entry displayed in the second sub-area.

Optionally, a quantity of service entries in the second sub-area is related to a size of the second sub-area. For related descriptions herein, refer to related content described in 1.1. Details are not described herein again.

Optionally, the user may adjust a service entry displayed in the second sub-area. For related descriptions herein, refer to related content described in 1.1. Details are not described herein again.

2. When the electronic device detects that the foldable screen is in the unfolded state, the desktop workspace in the display area may display more content. The following describes optional implementations of the desktop workspace.

2.1. When the electronic device detects that the foldable screen is in the unfolded state, the desktop workspace displayed in the display area of the foldable screen includes a K number of desktop pages, where K is a positive number greater than 1 and each desktop page includes one or more service entries. In comparison with a manner in which one desktop page is displayed in the desktop workspace when the foldable screen is in the folded state, display efficiency can be improved.

Figures 1, 7A:
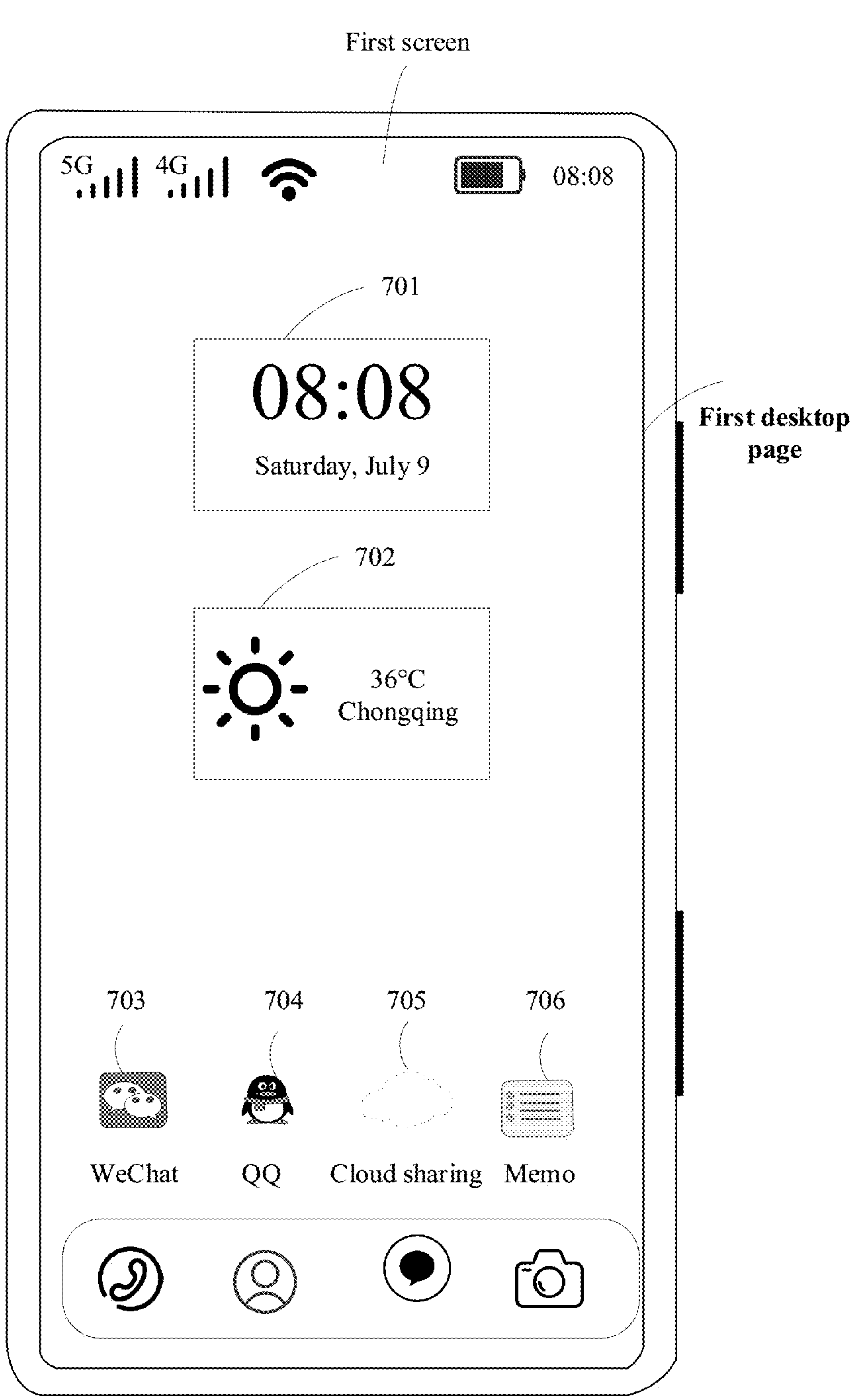
Figures 2, 7A:
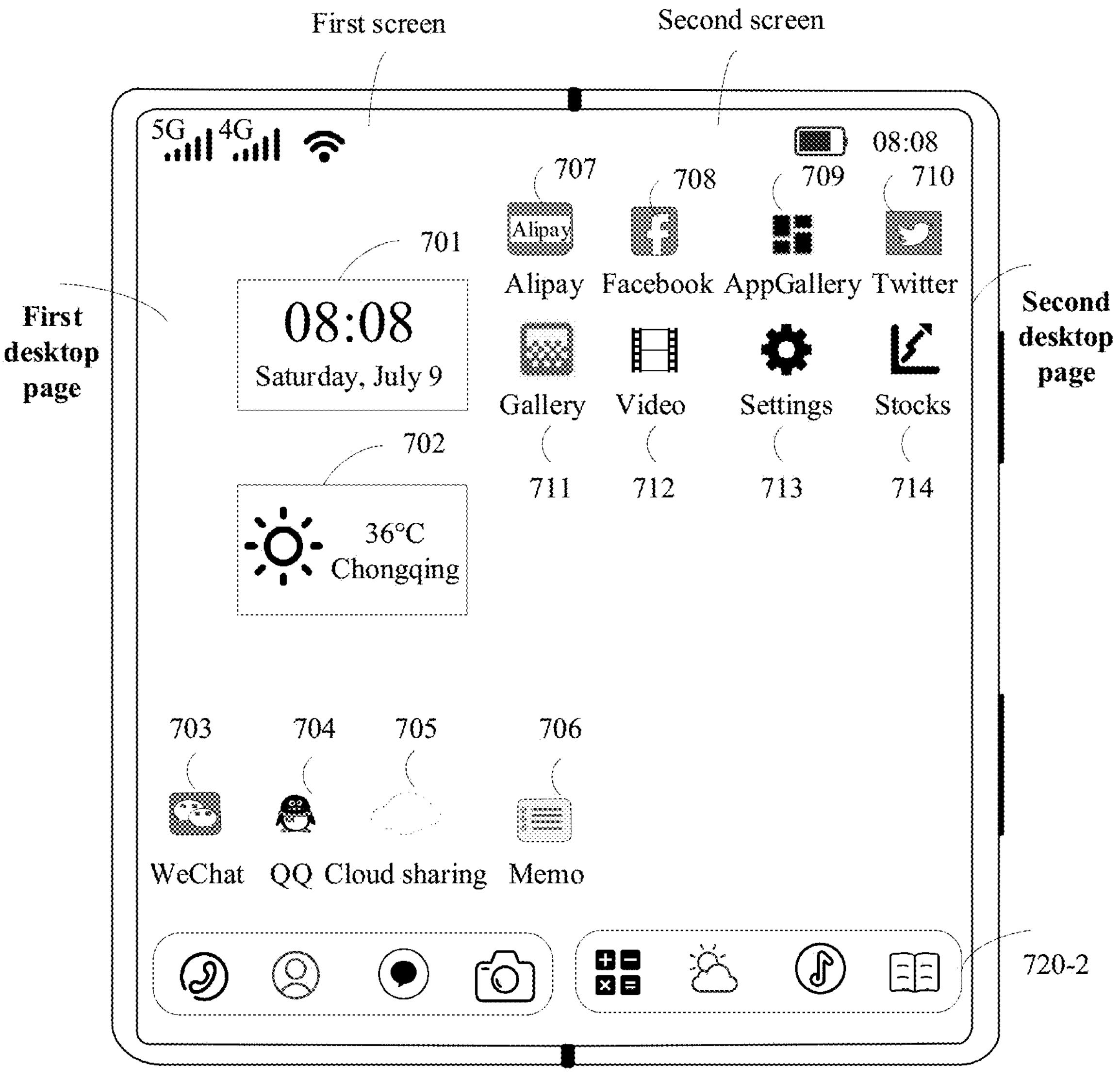

FIG. 7A-1 and FIG. 7A-2 are described by using an example in which two desktop pages are displayed. As shown in FIG. 7A-2, when the electronic device detects that the foldable screen is in the unfolded state, the desktop workspace includes two desktop pages, namely, a first desktop page and a second desktop page. The first desktop page includes a calendar indication service widget 701, a weather indication service widget 702, an application icon 703, an application icon 704, an application icon 705, and an application icon 706. The second desktop page includes an application icon 707, an application icon 708, an application icon 709, an application icon 710, an application icon 711, an application icon 712, an application icon 713, and an application icon 714.

Optionally, the foldable screen includes at least a first screen and a second screen, the first desktop page in the desktop workspace is displayed entirely on the first screen, and the second desktop page is displayed entirely on the second screen.

In this case, a distance between service entries of the desktop workspace in the display area in the unfolded state is equal to a distance between service entries of the desktop workspace in the display area in the folded state.

Figures 1, 7B:
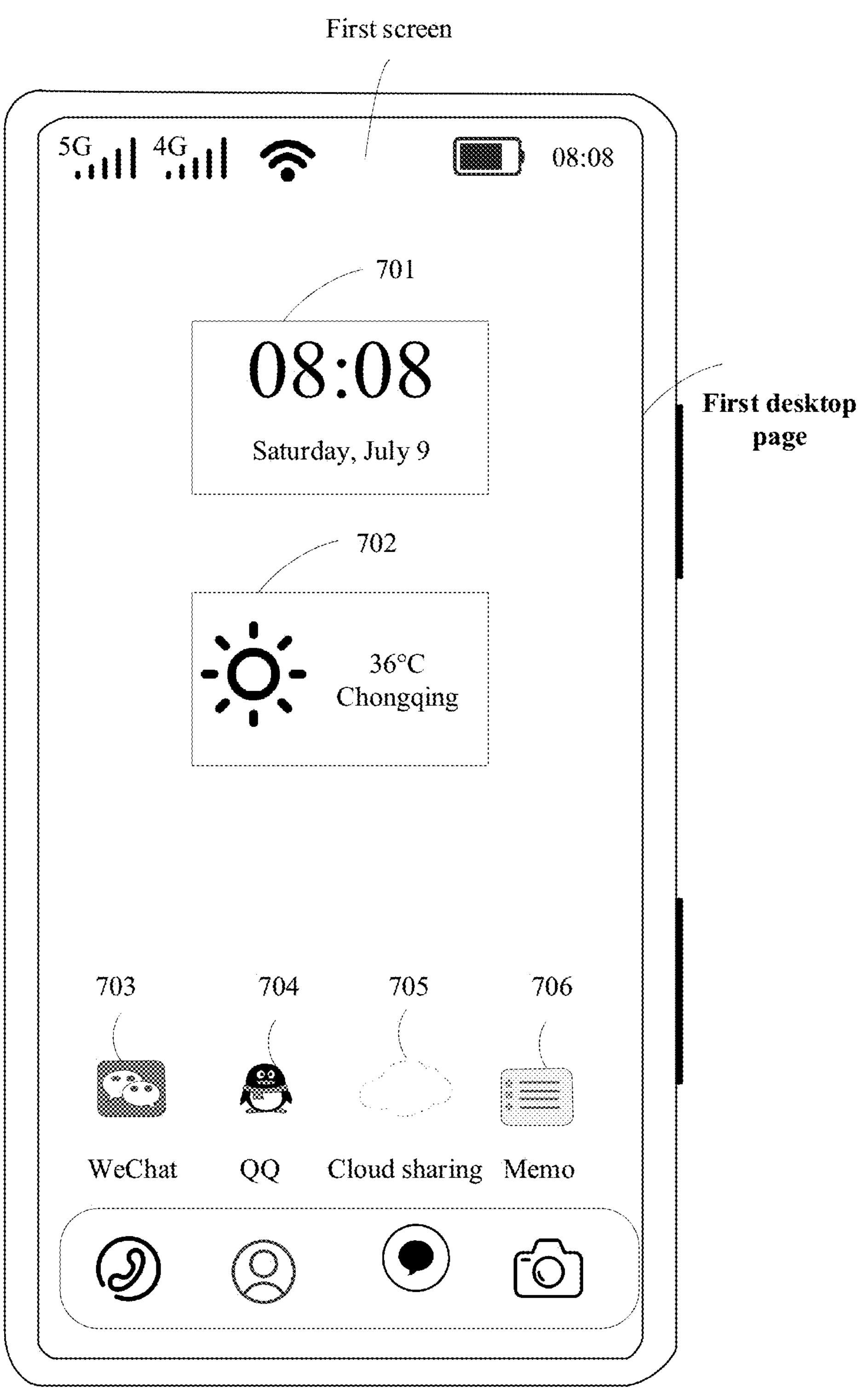
Figures 2, 7B:
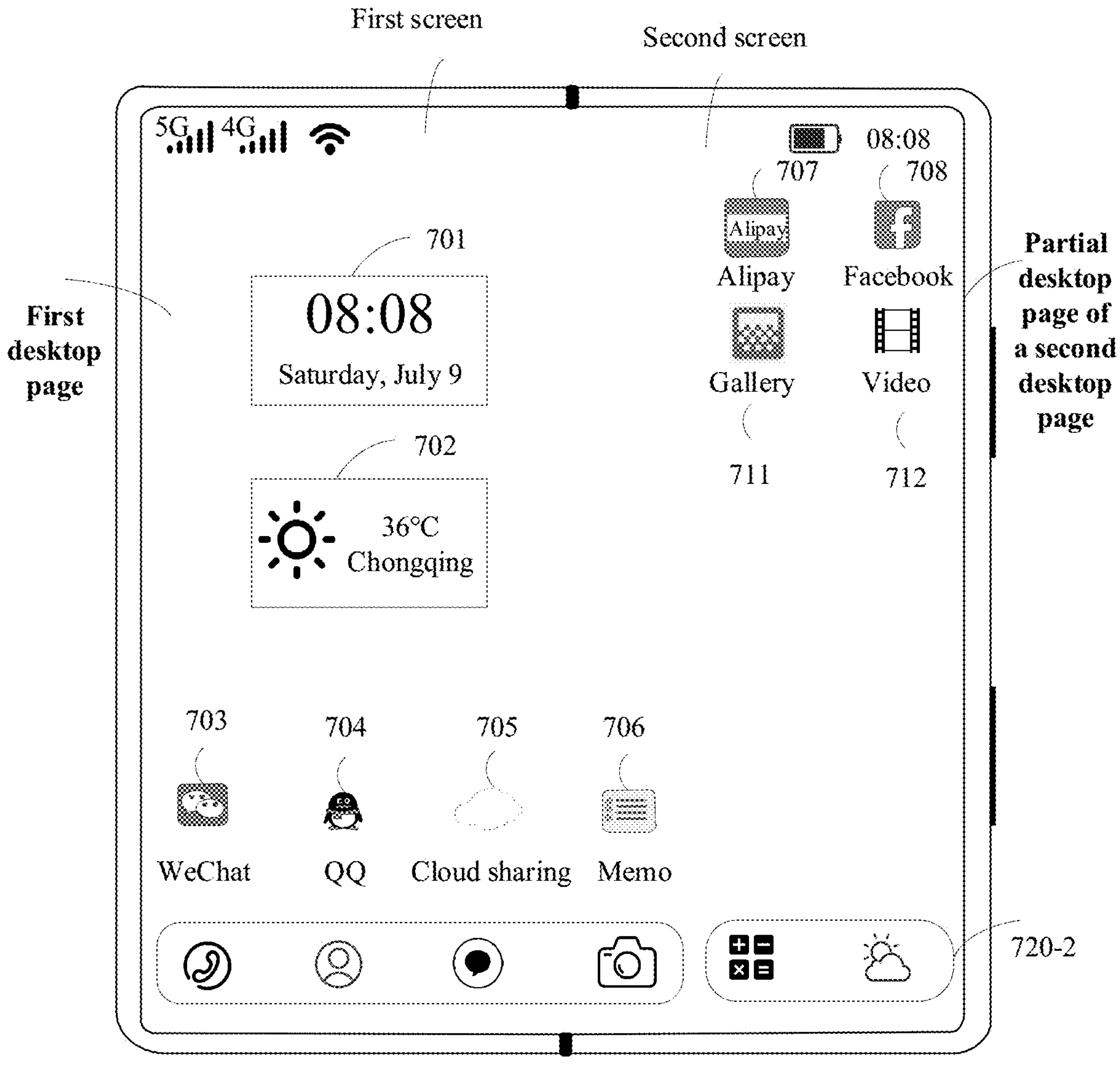

FIG. 7B-1 and FIG. 7B-2 are described by using an example in which 1.5 (one-and-a-half) desktop pages are displayed. As shown in FIG. 7B-2, when the electronic device detects that the foldable screen is in the unfolded state, the desktop workspace includes 1.5 desktop pages, namely, a first desktop page and a partial desktop page of a second desktop page. The first desktop page includes a calendar indication service widget 701, a weather indication service widget 702, an application icon 703, an application icon 704, an application icon 705, and an application icon 706. The partial desktop page of the second desktop page includes an application icon 707, an application icon 708, an application icon 711, and an application icon 712.

Optionally, the foldable screen includes at least a first screen and a second screen. The first desktop page in the desktop workspace is displayed partially on the first screen and displayed partially on the second screen, and the second desktop page is displayed partially on the second screen.

In this case, a distance between service entries of the desktop workspace in the display area in the unfolded state is greater than a distance between service entries of the desktop workspace in the display area in the folded state, a layout is loose, and the electronic device can more accurately identify a user operation. In addition, aesthetics can be effectively improved.

Figures 1, 7C:
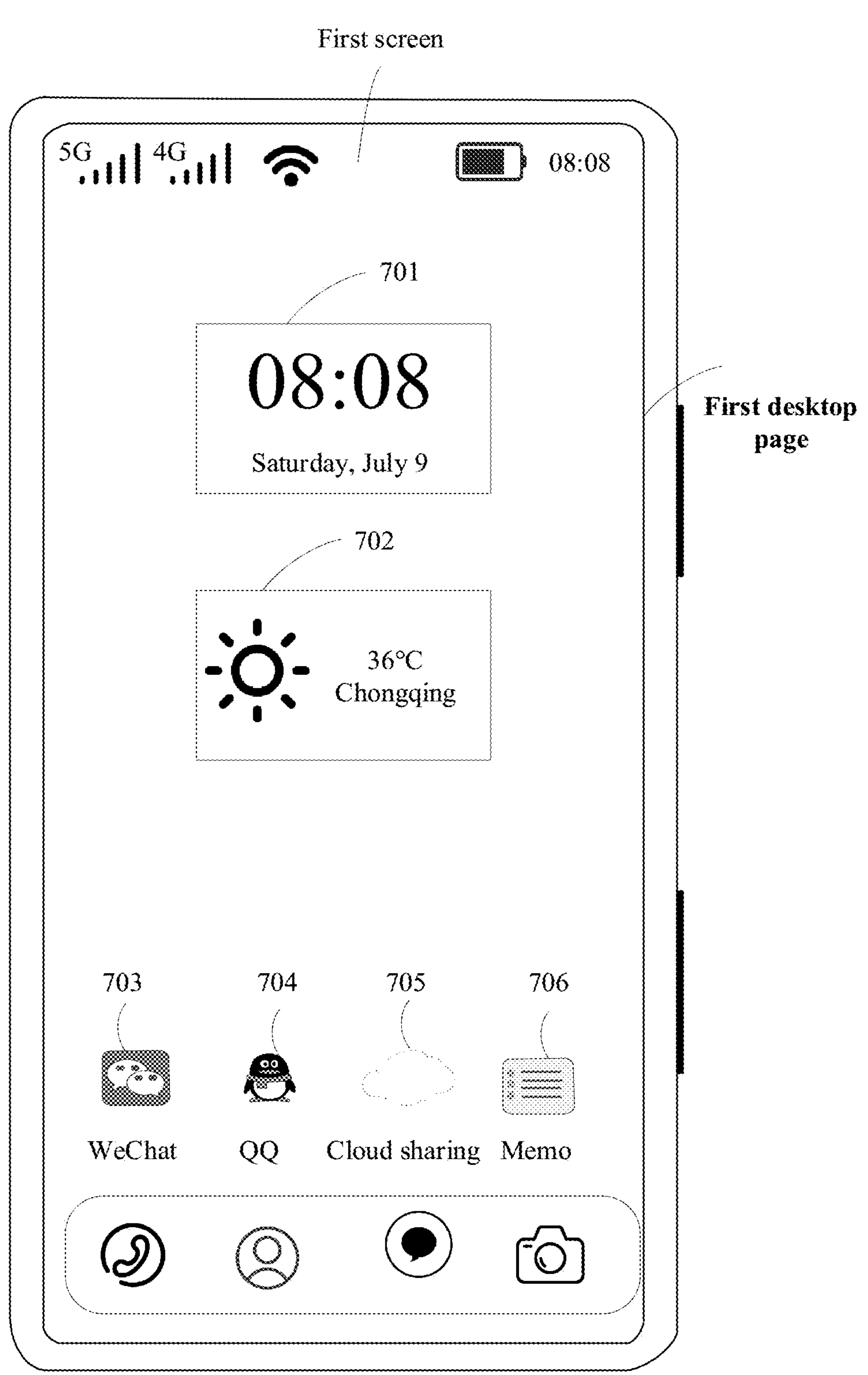
Figures 2, 7C:
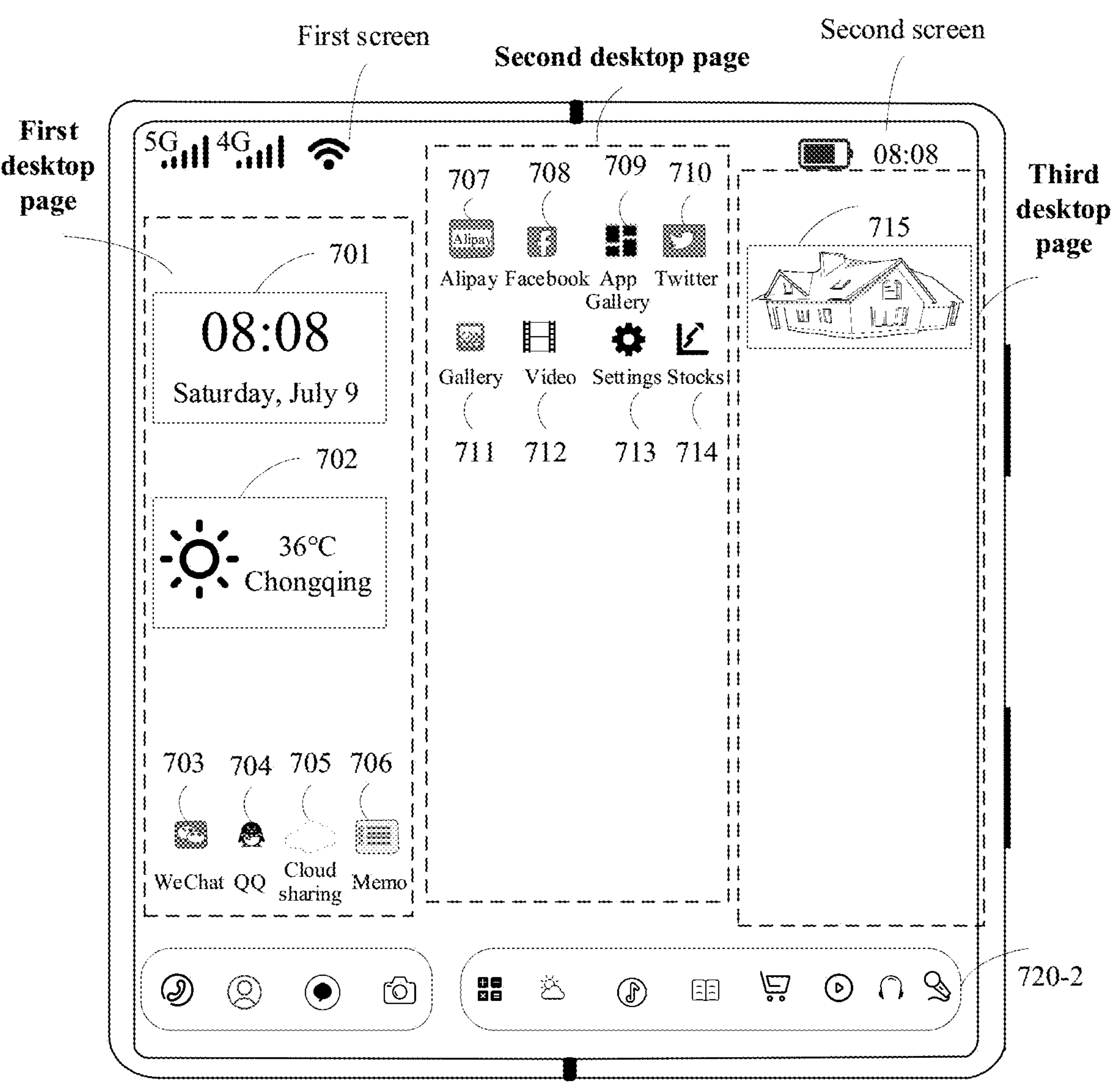

FIG. 7C-1 and FIG. 7C-2 are described by using an example in which three desktop pages are displayed. As shown in FIG. 7C-2, when the electronic device detects that the foldable screen is in the unfolded state, the desktop workspace includes three desktop pages, namely, a first desktop page, a second desktop page, and a third desktop page. The first desktop page includes a calendar indication service widget 701, a weather indication service widget 702, an application icon 703, an application icon 704, an application icon 705, and an application icon 706. The second desktop page includes an application icon 707, an application icon 708, an application icon 709, an application icon 710, an application icon 711, an application icon 712, an application icon 713, and an application icon 714. The third desktop page includes a picture service widget 715.

Optionally, the foldable screen includes at least a first screen and a second screen. The first desktop page in the desktop workspace is displayed entirely on the first screen, the second desktop page is displayed partially on the first screen and displayed partially on the second screen, and the third desktop page is displayed entirely on the second screen.

In this case, a distance between service entries of the desktop workspace in the display area in the unfolded state is less than a distance between service entries of the desktop workspace in the display area in the folded state, and a layout is more compact, so that a display area obtained by unfolding the foldable screen can be fully used to display more content, thereby effectively improving utilization of the display area and further improving user experience.

Optionally, a quantity of service entries in the second sub-area is related to a quantity of desktop pages displayed in the display area. For example, as shown in FIG. 7A-2, when two desktop pages are displayed in the desktop workspace of the display area, a quantity of service entries in a second sub-area 720-2 is 4. For another example, as shown in FIG. 7B-2, when 1.5 desktop pages are displayed in the desktop workspace of the display area, a quantity of service entries in the second sub-area 720-2 is 2. For still another example, when three desktop pages are displayed in the desktop workspace of the display area, a quantity of service entries in the second sub-area 720-2 is 8. It can be learned that the quantity of service entries in the second sub-area may change with the quantity of desktop pages in the display area, thereby improving aesthetics.

2.2. The desktop workspace and an efficiency space are displayed on the display area of the foldable screen when the electronic device detects that the foldable screen is in the unfolded state.

The desktop workspace includes a plurality of desktop pages, each desktop page includes one or more service entries, and the desktop workspace switches from one desktop page to another desktop page when a touch operation performed on the desktop workspace is detected.

The efficiency space includes one or more service entries, and the efficiency space is a partial area that is in the display area and that does not switch with switching of a desktop page in the desktop workspace. That is, the efficiency space is equivalent to a screen split from the desktop workspace to support more display and operations and improve display efficiency.

Optionally, the desktop workspace may be used to display a desktop page or an application page. Optionally, a change of the desktop workspace includes switching to display different desktop pages, and/or switching from the desktop page to the application page. In addition, when the desktop workspace changes, the efficiency space remains unchanged. That is, the desktop workspace is relatively independent of the efficiency space.

Figures 1, 8A:
Figures 2, 8A:
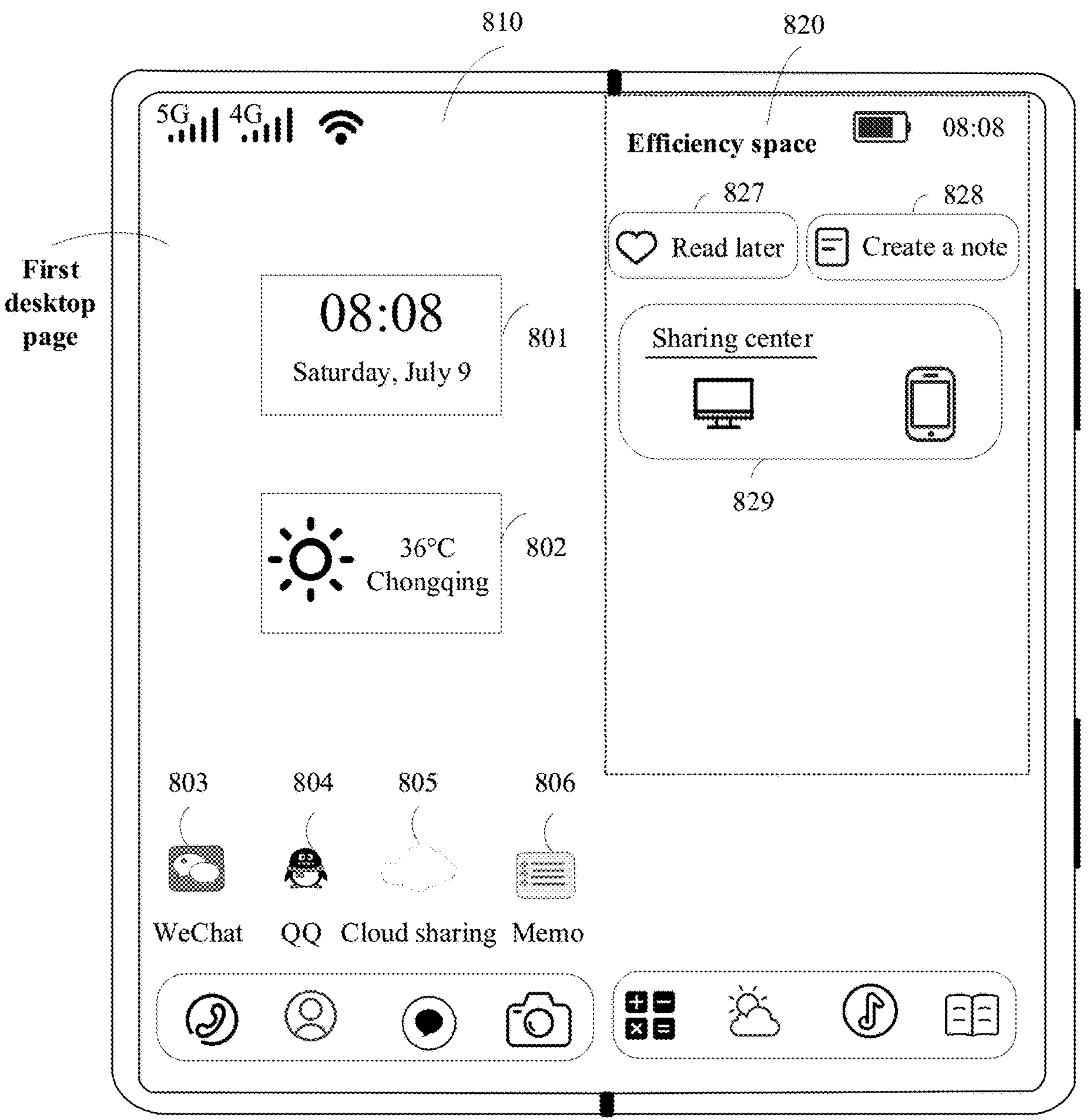
Figures 1, 8B:
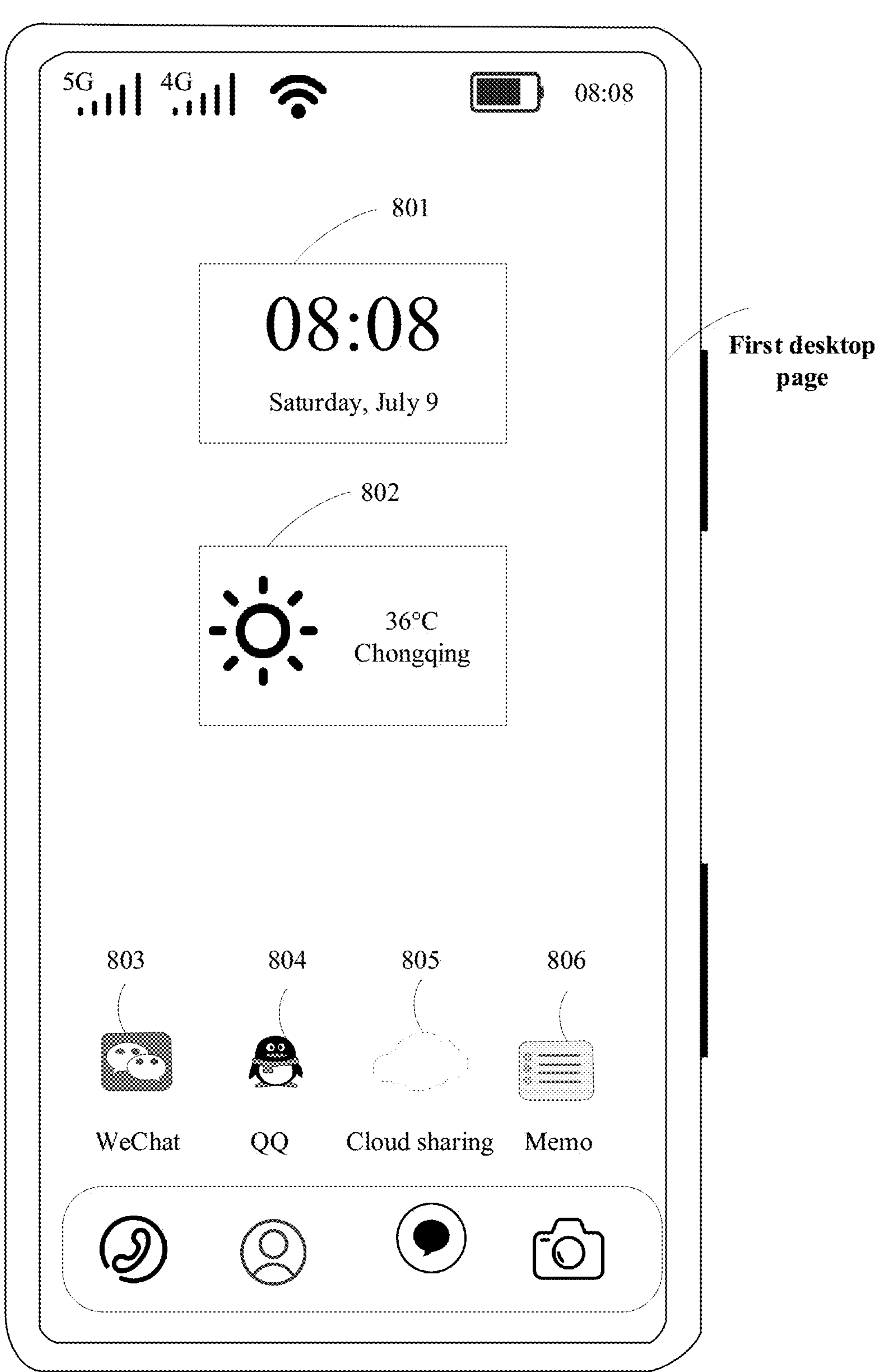
Figures 2, 8B:
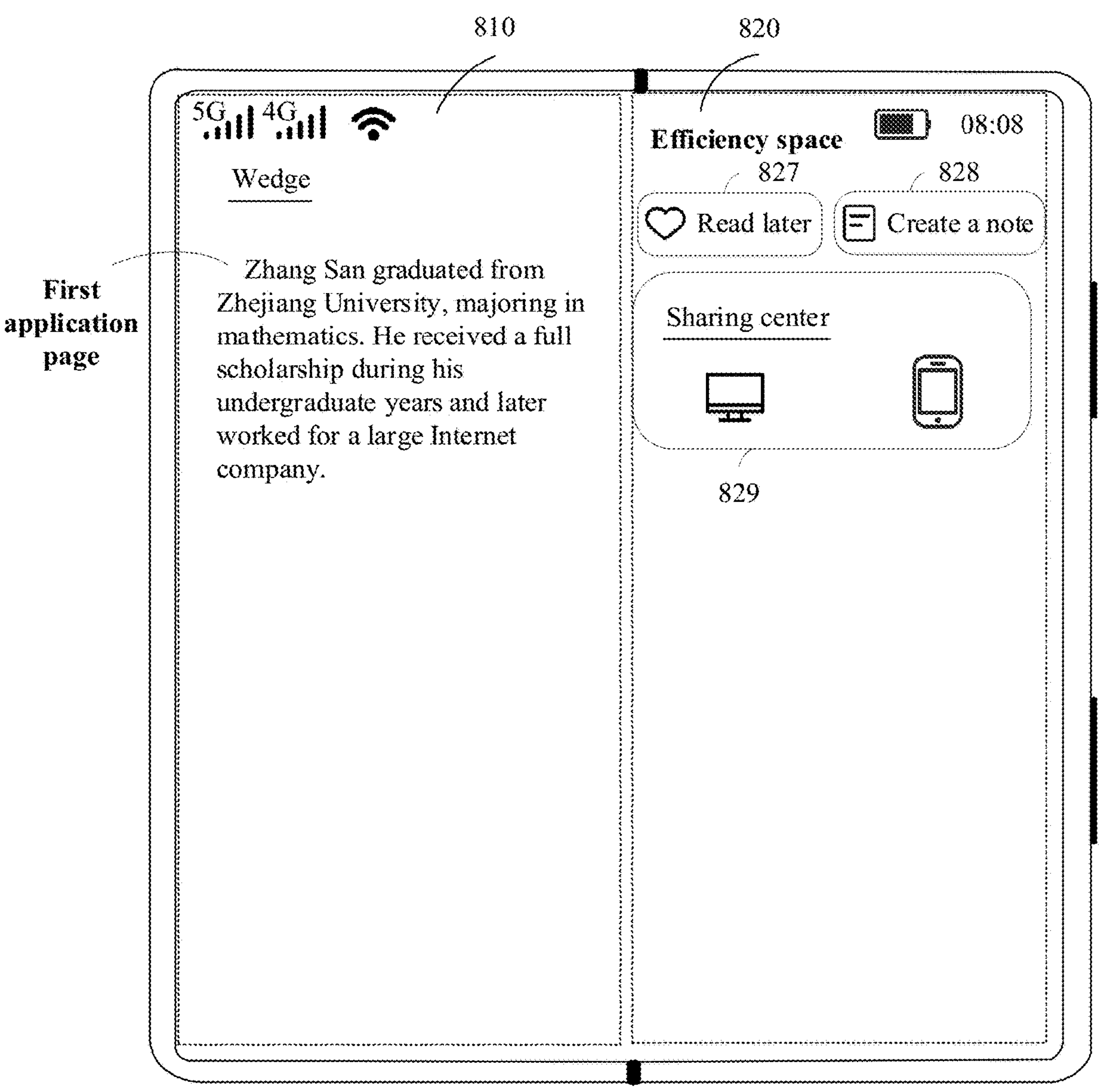

As shown in FIG. 8A-1 to FIG. 8B-2, when the electronic device detects that the foldable screen is in the unfolded state, a desktop workspace 810 and an efficiency space 820 are displayed on the display area of the foldable screen. In FIG. 8A-1 and FIG. 8A-2, an example in which the desktop workspace displays a desktop page is used. The desktop workspace 810 has a first desktop page. The first desktop page includes a calendar indication service widget 801, a weather indication service widget 802, an application icon 803, an application icon 804, an application icon 805, and an application icon 806. The efficiency space 820 includes a control 827, a control 828, and a control 829. FIG. 8B-1 and FIG. 8B-2 are described by using an example in which the application page is displayed in the desktop workspace. The desktop workspace 810 may have a first application page. The efficiency space 820 includes controls 827 to 829.

Figures 1, 8C:
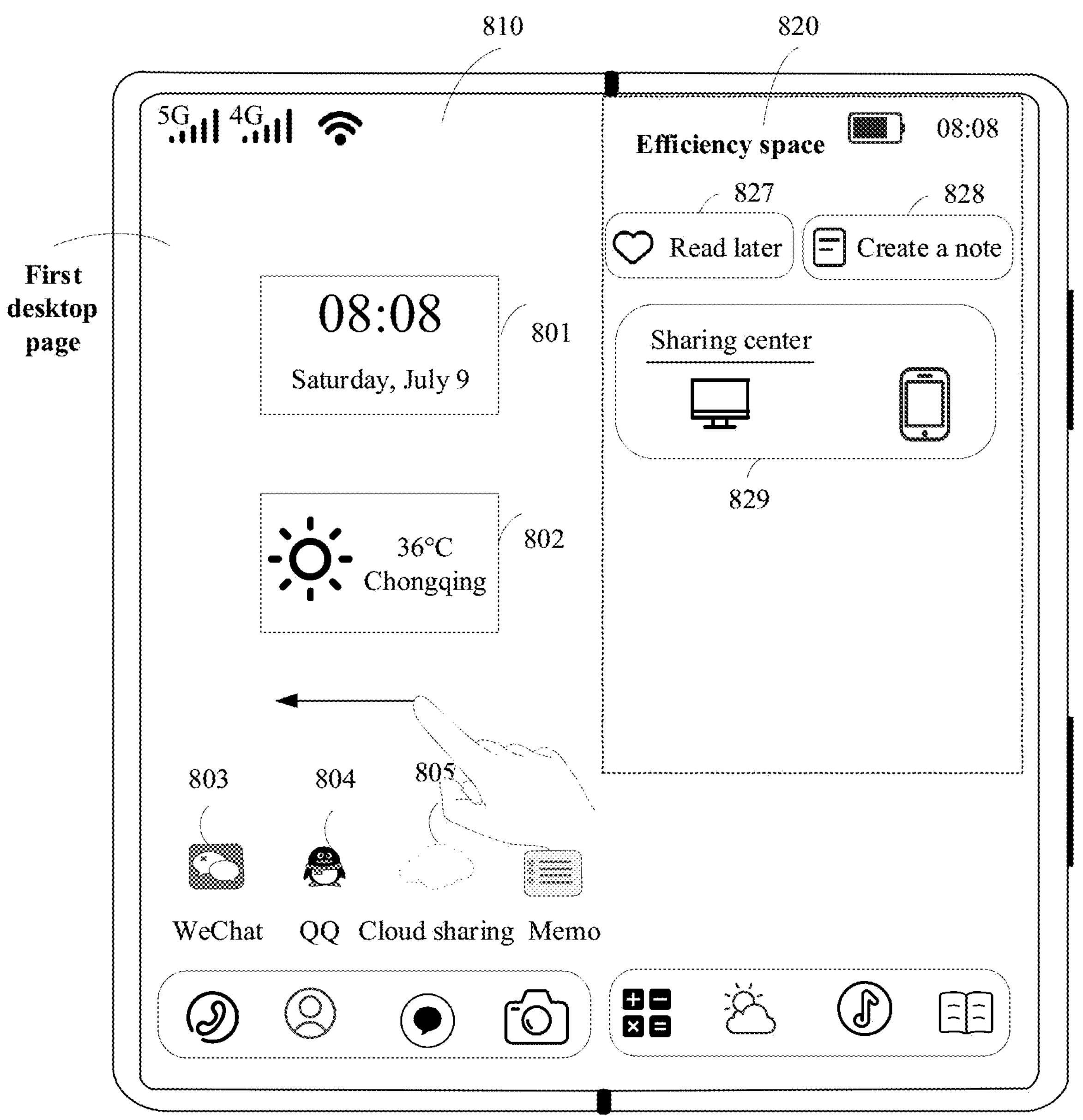
Figures 2, 8C:
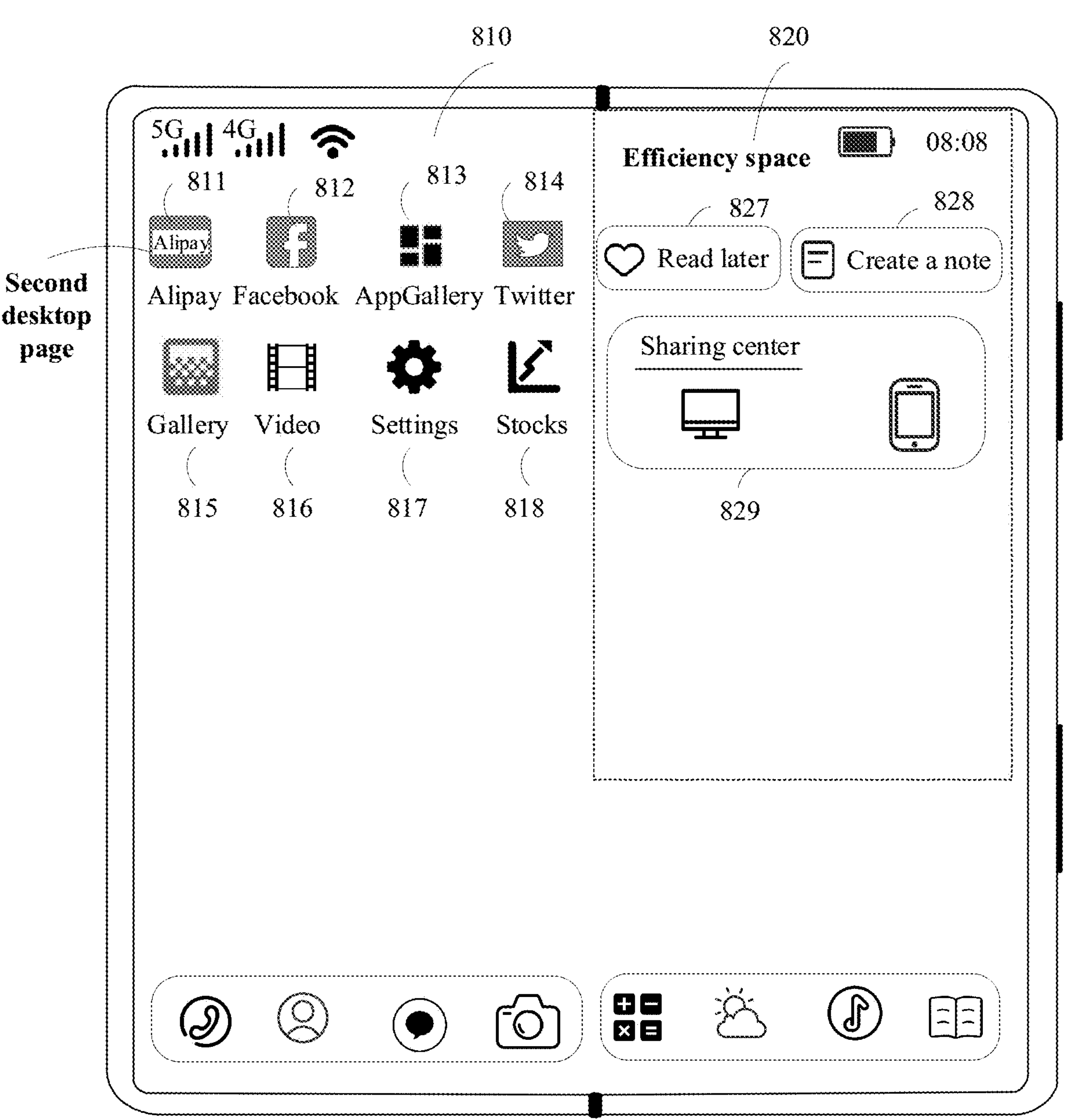

FIG. 8C-1 and FIG. 8C-2 are described by using an example in which the desktop workspace switches to display different desktop pages and content displayed in the efficiency space remains unchanged. For example, the desktop workspace 810 has a first desktop page and a second desktop page. When the electronic device displays the first desktop page in the desktop workspace 810, the first desktop page includes a calendar indication service widget 801, a weather indication service widget 802, an application icon 803, an application icon 804, an application icon 805, and an application icon 806. When the electronic device receives a touch operation (a leftward sliding operation is used as an example in FIG. 8C-1 and FIG. 8C-2) that is input for the desktop workspace 810, the electronic device may switch the desktop workspace 810 from the first desktop page to the second desktop page for display. The second desktop page may include an application icon 811, an application icon 812, an application icon 813, an application icon 814, an application icon 815, an application icon 816, an application icon 817, and an application icon 818. When the electronic device switches the desktop workspace 810 from the first desktop page to the second desktop page for display, content displayed in the efficiency space 820 remains unchanged. That is, when the electronic device displays the first desktop page and displays the second desktop page in the desktop workspace 810, the efficiency space 820 always displays the controls 827 to 829.

Optionally, the efficiency space may be located at any location in the display area. For example, the efficiency space may be located in a lower area, an upper area, a left area, or a right area of the display area. This is not limited in this application. Optionally, the efficiency space may be of any shape. For example, the efficiency space may be a rectangle, a circle, a sector, or the like. This is not limited in this application. Optionally, the efficiency space may be a fixed area in the display area. For example, the efficiency space is fixed in the right area of the display area.

In an optional implementation, one or more service entries displayed in the efficiency space are related to a scenario mode of the electronic device. Optionally, the scenario mode includes one or more of a working mode, an entertainment mode, an office mode, a learning mode, a life mode, and a sleep mode.

Optionally, when the scenario mode is different, the one or more service entries displayed in the efficiency space are different. For example, when the scenario mode is the working mode, the one or more service entries displayed in the efficiency space include a clock service widget and a memo control. For another example, when the scenario mode is the entertainment mode, the one or more service entries displayed in the efficiency space include an instant messaging service widget and an audio and video service widget. For still another example, when the scenario mode is the office mode, the one or more service entries displayed in the efficiency space include a weather indication service widget, a memo control, and a note control. For yet another example, when the scenario mode is the learning mode, the one or more service entries displayed in the efficiency space include a clock service widget and a note control. For yet another example, when the scenario mode is the sleep mode, the one or more service entries displayed in the efficiency space include a clock service entry and a health monitoring service widget. For yet another example, when the scenario mode is the life mode, the one or more service entries displayed in the efficiency space include a payment control and an express delivery management service widget.

Figure 9A:
FIG. 9A and FIG. 9B are a diagram of interfaces of still another display method for a foldable screen according to an embodiment of this application.
Figure 9B:
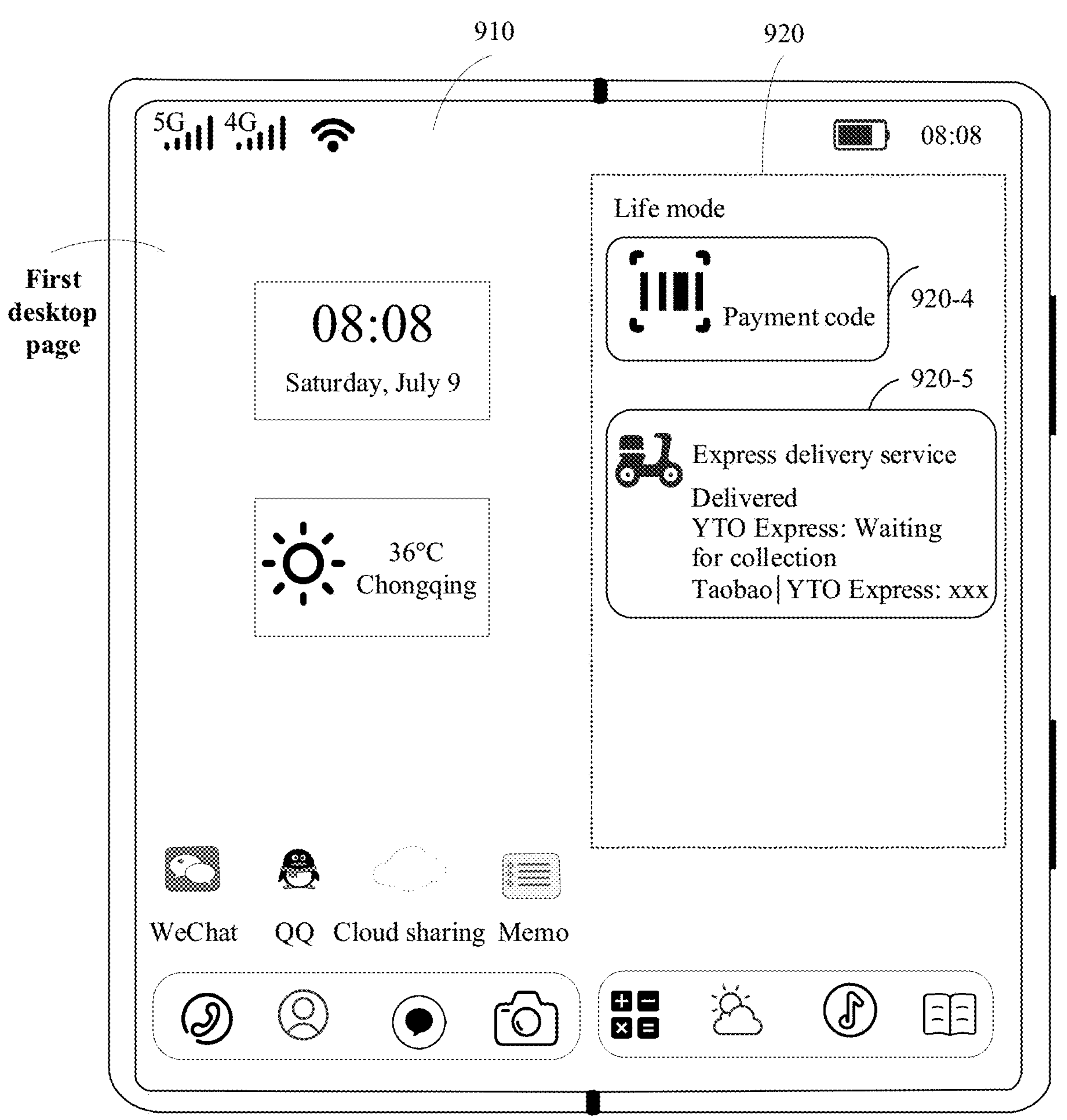

Optionally, when the electronic device switches the scenario mode, the efficiency space displays one or more service entries corresponding to a scenario mode after switching. FIG. 9A and FIG. 9B use an example in which the electronic device switches from the office mode to the life mode. As shown in FIG. 9A, when the scenario mode is the office mode, a weather indication service widget 920-1, a memo control 920-2, and a note control 920-3 are displayed in the efficiency space. When the electronic device switches from the office mode shown in the upper figure to the life mode shown in a lower figure, the one or more service entries displayed in the efficiency space switch from the weather indication service widget 920-1, the memo control 920-2, and the note control 920-3 to a payment control 920-4 and an express delivery management service widget 920-5.

Optionally, the one or more service entries included in the efficiency space may be:

(1) One or more service entries set by the system by default: For example, the one or more service entries corresponding to the life mode set by the system by default include a payment control and an express delivery management service widget.

(2) One or more user-defined service entries: Optionally, the user may adjust the one or more service entries set by the system by default to obtain the one or more user-defined service entries. That the user adjusts the one or more service entries set by the system by default includes but is not limited to one or more of the following: removing a service entry, adding a service entry, and/or adjusting a display location of a service entry in the efficiency space. In this case, the user may customize the one or more service entries in the efficiency space based on personal preferences, which is more in line with a use habit of the user.

(3) One or more application-related service entries that are determined based on an application icon on the desktop page of the desktop workspace and that correspond to the application icon: For example, if the desktop page in the desktop workspace includes an application icon of "Taobao", an application icon of "Alipay" related to "Taobao" and a quick payment control of "Alipay" may be used as the one or more service entries in the efficiency space. The one or more service entries included in the efficiency space may be dynamically displayed along with content in the desktop workspace, and an associated service may be deeply mined, so that the user performs associated human-machine interaction, which is more in line with user habits and effectively improves user experience.

It may be understood that when the electronic device switches to a scenario mode for the first time, one or more service entries set by the system by default may be displayed in the efficiency space. If the user adjusts the one or more service entries in the efficiency space to obtain one or more service entries customized by the user, the one or more service entries customized by the user may be subsequently displayed in the efficiency space.

In an optional implementation, content displayed in the desktop workspace and content displayed in the efficiency space support movement between the desktop workspace and the efficiency space.

Figure 10A:
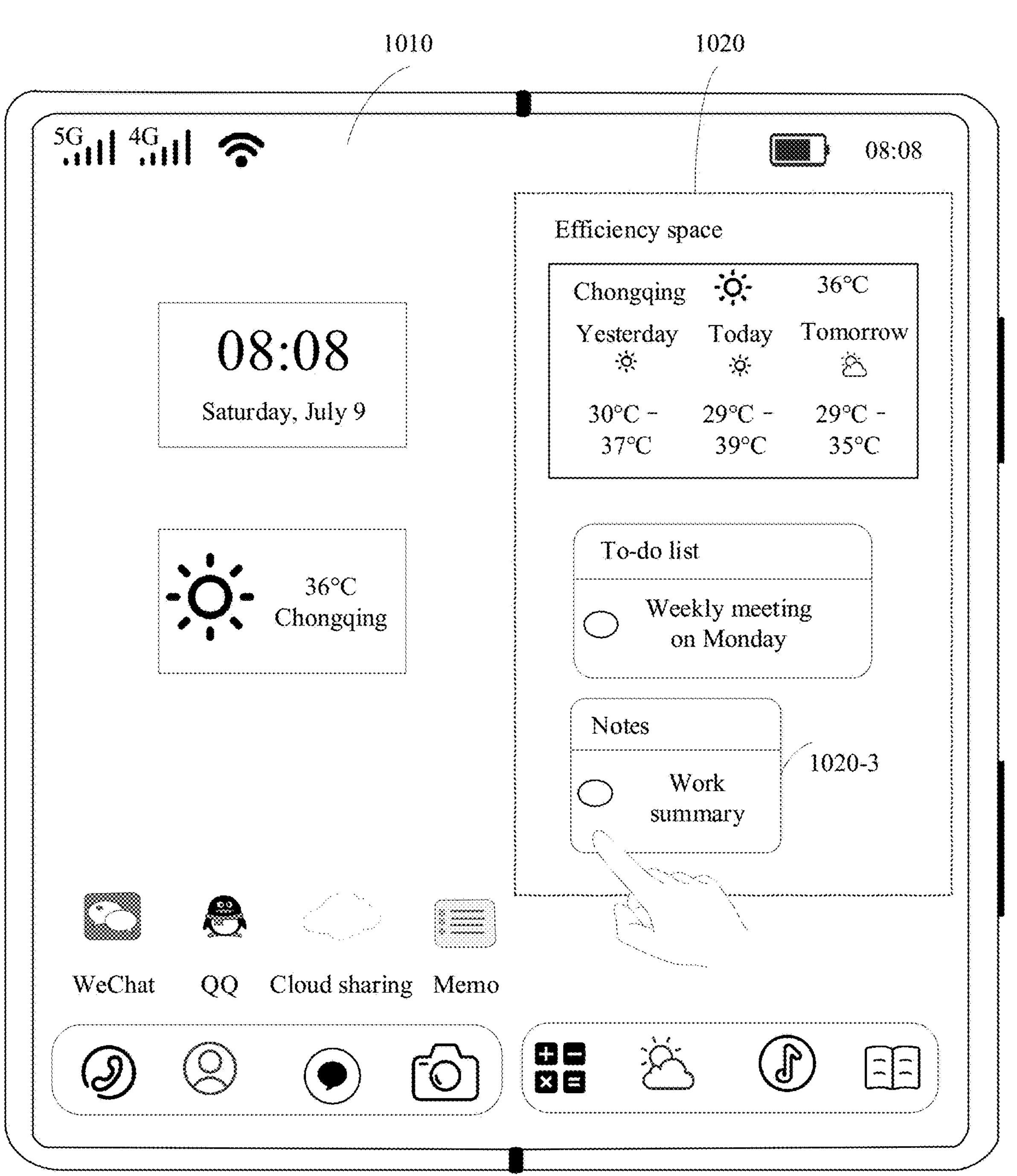
FIG. 10A to FIG. 10C are a diagram of interfaces of still another display method for a foldable screen according to an embodiment of this application.
Figure 10B:
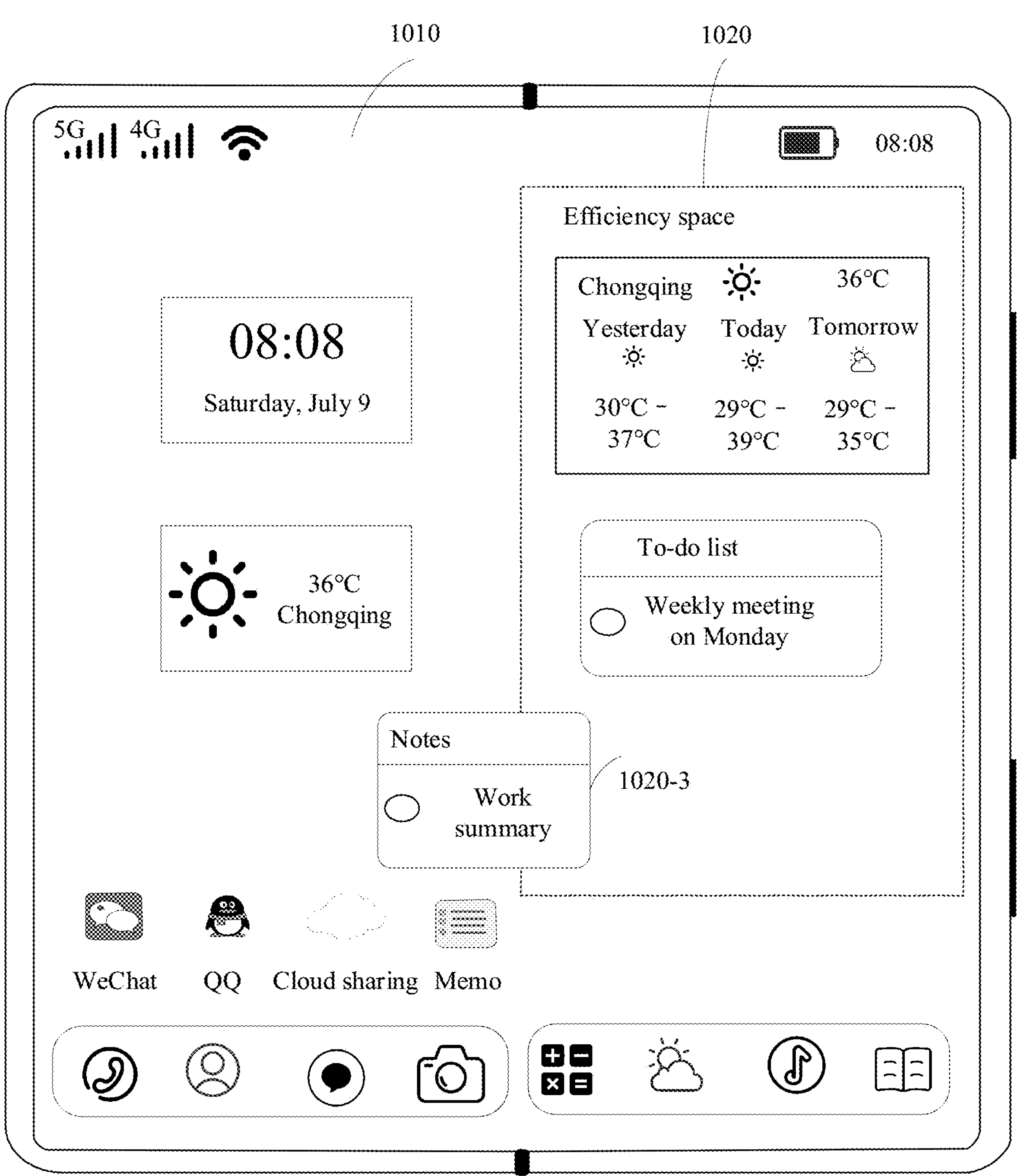
Figure 10C:
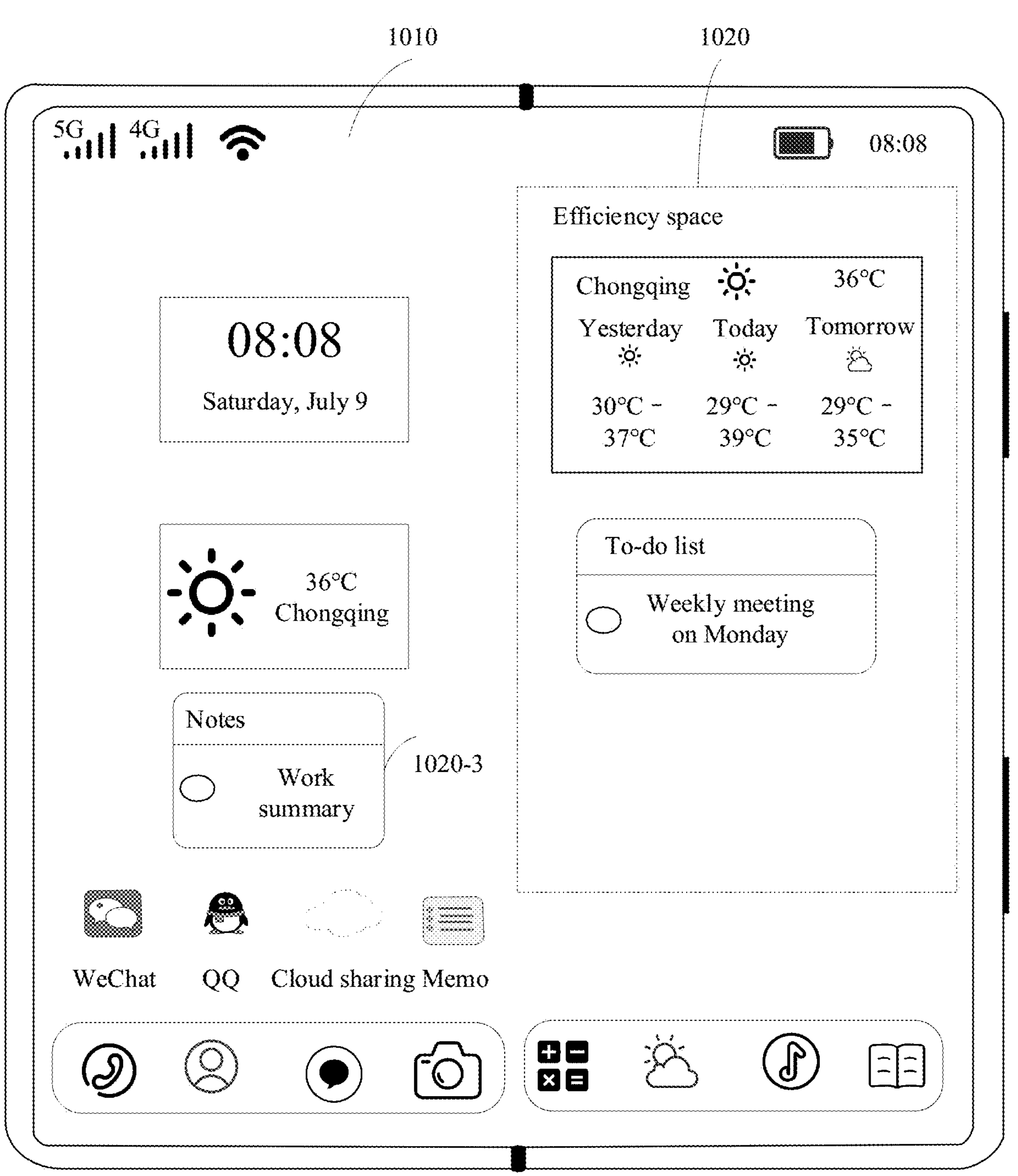

FIG. 10A to FIG. 10C are described by using an example in which a service entry in the efficiency space is moved to the desktop workspace. As shown in FIG. 10A to FIG. 10C, the electronic device may receive a drag operation for a service widget 1020-3 in the efficiency space 1020. In response to the drag operation, the service widget 1020-3 moves in a dragging direction until the service widget 1020-3 is moved to a desktop workspace 1010, and the service widget 1020-3 may be displayed in the desktop workspace 1010.

For example, in FIG. 11A-1 to FIG. 11C, content of the application page is moved to the efficiency space is used as an example, including but not limited to one or more of the following: adding the content of the application page as "Note" in the efficiency space, adding the content of the application page as "Read later" in the efficiency space, and/or sharing the content of the application page to a nearby device indicated by the efficiency space.

Figures 1, 11A:
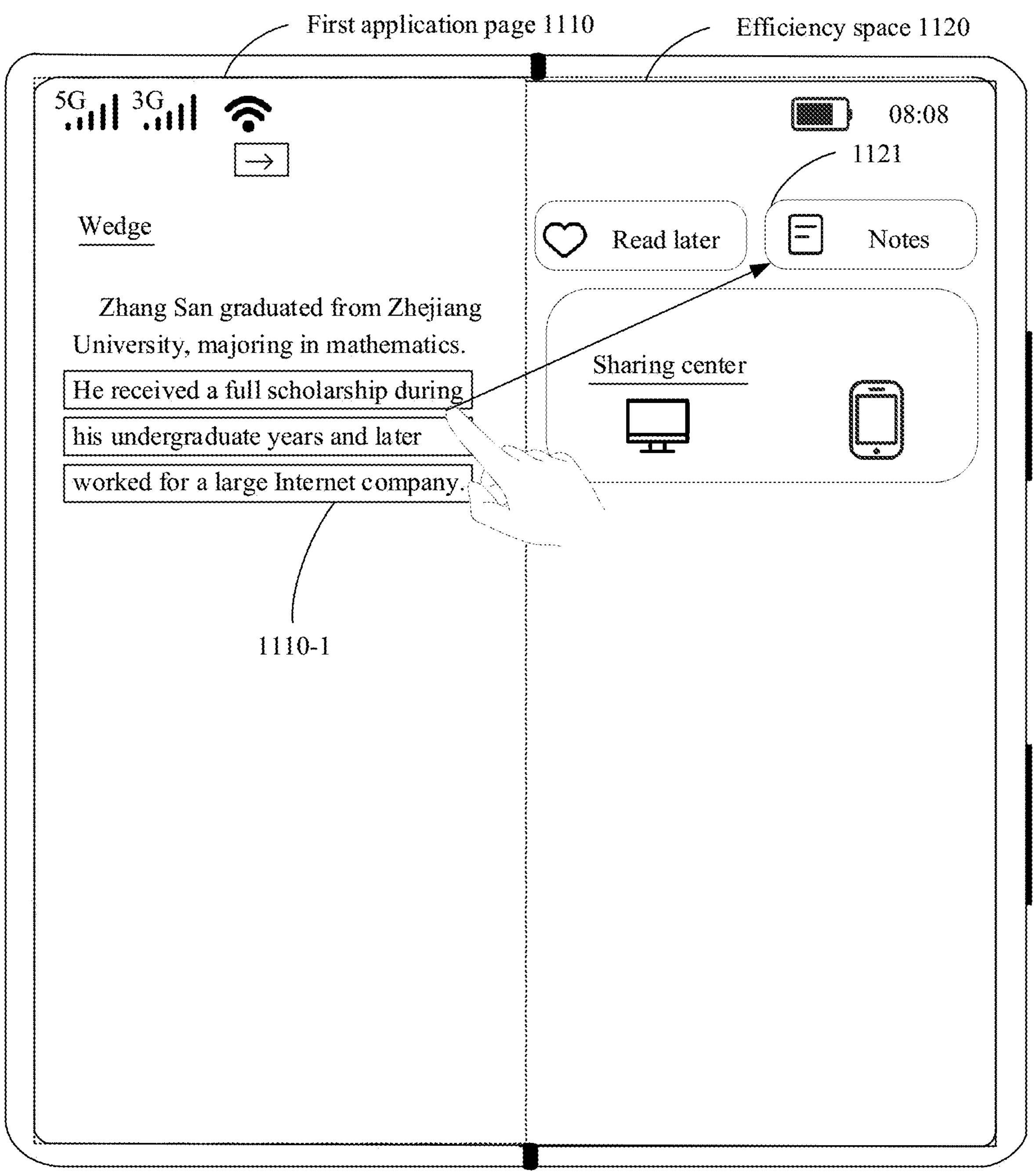
Figures 2, 11A:
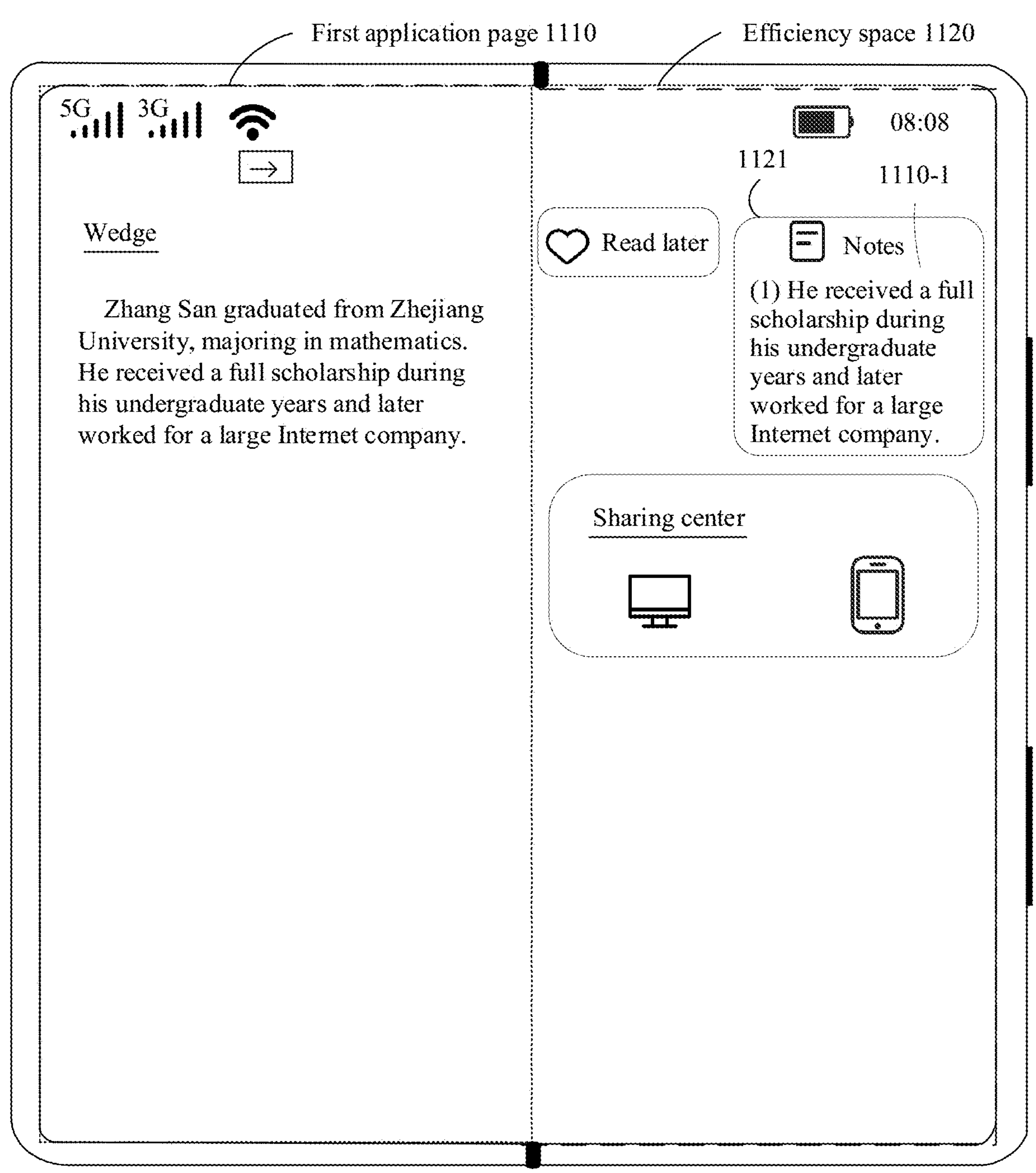

In FIG. 11A-1 and FIG. 11A-2, adding content of an application page as "Note" in the efficiency space is used as an example. When the user obtains a note 1110-1 from a first application page 1110 and text content is used as an example for the note 1110-1, the electronic device may receive a drag operation for the note 1110-1 and in response to the drag operation, the note 1110-1 may move in a dragging direction of a finger. When the user moves the note 1110-1 to a "Note" control 1121 of the efficiency space 1120, the note 1110-1 is added to the efficiency space 1120.

Optionally, the note may include one or more of text content, audio and video content (such as image content, video content, and audio content), and website address content on the application page. This is not limited.

It should be noted that the foregoing user operation of adding the note 1110-1 to the efficiency space 1120 is merely used as an example for description, and there may be another manner. For example, a corresponding icon may be displayed in the display area, and the user may tap the icon to add the note 1110-1 to the efficiency space 1120.

It should be noted that the user may obtain the note from the first application page by performing one or more operations of tapping, long pressing, and sliding. Details are not described herein.

It can be learned that in this embodiment, the content of the application page may be quickly added as "Note".

Figures 1, 11B:
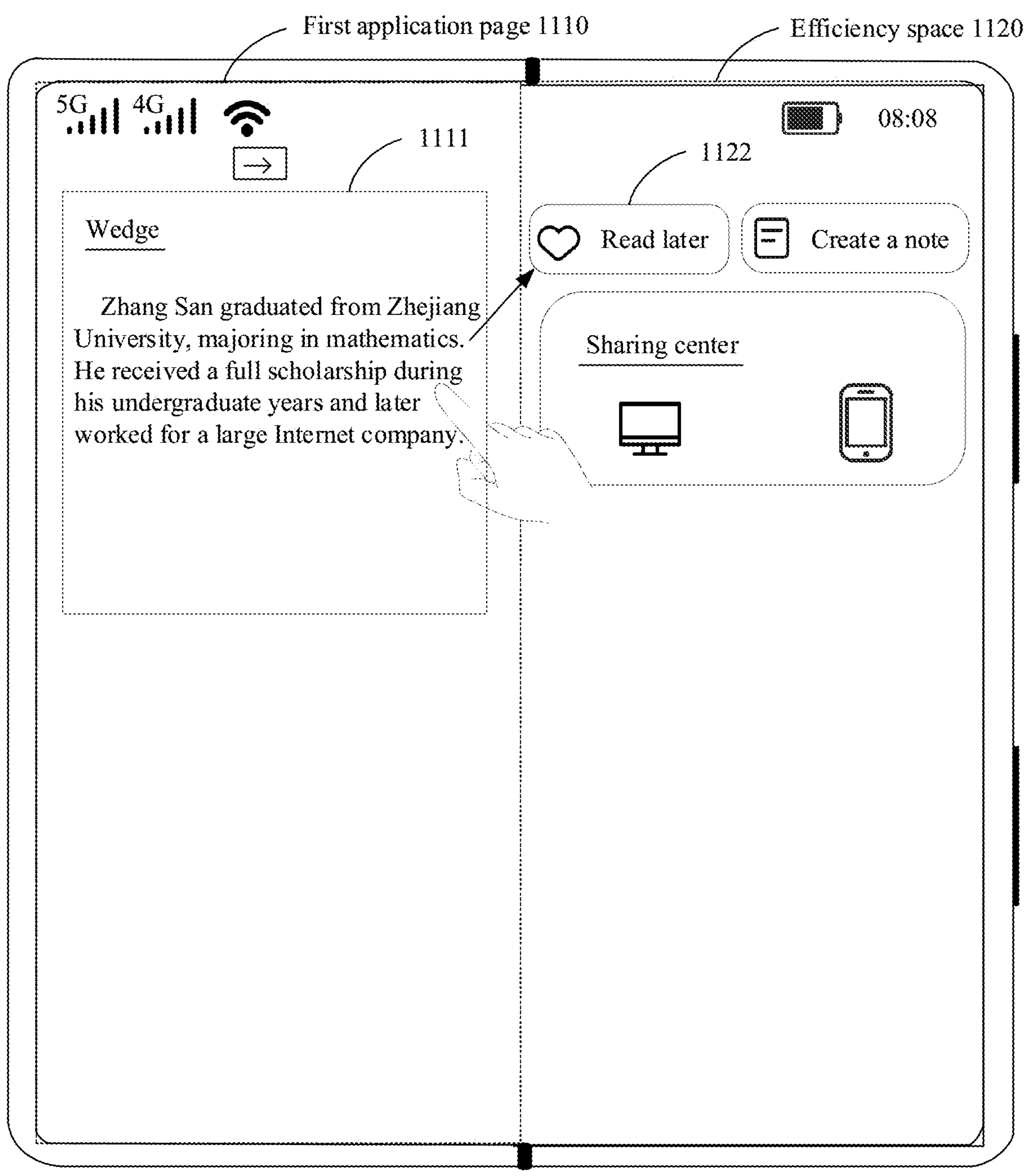
Figures 2, 11B:
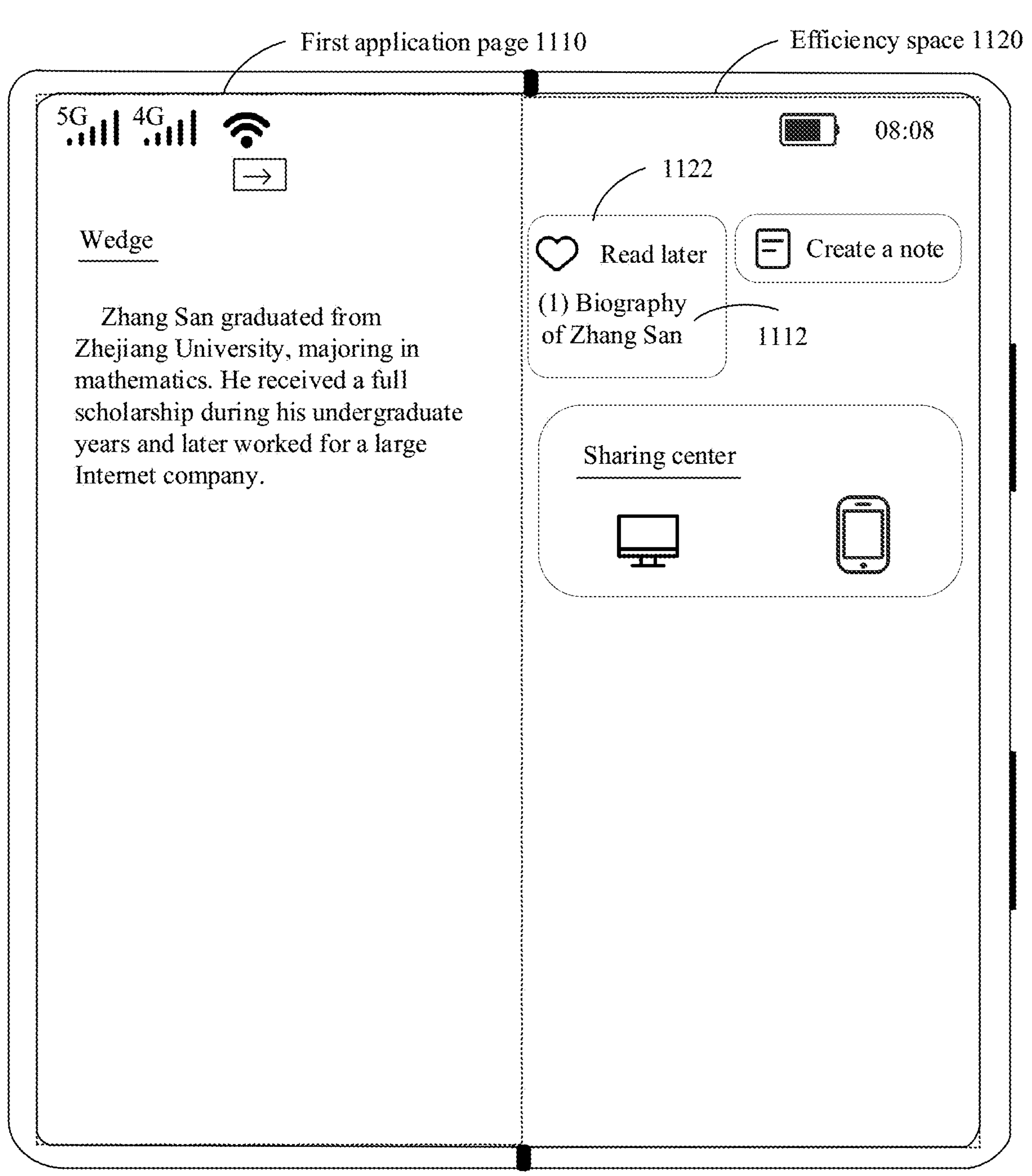

In FIG. 11B-1 and FIG. 11B-2, adding the content of the application interface as "Read later" in the efficiency space is used as an example. The user may long press any area of the first application page 1110. When the electronic device detects that long-press duration is greater than a threshold, content 1111 of the first application page 1110 is selected. The electronic device may receive a drag operation for the content 1111 of the first application page 1110, and in response to the drag operation, the content 1111 of the first application page 1110 may move in a dragging direction of a finger. When the user moves the content 1111 of the first application page 1110 to a "Read later" control 1122 in the efficiency space 1120, the content 1111 of the first application page 1110 is stored in a server or the electronic device in a URL manner, and is added as "Read later" in the efficiency space 1120, and a link 1112 corresponding to the content 1111 is displayed in the efficiency space 1120.

It should be noted that the foregoing user operation of moving the first application page 1110 to the efficiency space 1120 is merely used as an example for description, and there may be another manner. For example, a corresponding icon may be displayed in the display area, and the user may tap the icon to move the content 1111 of the first application page 1110 to the efficiency space 1120.

It can be learned that in this embodiment, the content of the application page may be quickly added as "Read later".

Figure 11C:
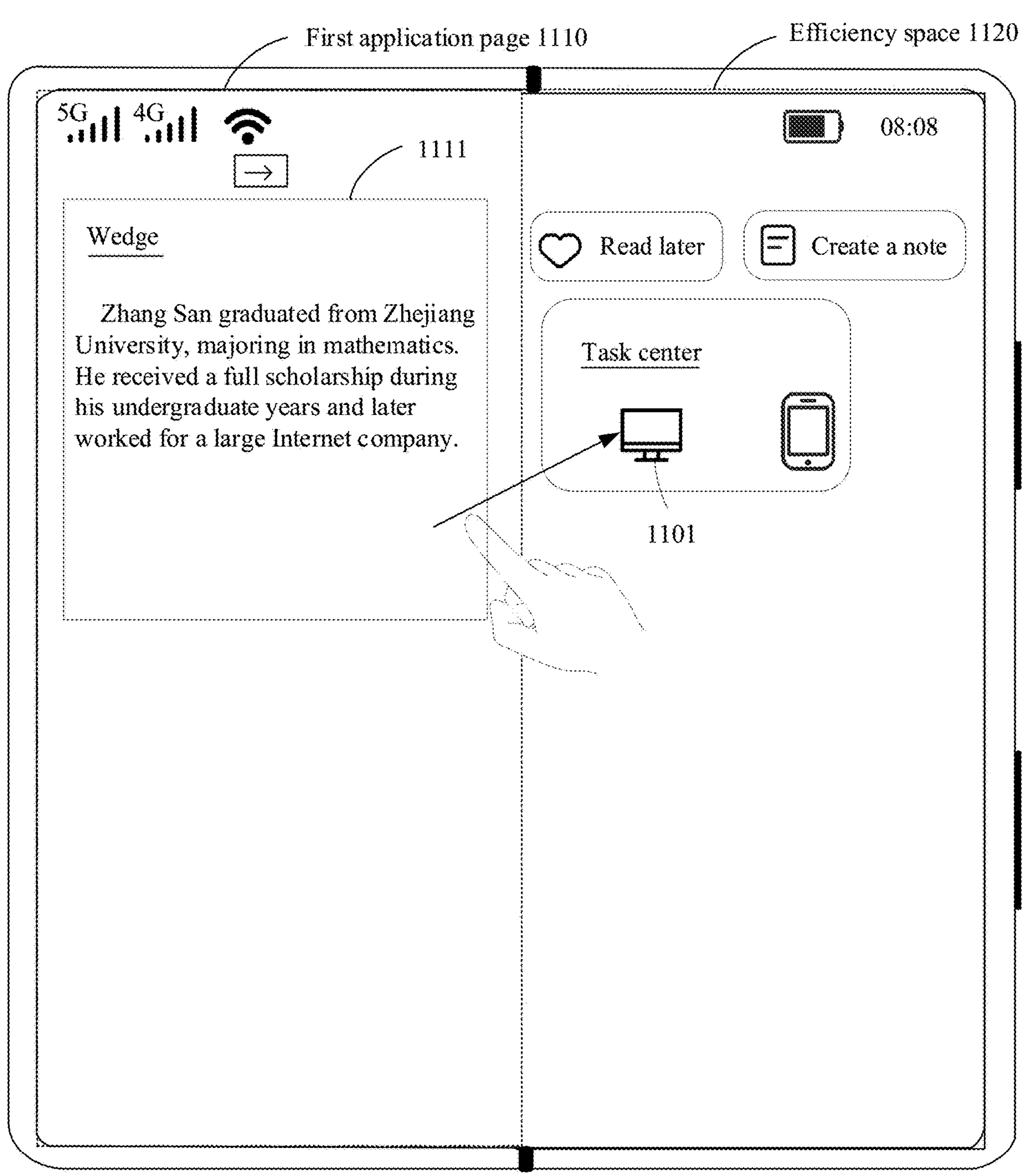

In FIG. 11C, sharing the content of the application page to a nearby device indicated by the efficiency space is used as an example for description. As shown in FIG. 11C, the user may long press any area of the first application page 1110. When the electronic device detects that long-press duration is greater than a threshold, the content 1111 of the first application page 1110 is selected. The electronic device may receive a drag operation for the content 1111 of the first application page 1110, and in response to the drag operation, the content 1111 of the first application page 1110 may move in a dragging direction of a finger. When the user moves the content 1111 of the first application page 1110 to a device option 1101 in the efficiency space 1120, the first application page 1110 may be transmitted to a nearby desktop computer indicated by the device option 1101.

The device option indicates a device near the electronic device, for example, a nearby desktop computer, a nearby mobile phone, a nearby printer, or a nearby tablet.

[001.63] It should be noted that the foregoing user operation of moving the content 1111 of the first application page 1110 to the efficiency space 1120 is merely used as an example for description, and there may be another manner. For example, a corresponding icon may be displayed in the display area, and the user may tap the icon to move the content 1111 of the first application page 1110 to the efficiency space 1120.

It can be learned that in this embodiment, the content of the application page can be quickly shared to a nearby device.

Optionally, the efficiency space 1120 may include a first function area and a second function area. The first function area is used to display a control, and the second function area is used to display a function page corresponding to the control.

Figures 1, 11D:
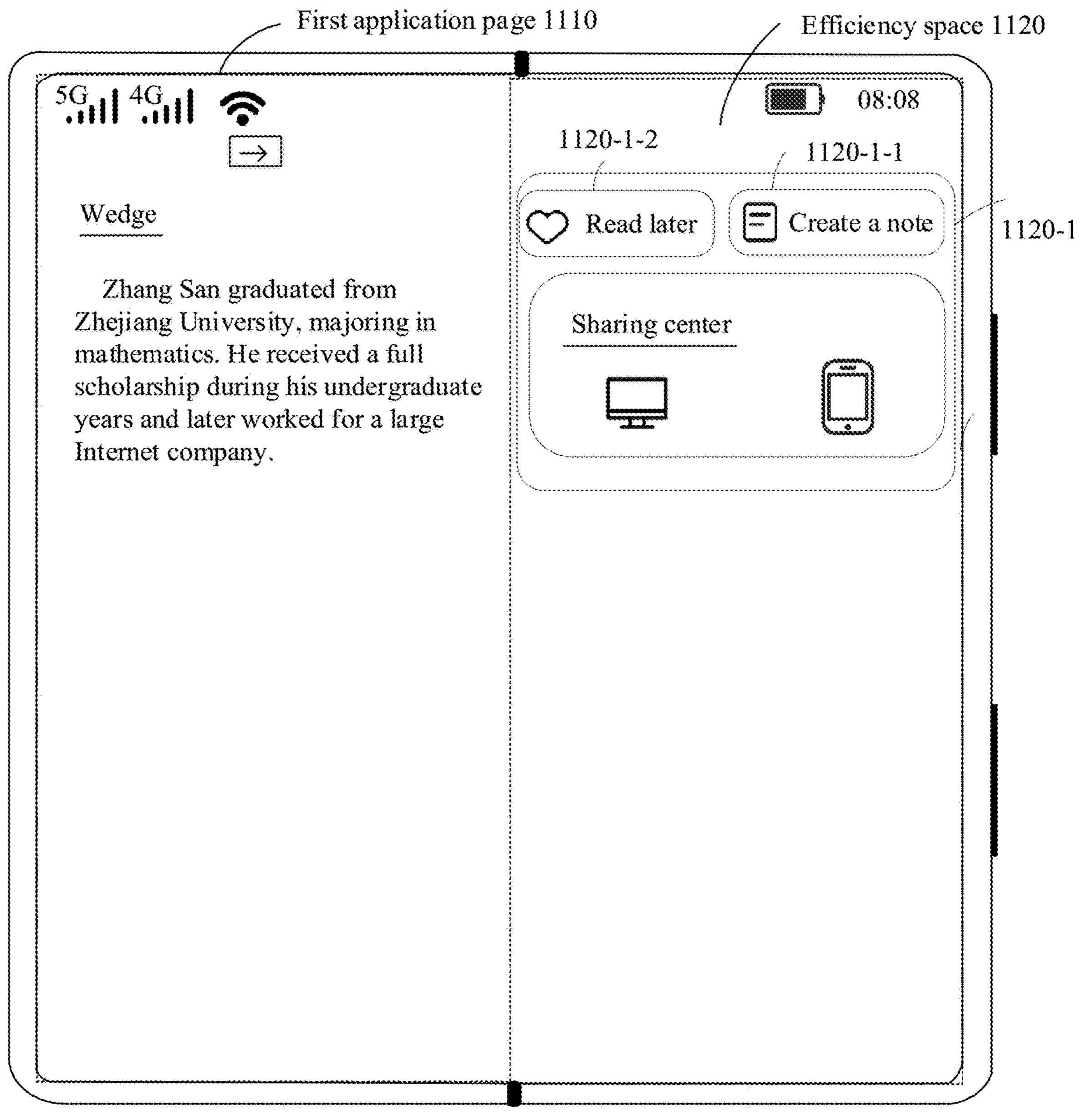
Figures 2, 11D:
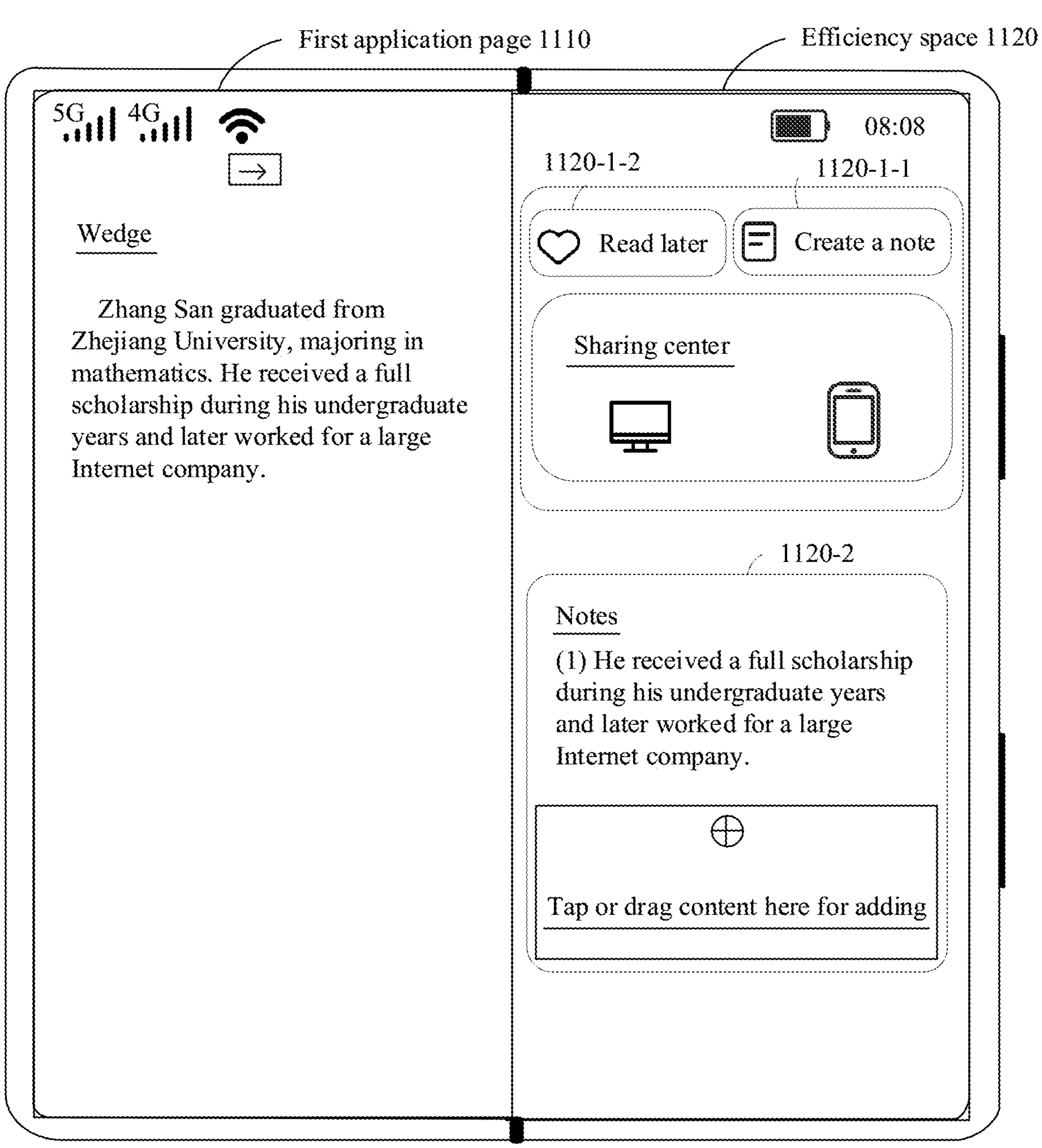
Figures 3, 11D:
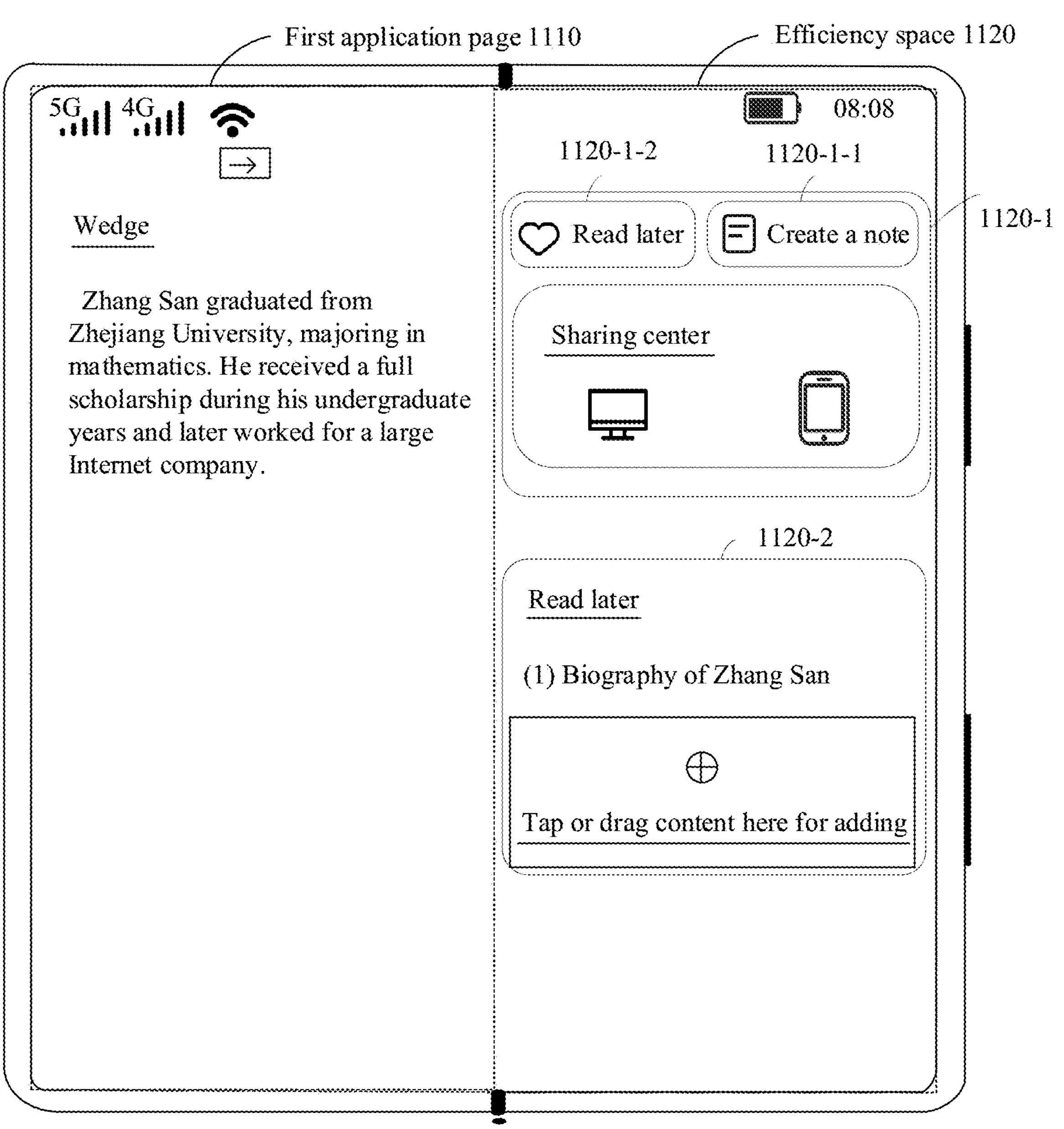

As shown in FIG. 11D-1 to FIG. 11D-3, the efficiency space 1120 may include a first function area 1120-1 and a second function area 1120-2, and the first function area 1120-1 includes a "Note" control 1120 January 1 and a "Read later" control 1120 January 2. When the electronic device detects a touch operation (a tap operation is used as an example in FIG. 11D-1 to FIG. 11D-3) on the "Note" control 1120 January 1, the second function area 1120-2 is used to display a function page of "Note". The function page may include one or more notes. When the electronic device detects a touch operation (a tap operation is used as an example in FIG. 11D-1 to FIG. 11D-3) on the "Read Later" control 1120 January 2, the second function area 1120-2 is used to display a function page of "Read Later". The function page may include one or more links.

It should be noted that the second function area in the efficiency space may be hidden.

It can be learned that when the foldable screen of the electronic device changes from the folded state to the unfolded state, the desktop workspace and the efficiency space are displayed in an unfolded display area. The efficiency space and the desktop workspace are in split screens, more display and operations are supported, and display efficiency is improved. In addition, compared with a manner in which the electronic device displays the desktop workspace in the unfolded display area, the method in this embodiment of this application can prevent content in the desktop workspace from being stretched, thereby improving aesthetics.

2.3. When the electronic device detects that a switch is in an off state, the desktop workspace is displayed in the display area; or when the electronic device detects that the switch is in an on state, the desktop workspace and the efficiency space are displayed in the display area.

Figure 12A:
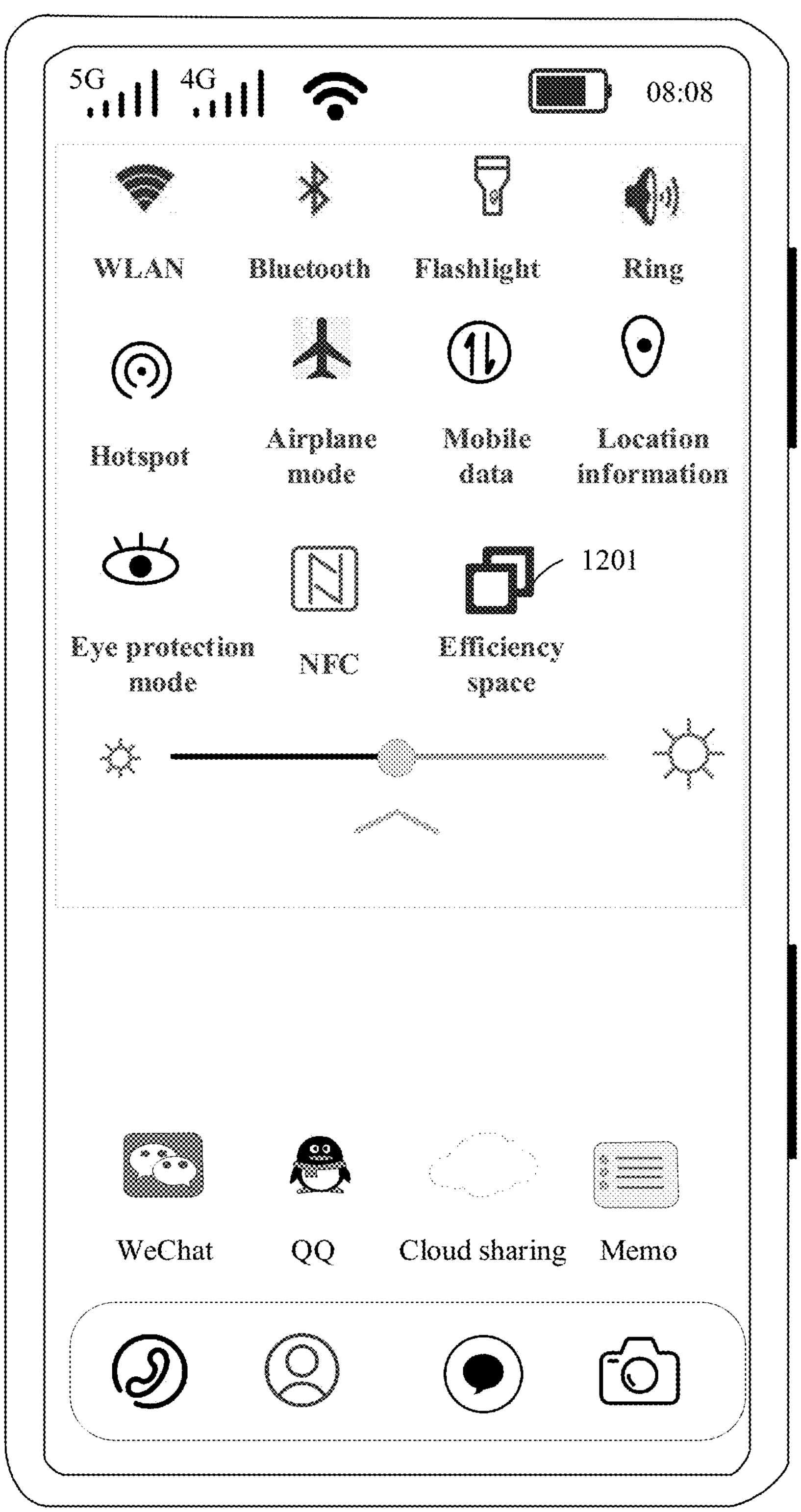
FIG. 12A to FIG. 12D are a diagram of interfaces of still another display method for a foldable screen according to an embodiment of this application.
Figure 12B:
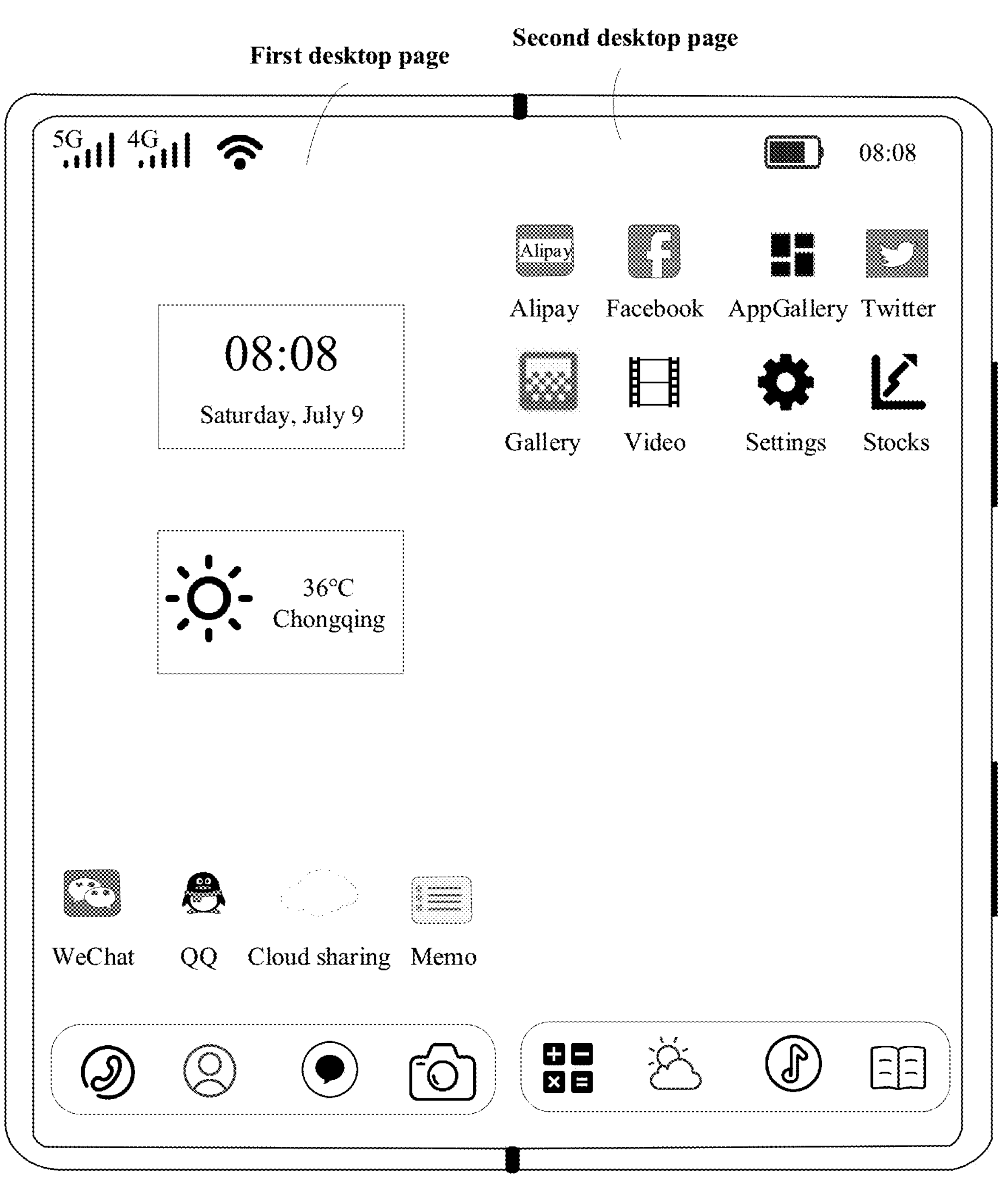
Figure 12C:
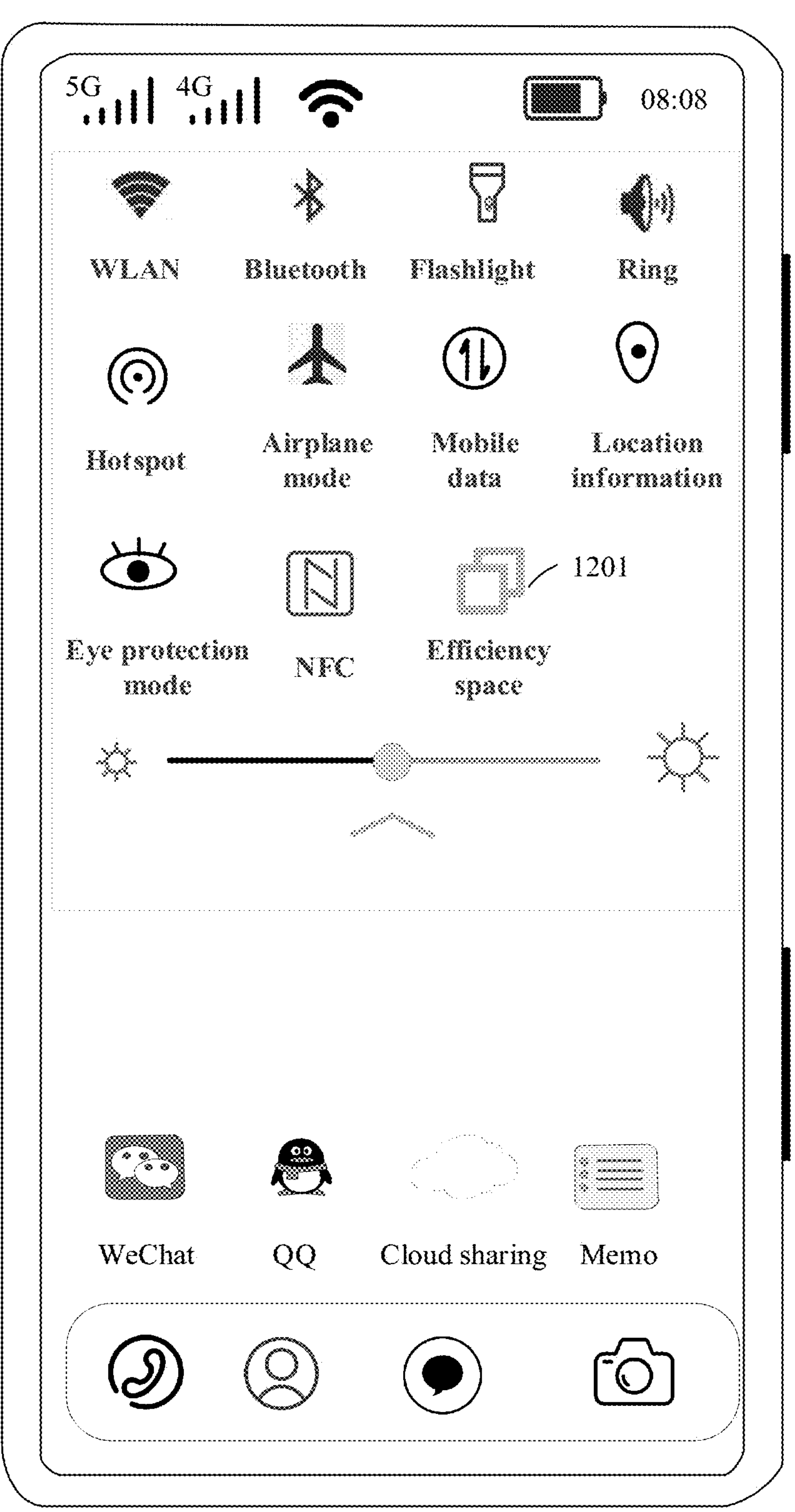
Figure 12D:

Optionally, different states of the switch may be indicated by using different icons or text options. For example, as shown in FIG. 12A to FIG. 12D, a state of the switch may be indicated by an icon 1201 in different colors in a drop-down status bar. A black icon 1201 indicates a switch in an on state, and a gray icon 1201 indicates a switch in an off state. As shown in FIG. 12A and FIG. 12B, when a color of the icon 1201 is gray, the electronic device detects that the switch is in the off state, and the desktop workspace is displayed in the display area. As shown in FIG. 12C and FIG. 12D, when the color of the icon 1201 is black, the electronic device detects that the switch is in the on state, and the desktop workspace and the efficiency space are displayed in the display area.

It may be understood that the electronic device may receive a tap operation on the icon 1201, and change a color of the icon 1201 and a state of the switch in response to the tap operation. Details are not described herein.

It can be learned that in this embodiment of this application, display content in the display area of the foldable screen can be flexibly controlled.

In conclusion, in this application, the electronic device may display more content by using a dock bar obtained by unfolding the foldable screen, or may display more content by using a desktop workspace obtained by unfolding the foldable screen. In another embodiment, more content may be displayed by using both the dock bar and the desktop workspace obtained by unfolding the foldable screen, thereby effectively improving utilization of the display area obtained by unfolding the foldable screen and further improving user experience.

Figure 13:
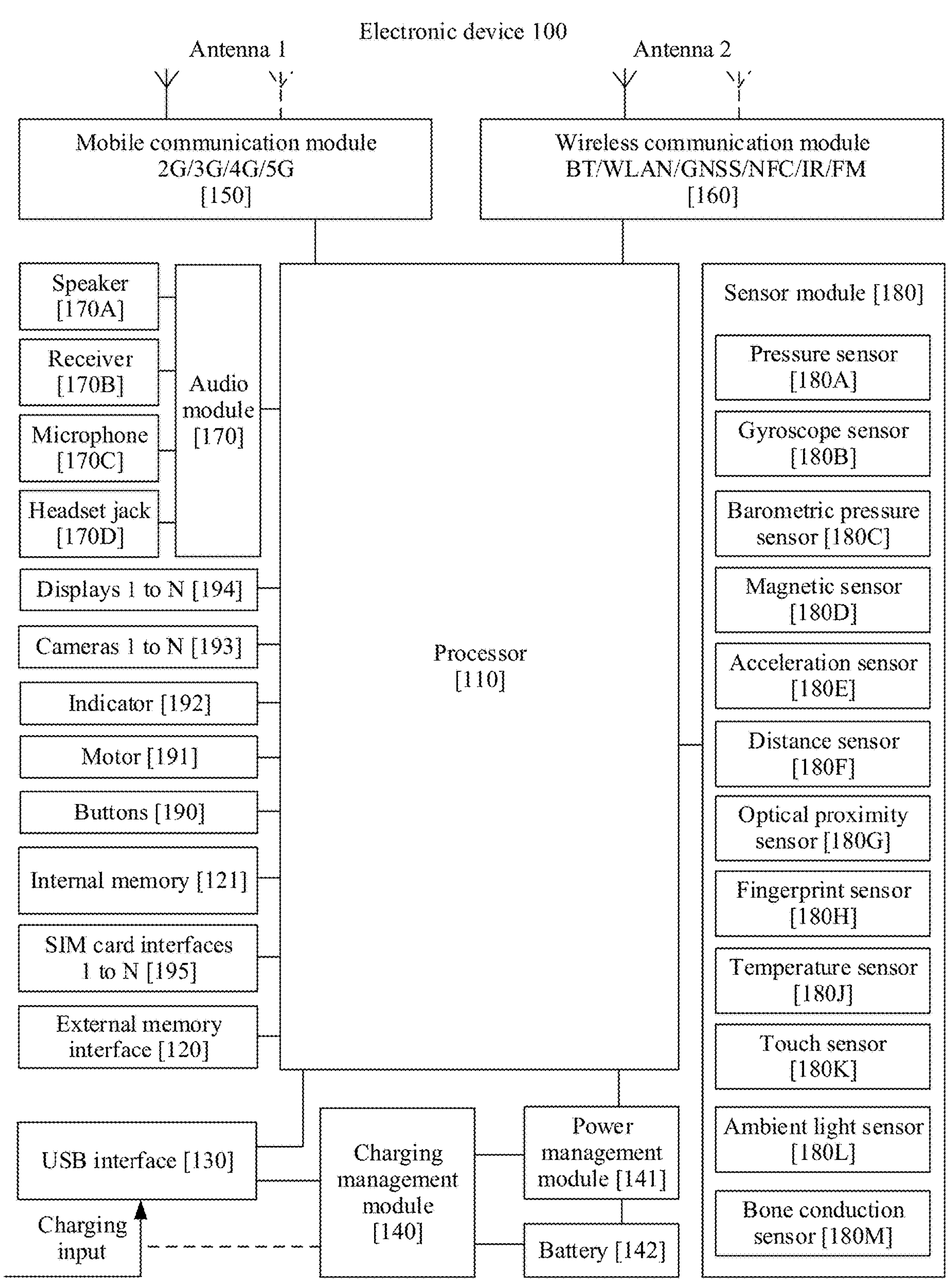
FIG. 13 is a diagram of a structure of an electronic device according to an embodiment of this application.

FIG. 13 is a diagram of a structure of the electronic device 100.

The electronic device 100 is used as an example below to describe embodiments in detail. It should be understood that the electronic device 100 may have more or fewer components than those shown in the figure, or may combine two or more components, or may have different component configurations. Components shown in the figure may be implemented by hardware including one or more signal processing and/or application-specific integrated circuits, software, or a combination of hardware and software.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between modules illustrated in this embodiment of this application is merely an illustrative description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like.

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise and brightness of the image. The ISP may further optimize parameters such as exposure and a color temperature of a photographing scene. In some embodiments, the ISP may be disposed in the camera 193.

The camera 193 is configured to capture a static image or a video. An optical image generated by an object through the lens is projected to the image sensor. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In embodiments of this application, the camera 193 includes a camera that captures an image required for facial recognition, for example, an infrared camera or another camera. The camera that captures an image required for facial recognition is usually located at the front of the electronic device, for example, above a touchscreen, or may be located at another location. This is not limited in embodiments of this application. In some embodiments, the electronic device 100 may include another camera. The electronic device may further include a dot matrix transmitter (which is not shown in the figure), to emit light. The camera collects light reflected by a face to obtain a face image. The processor processes and analyzes the face image, and compares the face image with stored face image information for verification.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more types of video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be used to connect to an external storage card, for example, a micro SD card, to extend a storage capability of the electronic device 100. The external memory card communicates with the processor 110 through the external memory interface 120 to implement a data storage function. For example, files such as music and videos are stored in the external memory card.

The internal memory 121 may be configured to store computer-executable program code. The executable program code includes instructions. The processor 110 implements various function applications and data processing of the electronic device 100 by running the instructions stored in the internal memory 121. The internal memory 121 may include a program storage area and a data storage area. The program storage area may store an operating system, an application required by at least one function (for example, a facial recognition function, a fingerprint recognition function, and a mobile payment function), and the like. The data storage area may store data (such as facial information template data and a fingerprint information template) created during use of the electronic device 100. In addition, the internal memory 121 may include a high-speed random access memory and may further include a non-volatile memory, for example, at least one magnetic disk storage component, a flash memory device, or a universal flash storage (UFS).

In addition, the electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be the USB interface 130, or may be a 3.5 mm open mobile terminal platform (OMTP) standard interface, or a cellular telecommunications industry association of the USA (CTIA) standard interface.

The pressure sensor 180A is configured to sense a pressure signal and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and/or a capacitive pressure sensor.

The gyroscope sensor 180B may be configured to determine a motion gesture of the electronic device 100. In some embodiments, angular velocities of the electronic device 100 around three axes (namely, x, y, and z axes) may be determined using the gyroscope sensor 180B.

The optical proximity sensor 180G may include, for example, a light-emitting diode (LED) and/or an optical detector, for example, a photodiode. The light-emitting diode may be an infrared light-emitting diode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The fingerprint sensor 180H may be disposed below the touchscreen. The electronic device 100 may receive a touch operation of the user in an area corresponding to the fingerprint sensor on the touchscreen, and the electronic device 100 may collect fingerprint information of a finger of the user in response to the touch operation to implement: opening of a hidden album after fingerprint recognition succeeds, starting of a hidden application after fingerprint recognition succeeds, account logging after fingerprint recognition succeeds, payment completing after fingerprint recognition succeeds, and the like described in embodiments of this application.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from that of the display 194.

The button 190 includes a power button, a volume button, and the like. The button 190 may be a mechanical button or may be a touch-sensitive button. The electronic device 100 may receive a button input and generate a button signal input related to user setting and function control of the electronic device 100.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195 to implement contact with or separation from the electronic device 100. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of this application, an Android™ system with a layered architecture is used as an example for describing a software structure of the electronic device 100.

Figure 14:
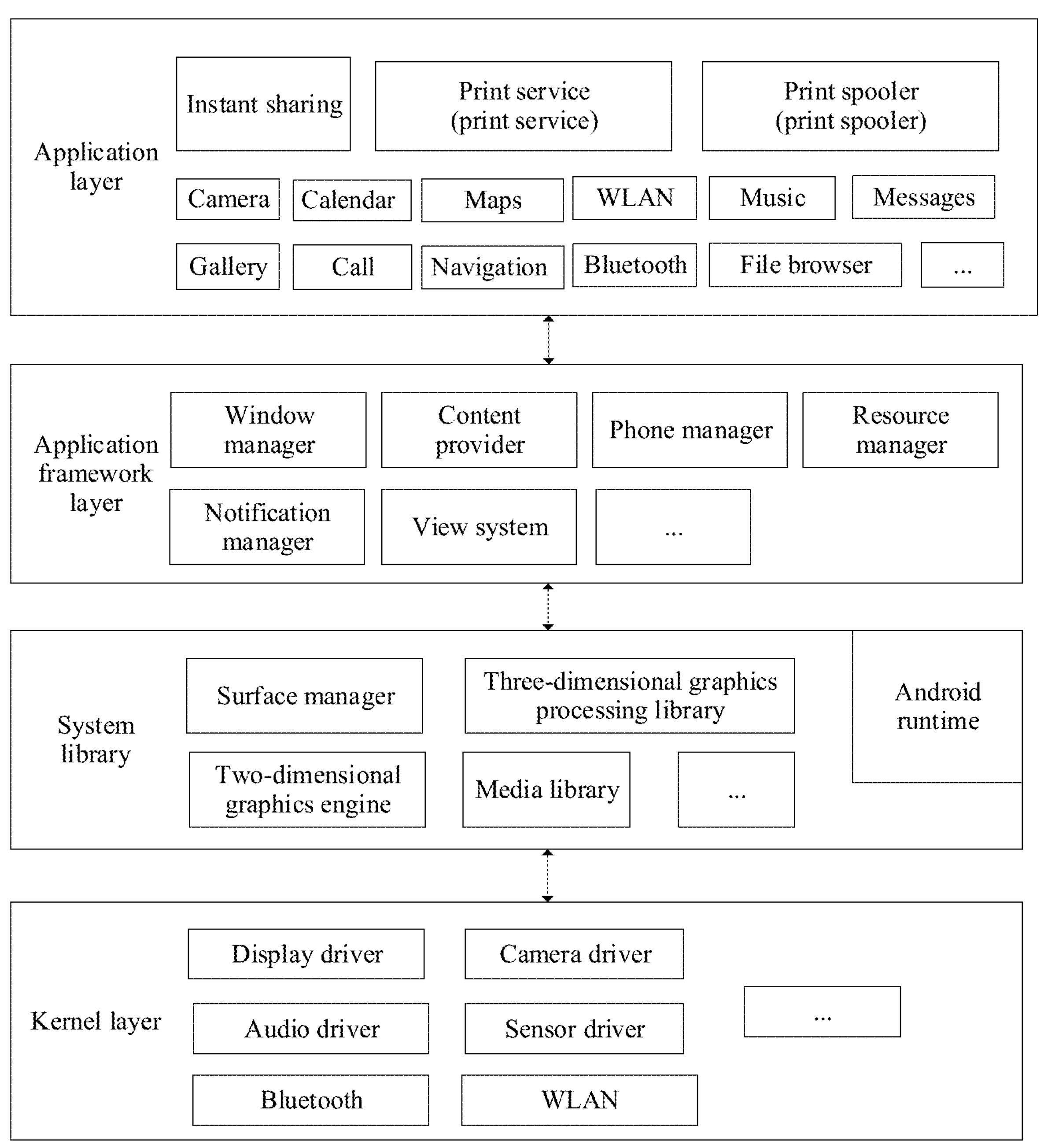
FIG. 14 is a diagram of a software architecture according to an embodiment of this application.

FIG. 14 is a block diagram of a software structure of an electronic device 100 according to an embodiment of this application.

In a layered architecture, software is divided into several layers, and each layer has a clear role and task. The layers communicate with each other through a software interface. In some embodiments, an Android™ system is divided into four layers: an application layer, an application framework layer, Android™ runtime and a system library, and a kernel layer.

The application layer may include a series of application packages.

As shown in FIG. 14, the application packages may include application programs (or referred to as applications) such as Camera, Gallery, Calendar, Call, Maps, Navigation, WLAN, Bluetooth™, Music, Video, and Messages.

The application framework layer provides an application programming interface (API) and a programming framework for an application at the application layer. The application framework layer includes some predefined functions.

As shown in FIG. 14, the application framework layer may include a window manager, a content provider, a view system, a phone manager, a resource manager, a notification manager, and the like.

The window manager is used to manage a window program. The window manager may obtain a size of the display, determine whether there is a status bar, lock a screen, take a screenshot, and the like.

The content provider is used to store and obtain data, and enables these data to be accessible to an application. The data may include a video, an image, audio, calls that are made and answered, a browsing history and bookmarks, an address book, and the like.

The view system includes visual controls, such as a control for displaying text and a control for displaying a picture. The view system may be used to construct an application. A display interface may include one or more views. For example, a display interface including a notification icon of Messages may include a view for displaying text and a view for displaying a picture.

The phone manager is used to provide a communication function of the electronic device 100, for example, management of a call status (including answering, declining, and the like).

The resource manager provides various resources such as a localized character string, an icon, a picture, a layout file, and a video file for an application.

The notification manager enables an application to display notification information in a status bar, and may be used to convey a notification-type message. The displayed notification information may automatically disappear after a short pause without user interaction. For example, the notification manager is used to notify download completion, provide a message notification, and the like. The notification manager may alternatively be a notification that appears in a top status bar of the system in a form of a chart or scroll bar text, for example, a notification of an application running in the background, or a notification that appears on a screen in a form of a dialog interface. For example, text information is displayed in the status bar, an announcement is given, the electronic device vibrates, or the indicator light blinks.

The Android™ runtime includes a kernel library and a virtual machine. The Android™ runtime is responsible for scheduling and management of the Android™ system.

The kernel library includes two parts: a function that needs to be invoked in a Java language and a kernel library of Android™.

The application layer and the application framework layer run on the virtual machine. The virtual machine executes Java™ files at the application layer and the application framework layer as binary files. The virtual machine is used to perform functions such as object lifecycle management, stack management, thread management, security and exception management, and garbage collection.

The system library may include a plurality of functional modules, for example, a surface manager, a media library, a three-dimensional graphics processing library (for example, an OpenGL™ ES), and a 2D graphics engine (for example, an SGL).

The surface manager is used to manage a display subsystem and provide fusion of 2D and 3D layers for a plurality of applications.

The media library supports playback and recording in a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. A display method for an electronic device having a foldable screen, the method comprising:

displaying a first group of service entries in a first dock bar when the electronic device detects that the foldable screen is in a folded state; and displaying a second group of service entries in a second dock bar when the electronic device detects that the foldable screen is in an unfolded state, a second group quantity of service entries in the second group of service entries being greater than a first group quantity of service entries in the first group of service entries;

wherein the first dock bar is located in a display area of the foldable screen when the electronic device is in the folded state, and the second dock bar is located in the display area of the foldable screen when the electronic device is in the unfolded state.

2. The method according to claim 1, wherein the foldable screen comprises at least a first screen and a second screen, the first group of service entries are displayed entirely on the first screen, and the second group of service entries are displayed partially on the first screen and displayed partially on the second screen.

3. The method according to claim 1, wherein the second group of service entries comprise some or all service entries in the first group of service entries, and the second group of service entries further comprise another service entry, wherein the another service entry comprises one or more of the following:

a service entry determined based on historical usage data of each service entry in the electronic device;

a service entry determined based on a folder in the first group of service entries; or a service entry preset by a user.

4. The method according to claim 3, wherein the second dock bar comprises a first sub-area and a second sub-area;

the first sub-area is used to display the some or all service entries in the first group of service entries; and the second sub-area is used to display the another service entry.

5. The method according to claim 4, wherein a quantity of service entries in the second sub-area is related to a second sub-area size of the second sub-area.

6. The method according to claim 5, wherein the second sub-area size is set by a system by default, or is determined based on an input operation of the user.

7. The method according to claim 1, wherein the first group of service entries comprise at least one folder icon, the folder icon indicates that the folder comprises one or more service entries, and when the foldable screen is in the unfolded state, some or all service entries in the one or more service entries are displayed in the second dock bar.

8. The method according to claim 7, wherein the second dock bar comprises a first sub-area and a second sub-area;

the second sub-area is used to display the some or all service entries in the one or more service entries; and the first sub-area is used to display some or all service entries in the first group of service entries except the service entries displayed in the second sub-area.

9. The method according to claim 1, wherein the method further comprises:

displaying a desktop workspace on the display area of the foldable screen when the electronic device detects the foldable screen is in the folded state; and displaying the desktop workspace and an efficiency space on the display area of the foldable screen when the electronic device detects the foldable screen is in the unfolded state;

the desktop workspace comprising a plurality of desktop pages, each desktop page comprises one or more service entries, the desktop workspace switching from one desktop page to another desktop page when a touch operation is detected on the desktop workspace; and the efficiency space comprising one or more service entries, the efficiency space comprising a partial area in the display area that does not switch with switching of a desktop page in the desktop workspace.

10. The method according to claim 9, wherein the one or more service entries displayed in the efficiency space are related to a scenario mode of the electronic device; and the scenario mode comprising one or more of a working mode, an entertainment mode, an office mode, a learning mode, a life mode, and/or a sleep mode.

11. The method according to claim 9, wherein the one or more service entries comprised in the efficiency space comprising:

one or more service entries set by the system by default;

one or more user-defined service entries; or one or more application-related service entries that are determined based on an application icon on the desktop page of the desktop workspace and that correspond to the application icon.

12. The method according to claim 9, wherein content displayed in the desktop workspace and content displayed in the efficiency space support a movement between the desktop workspace and the efficiency space.

13. An electronic device, comprising:

a touchscreen;

a memory storing instructions, a plurality of applications, and one or more programs; and at least one processor in communication with the touchscreen and the memory, the at least one processor configured, upon execution of the instructions, to perform the following steps:

displaying a first group of service entries in a first dock bar when the electronic device detects that the foldable screen is in a folded state; and displaying a second group of service entries in a second dock bar when the electronic device detects that the foldable screen is in an unfolded state, a second group quantity of service entries in the second group of service entries being greater than a first group quantity of service entries in the first group of service entries;

wherein the first dock bar is located in a display area of the foldable screen when the electronic device is in the folded state, and the second dock bar is located in the display area of the foldable screen when the electronic device is in the unfolded state.

14. The electronic device according to claim 13, wherein the foldable screen comprises at least a first screen and a second screen, the first group of service entries are displayed entirely on the first screen, and the second group of service entries are displayed partially on the first screen and displayed partially on the second screen.

15. The electronic device according to claim 13, wherein the second group of service entries comprise some or all service entries in the first group of service entries, and the second group of service entries further comprise another service entry, wherein the another service entry comprises one or more of the following:

a service entry determined based on historical usage data of each service entry in the electronic device;

a service entry determined based on a folder in the first group of service entries; or a service entry preset by a user.

16. The electronic device according to claim 13, wherein the first group of service entries comprise at least one folder icon, the folder icon indicates that the folder comprises one or more service entries, and when the foldable screen is in the unfolded state, some or all service entries in the one or more service entries are displayed in the second dock bar.

17. The electronic device according to claim 13, wherein the electronic device is further enabled to implement:

displaying a desktop workspace on the display area of the foldable screen when the electronic device detects the foldable screen is in the folded state; and displaying the desktop workspace and an efficiency space on the display area of the foldable screen when the electronic device detects the foldable screen is in the unfolded state;

the desktop workspace comprising a plurality of desktop pages, each desktop page comprising one or more service entries, the desktop workspace switching from one desktop page to another desktop page when a touch operation is detected on the desktop workspace; and the efficiency space comprising one or more service entries, the efficiency space comprising a partial area in the display area that does not switch with switching of a desktop page in the desktop workspace.

18. A non-transitory computer-readable storage media storing computer instructions that configure at least one processor of an electronic device, upon execution of the instructions, to perform the following steps:

displaying a first group of service entries in a first dock bar when the electronic device detects that the foldable screen is in a folded state; and displaying a second group of service entries in a second dock bar when the electronic device detects that the foldable screen is in an unfolded state, a second group quantity of service entries in the second group of service entries being greater than a first group quantity of service entries in the first group of service entries;

wherein the first dock bar is located in a display area of the foldable screen when the electronic device is in the folded state, and the second dock bar is located in a display area of the foldable screen when the electronic device is in the unfolded state.

* * * * *